(12) United States Patent
Anderson et al.

(10) Patent No.: US 12,488,320 B2
(45) Date of Patent: Dec. 2, 2025

(54) SYSTEMS AND METHODS FOR WASTE MANAGEMENT

(71) Applicant: RecycleSmart Solutions Inc., Richmond (CA)

(72) Inventors: Carl Michael Anderson, Richmond (CA); Colin Edward Bell, Richmond (CA)

(73) Assignee: RecycleSmart Solutions Inc., Richmond (CA)

( * ) Notice: Subject to any disclaimer, the term of this patent is extended or adjusted under 35 U.S.C. 154(b) by 313 days.

(21) Appl. No.: 17/485,945

(22) Filed: Sep. 27, 2021

(65) Prior Publication Data
US 2022/0101280 A1 Mar. 31, 2022

Related U.S. Application Data

(60) Provisional application No. 63/083,153, filed on Sep. 25, 2020.

(51) Int. Cl.
*G06Q 10/30* (2023.01)
*G06Q 10/047* (2023.01)

(52) U.S. Cl.
CPC .......... *G06Q 10/30* (2013.01); *G06Q 10/047* (2013.01); *B65F 2210/138* (2013.01); *B65F 2210/1443* (2013.01)

(58) Field of Classification Search
CPC ............... G06Q 10/30; G06Q 10/047; B65F 2210/138; B65F 2210/1443
See application file for complete search history.

(56) References Cited

U.S. PATENT DOCUMENTS 9,352,887 B2  5/2016  Poss et al.
2008/0061222 A1*  3/2008  Powers ............ H01L 31/02162
                                                       257/E31.127
(Continued)

FOREIGN PATENT DOCUMENTS

EP    3032640 A1   6/2016
EP    3138790 A1   3/2017
(Continued)

OTHER PUBLICATIONS

A. T. Anagnostopoulos, A. Zaslavsy, A. Medvedev and S. Khoruzhnicov, "Top—k Query Based Dynamic Scheduling for IoT-enabled Smart City Waste Collection," 2015 16th IEEE International Conference on Mobile Data Management, Pittsburgh, PA, USA, 2015, pp. 50-55, doi: 10.1109/MDM.2015.25. (Year: 2015).*
(Continued)

*Primary Examiner* — Carrie S Gilkey
(74) *Attorney, Agent, or Firm* — Own Innovation; James W. Hinton; Sanjeevan Shivakumar

(57) ABSTRACT

Disclosed is a waste management system and method including a plurality of waste management devices. Each waste management device further includes a plurality of sensors configured to sense contents of a waste bin. The device is configured to transmit sensory information from the plurality of sensors. The sensory information from the plurality of sensors and is related to the contents of the waste bin. A server configured to receive and store sensory information transmitted by the plurality of devices. The server stores a fill level of the waste bin based on the sensory information. A processor operably connected to the server, wherein the processor is configured to determine the fill level of the waste bin based on the sensory information. A user device configured to receive, store, and display the fill level of the waste bin.

18 Claims, 42 Drawing Sheets

(56) References Cited

U.S. PATENT DOCUMENTS

| | | |
|---|---|---|
| 2009/0126473 A1 | 5/2009 | Porat et al. |
| 2012/0243093 A1 | 9/2012 | Tonar et al. |
| 2014/0103479 A1 | 4/2014 | Luc |
| 2014/0278630 A1 | 9/2014 | Gates et al. |
| 2014/0379588 A1* | 12/2014 | Gates .................. G06T 7/0008 705/308 |
| 2015/0036037 A1* | 2/2015 | Reed .................... G03B 17/02 348/340 |
| 2015/0307273 A1* | 10/2015 | Lyman ............... G06Q 30/0623 705/26.61 |
| 2015/0323366 A1* | 11/2015 | Kekalainen ........... G01D 11/30 702/188 |
| 2015/0324760 A1 | 11/2015 | Borowski et al. |
| 2015/0339914 A1 | 11/2015 | Kekalainen et al. |
| 2016/0321619 A1 | 11/2016 | Inan et al. |
| 2016/0354990 A1* | 12/2016 | Skocypec ............ B65F 1/1426 |
| 2017/0090447 A1 | 3/2017 | Skocypec et al. |
| 2019/0311333 A1* | 10/2019 | Kekalainen ............ H04W 4/38 |
| 2020/0081120 A1* | 3/2020 | Soldner .................. G01S 15/10 |
| 2020/0082354 A1 | 3/2020 | Kurani |
| 2020/0191580 A1* | 6/2020 | Christensen ......... G01C 21/343 |
| 2020/0213434 A1 | 7/2020 | Samkov |
| 2021/0004911 A1* | 1/2021 | Poss ...................... G01D 21/02 |
| 2022/0008637 A1* | 1/2022 | Kumar .................. G01F 1/712 |

FOREIGN PATENT DOCUMENTS

| | | |
|---|---|---|
| EP | 2803953 B1 | 9/2021 |
| WO | 2014079586 A1 | 5/2014 |
| WO | 2014114469 A2 | 7/2014 |
| WO | 2015094140 A1 | 6/2015 |
| WO | 2015137997 A1 | 9/2015 |
| WO | 2020060421 A1 | 3/2020 |

OTHER PUBLICATIONS

World Intellectual Property Organization, International Search Report and Written Opinion for PCT/2021/051338, Dec. 29, 2021.

World Intellectual Property Organization, International Search Report and Written Opinion for PCT/CA2021/051339, Dec. 15, 2021.

USPTO, Office Action for U.S. Appl. No. 17/485,936, Jan. 11, 2024.

European Patent Office, Extended European Search Report for EP Patent App. No. 21870651.3, Sep. 20, 2024.

European Patent Office, Extended European Search Report for EP Patent App. No. 21870652.1, Sep. 20, 2024.

USPTO, Office Action for U.S. Appl. No. 17/485,936, Sep. 20, 2024.

USPTO, Office Action for U.S. Appl. No. 17/485,936, Mar. 25, 2024.

\* cited by examiner

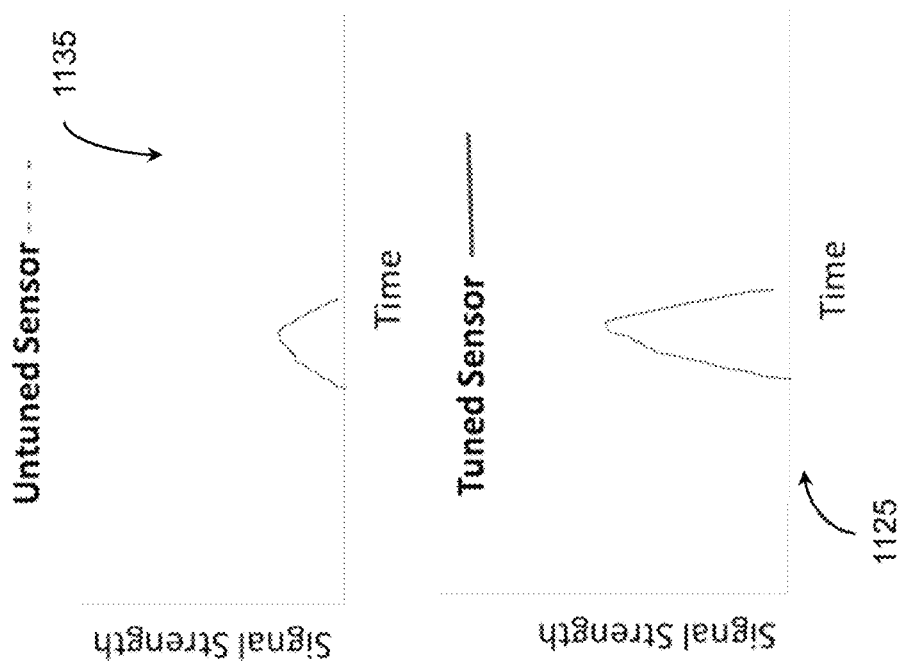
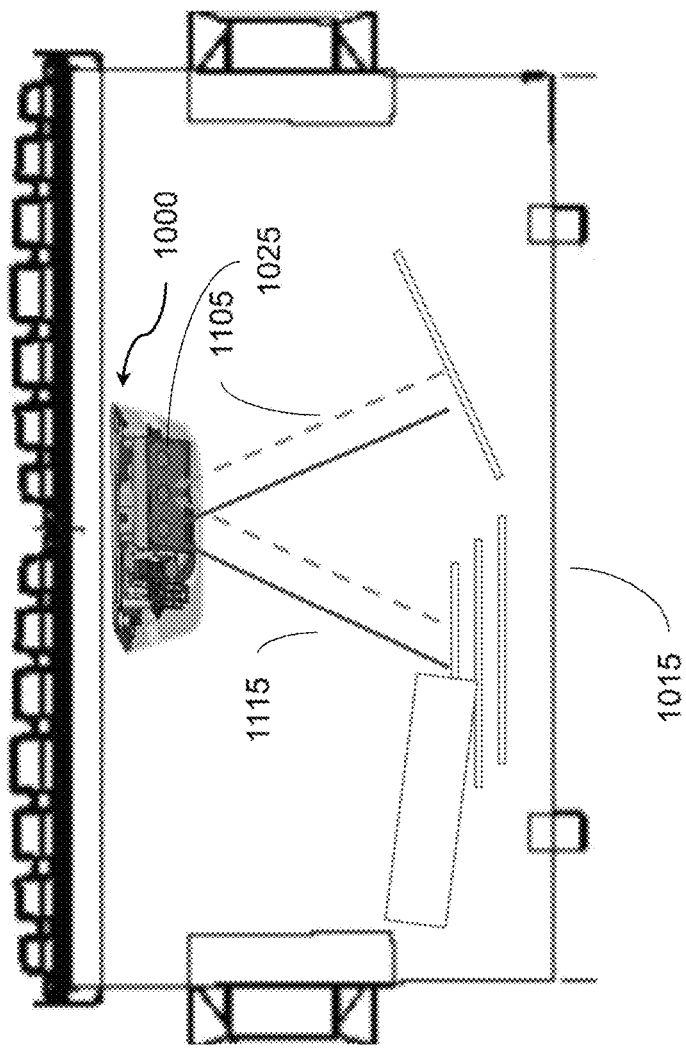
Figure 14

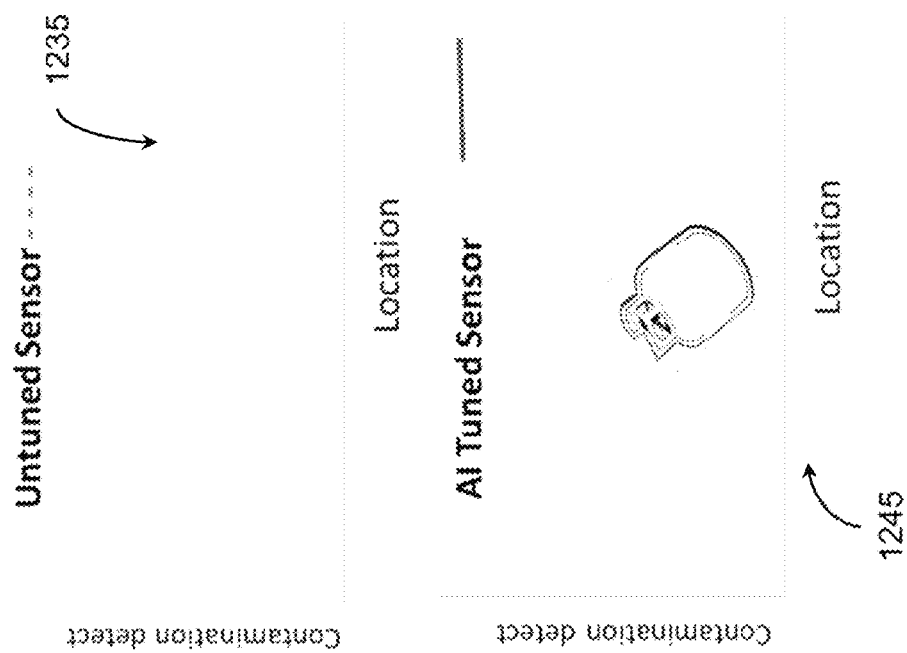
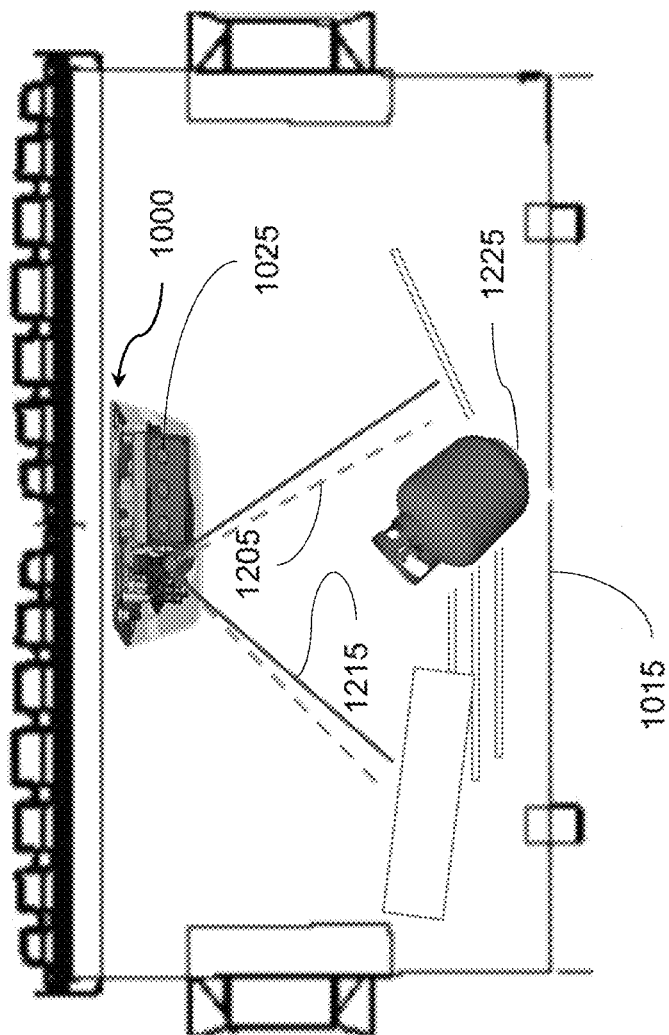
Figure 15

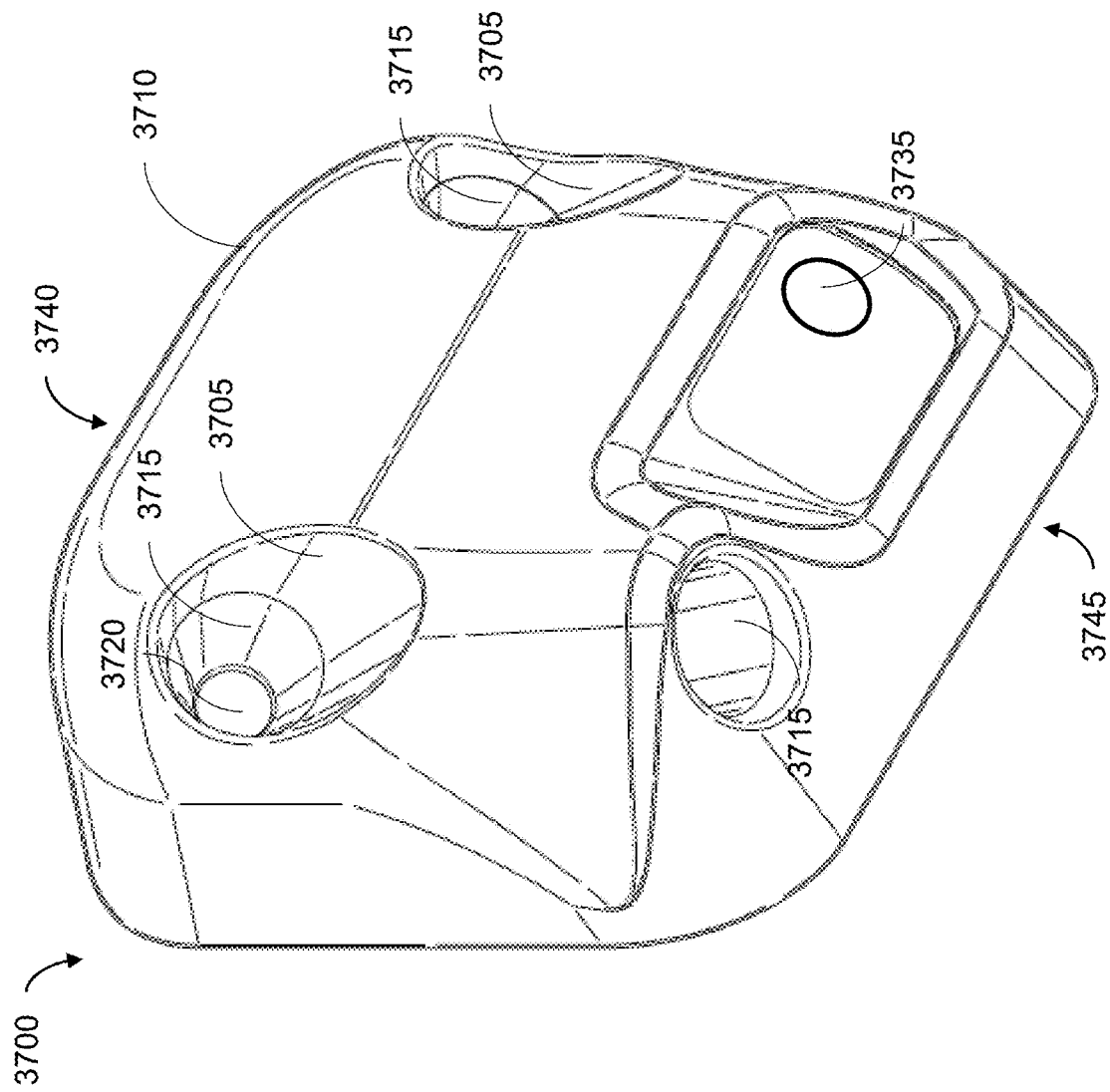

SYSTEMS AND METHODS FOR WASTE MANAGEMENT

TECHNICAL FIELD

The embodiments disclosed herein relate to waste management, and, in particular to systems, apparatus, and/or methods for waste management.

INTRODUCTION

Current waste management firms have not adopted technology and typically work on a fixed pickup schedule with fixed daily routes. This is the baseline or existing current condition with no route optimization or remote bin "fill level" indicators to produce optimal routing and bin overflow protection. Instead the number of pickups (bin emptying) per week is adjusted to ensure the bins do not overflow resulting in bins being picked up when empty or only marginally filled. This is extremely inefficient leading to commercial waste and recycling collection bins being inherently over-serviced while waste generation rates continue to increase and green house gases (GHG) increase.

A technical problem to be solved is to provide a device with a plurality of sensors and a computer system that analyzes sensory information from the device to remotely detect the bin fill levels in an effort to provide some efficiencies to the industry. To date the sensors provided have not met with industry uptake due to a lack accuracy in the reported bin fill levels, poor cellular connections leading to late and inconsistent bin level reports or plain failures to report, easily blocked sensors and limited resistance to the harsh environment in the waste environment.

In addition, recycling contamination in the industry is an ongoing issue that has not been solved. This is a critically important issue, especially as countries refuse the import of contaminated recyclable materials. Detecting the source of contamination is usually a time-intensive and challenging process that is conducted typically by manual visual inspection. Contaminated recyclables can reduce the entire collection value to zero and frequently result in landfill disposal of not just the material collected in a bin but the entire truck load of material. The industry needs a way of automating contamination detection as well as improving efficiencies to reduce landfill, GHG emissions and costs. Accordingly, another technical problem to be solved is to provide a sensor and computer technology to be able to detect contamination of recyclable materials.

Current sensors, systems, and methods have not been met with industry uptake due to a lack accuracy in the reported bin fill levels which leads to bins pickup being mis-timed—either wasting fuel and time if picked up early before it was full or resulting in waste overflows if it is picked up late after it was already full for some time.

Current sensors, systems, and methods also possess poor cellular connections leading to reporting timing inconsistencies or plain failures to report on bin levels resulting in manually scheduled bin pickups of unknown fill level or those that needed to be picked up being missed and overflowing. Optimized route pickup which provides the greatest return on investment and least equipment/personnel utilized only works if you can verify what bins need pickup before the truck leaves on a pickup route.

Further, sensors using optical methodologies (e.g., cameras, light based time of flight) are subject to cover glass occlusion from water entering the bin when it rains and mixing with bin contents or wet waste material from moist waste. This occlusion occurs when the coverglass gets coated with an opaque material that prevents clear optical transmission. Once blocked or occluded the sensors are incapable of providing any information on fill levels even if a human reviews the result. The sensors have to be cleaned at the site before they can be returned to operational status.

Current sensors, systems, and methods also possess limited resistance to the harsh conditions in external waste bins, such as ambient temperatures of −40 C to +70 C or more inside the bins, freezing and thawing transitions, and the waste bin pickup methodology used such as front load bins being repeatedly slammed against metal rails to ensure the bin is completely emptied.

Accordingly, there is a need for new waste management devices, systems, and methods to determine bin fill levels, and system efficiencies that improve operations with significant cost benefits, which are not possible to date.

SUMMARY

Provided is a waste management system is including a plurality of waste management devices. Each waste management device further includes a plurality of sensors configured to sense contents of a waste bin. The waste management device is configured to transmit sensory information from the plurality of sensors, wherein the sensory information from the plurality of sensors and is related to the contents of the waste bin. The waste management device also includes a server configured to receive and store sensory information transmitted by the plurality of device. The server stores a fill level of the waste bin based on the sensory information. The server includes a processor configured to determine the fill level of the waste bin based on the sensory information. The waste management system also includes a user device configured to receive, store, and display the fill level of the waste bin.

The waste management system may provide that the sensory information from at least two sensors is used to improve the accuracy of the fill level of the waste bin.

The waste management system may provide that a distance measurement is derived from the sensory information to determine the fill level of the waste bin.

The waste management system may provide that the plurality of sensors includes at least two different types of sensors. The fill level of the waste bin may be determined after cross-validation with the at least two different types of sensors.

The waste management device may provide that the plurality of sensors includes at least one of an ultrasonic sensor, a camera sensor, a time of flight sensor, a radar sensor, a lidar sensor, and a multispectral camera sensor.

The waste management device may provide that the plurality of sensors includes at least three ultrasonic sensors.

The waste management system may include a location module configured to store the location of each waste bin in computer-readable memory. The processor is operably connected to the location module. The processor is configured to identify an optimal route for collecting waste from the plurality of waste bins based on the fill level for each waste bin and the location of each waste bin.

The waste management system may provide that the processor is configured to identify contamination in the waste bin based on the sensory information.

The waste management system may provide that the server configured to remotely reconfigure the plurality of sensors.

The waste management system may provide that the processor is configured to identify whether at least one sensor is occluded based on the sensory information.

Provided is a waste management method including receiving sensory information for a plurality of waste bins, wherein the sensory information for each waste bin is collected by a plurality of sensors and is related to the contents of the waste bin. The waste management method includes identifying a fill level for the waste bin based on the sensory information. The waste management method also includes determining the fill level of the waste bin based on the sensory information from the plurality of sensors.

The waste management method may provide that the sensory information from at least two sensors is used to improve the accuracy of the fill level of the waste bin.

The waste management method may provide that a distance measurement is derived from the sensory information to determine the fill level of the waste bin.

The waste management method may provide that the plurality of sensors includes at least two different types of sensors, wherein the fill level is determined after cross-validation with the at least two different types of sensors.

The waste management method may provide that the plurality of sensors includes at least one of an ultrasonic sensor, a camera sensor, a time of flight sensor, and a multispectral camera sensor.

The waste management method may provide that the plurality of sensors includes at least three ultrasonic sensors.

The waste management method may include identifying an optimal route for collecting waste from the plurality of waste bins based on the fill level for each waste bin and the location of each waste bin.

The waste management method may include identifying contamination in the waste bin based on the sensory information.

The waste management method may include remotely reconfiguring the plurality of sensors.

The waste management method may include identifying whether at least one sensor is occluded based on the sensory information.

A waste management device, system, and method is provided which allows for determining waste bin fill levels based on sensory information obtained from a plurality of sensors. The system allows for cloud-based tracking of all waste and recycling bins providing analysis tools, operations dashboards, routing to filled bins and history for the operation. A key feature is the ability to directly interact with those bins using custom or third party onsite sensors to indicate bin levels and take photos of contents throughout the filling cycle.

The waste management devices, systems, and methods provide a technical solution to a sustainability problem in waste management by allowing for intelligent control of the pickup of waste bins. The devices, systems, and methods may allow for bins to only be picked up when they are significantly full as opposed to the current methods which pickup based on a pre-determined route and what day of the week it is, independent of how much (if any) waste is in the bin. The waste management devices, systems, and methods provided herein may use cloud computing analytics, specialized wireless sensors on the bins, and system wide dashboards combined with routing which allows waste bin data to be tracked, displayed and if requested automatically routed for pickup driving new levels of efficiency.

The waste management devices, systems, and methods may allow for more information on bin fill levels and information on fill contamination which will drive efficiencies in operations, and improve returns on recyclables by identifying contamination in bins as well as those ready for pickup optimization.

The waste management devices, systems, and methods may provide for accurate fill levels that can be cross verified, specialized cellular technology based on the fixed, not mobile, use case to ensure strong reliable connections and consistent reporting, unique optical cleaning technology for long lasting optical sensor use, a custom multispectral camera for contamination identification and packaging built for the harsh environment. These features will provide waste management firms the key features that allow large industry uptake:

The waste management devices, systems, and methods may provide for large industry uptake by providing an accurate view of what the fill level of the waste bin is or will be—allowing just in time bin pickup scheduling. It may also provide doubly verifiable pickup events and timing for each waste bin. Allowing an accurate routing for waste vehicles before they depart on a route may also be provided by incorporating solid cellular data connections and with that consistent network access and data reporting timing.

The waste management devices, systems, and methods may require less sensor servicing typically required by current optical sensors, providing longer valid use cycles, reducing costs, and helping provide accurate routing for vehicles before they depart on a route. A longer sensor lifetime provides lower total cost of ownership and wider deployment.

The waste management devices, systems, and methods may provide contamination detection in both waste and recycling bins, allowing for notification to the customer of problem bins, correction of bin contamination and preventing contamination of the full vehicle load which would force the waste to be sent instead to a landfill.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 14 is an embodiment of a waste management device attached to the top of a waste bin with the plurality of sensors including a sensor that is tuned and another sensor that is untuned, in accordance with an embodiment;

FIG. 15 is a waste management device attached to the top of a waste bin with the plurality of sensors including a sensor that is tuned by artificial intelligence (AI) or machine learning techniques and another sensor that is untuned, in accordance with an embodiment;

FIG. 35B is a perspective bottom view of the waste management device, in accordance with an embodiment;

DETAILED DESCRIPTION

Figure 1:
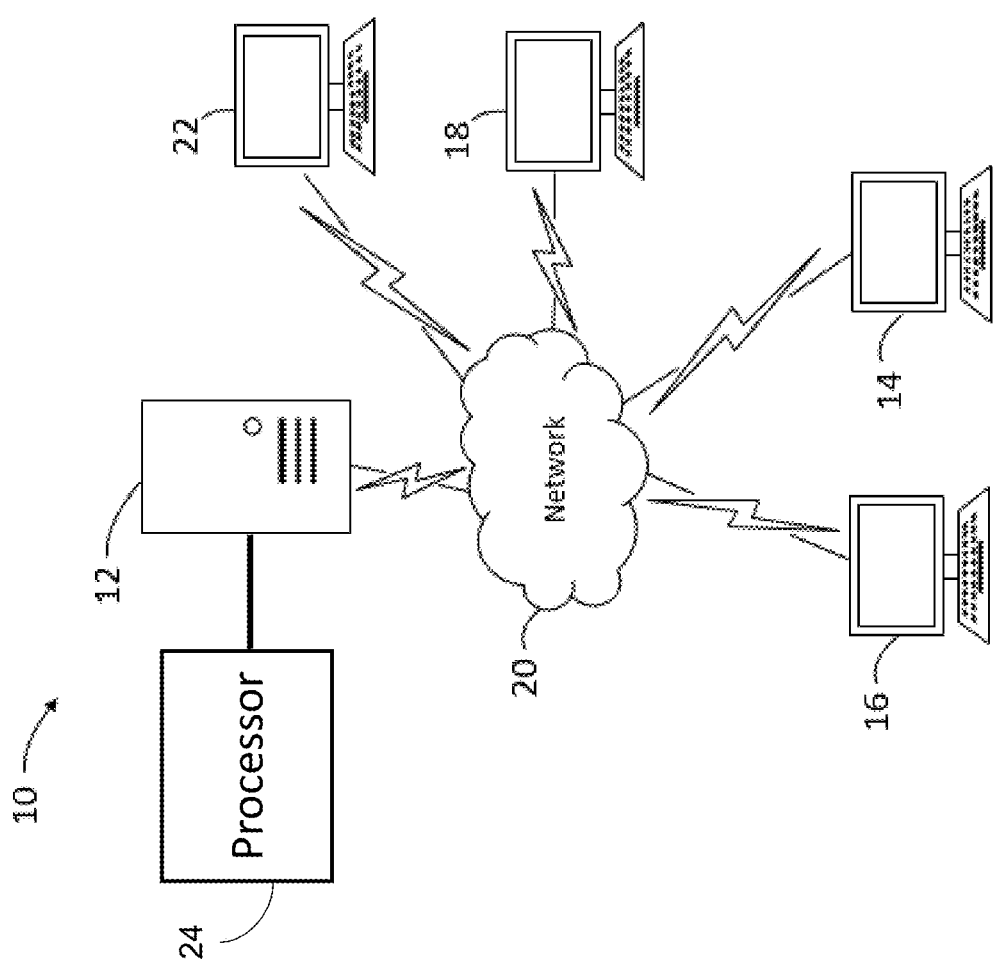
FIG. 1 is a block diagram of a waste management system, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The term "contamination" refers to the presence of a substance in a waste bin that prevents the intended disposal of the contents of the waste bin. For example, contamination may include the presence of non-recyclable materials in a waste bin intended for recycling waste. Contamination of a waste bin may also include presence of a elements which cannot be disposed in a landfill, such as propane tanks, inside a waste bin that is intended for disposal in a landfill. Contamination may also refer to the presence of non-biodegradable elements inside a waste bin intended for organic waste.

The term "controller" as used herein refers to a computer component adapted to control a system to achieve certain desired goals and objectives. For example, this may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term "sensor" refers, without limitation, to the component or region of a device by which is configured to detect the presence or absence of a measurable parameter. For example, the sensor may be a light sensor configured to detect the presence or absence of light, or a distance between objects detected using light reflected off one or both objects. The sensor may also be an ultrasonic sensor as a component in an ultrasonic transducer which includes both a unit of an ultrasonic actuator and the ultrasonic sensor, serving as a transmitter and a receiver, respectively, together in a pulse-echo ranging measurement method using ultrasonic waves.

The term "sensory information" refers to information, data, or measurements collected by a sensor. For example, sensory information from an ultrasonic sensor may include a distance measurement based on a pulse-echo ranging measurement method using ultrasonic waves. The sensory information may also be a distance measurement from a time of flight sensor by measuring the round trip time of an artificial light signal provided by a laser or an LED. Without limitation, sensory information may also include a video feed provided by a camera sensor or multispectral camera sensor.

The term "waste bin" refers to a container for temporarily storing waste. The waste bin may be made out of metal, plastic, or any suitable material for temporarily storing waste. The waste stored in a waste bin can be, without limitation, garbage waste, recycling waste, organic waste, or chemical waste. The term "waste bin" may be used interchangeably with, without limitation, waste container, garbage bin, recycling bin, compost bin, or dust bin.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

FIG. 1 shows a block diagram illustrating a waste management system 10, in accordance with an embodiment.

The waste management system 10 includes a plurality of waste management devices 14, 16, 18. Each waste management device 14, 16, 18 further includes a plurality of sensors configured to sense contents of a waste bin. The waste management device is configured to transmit sensory information from the plurality of sensors. The sensory information from the plurality of sensors is related to the contents of the waste bin. Three waste management devices 14, 16, 18 are shown, however any number of waste management devices greater than one may be possible in the plurality of waste management devices.

The waste management system 10 also includes a server 12 configured to receive and store sensory information transmitted by the plurality of waste management devices 14, 16, 18. The server stores a fill level of the waste bin based on the sensory information.

The waste management system also includes a processor 24 operably connected to the server 12. The processor is configured to determine the fill level of the waste bin based on the sensory information. The waste management system also includes a user device 22 configured to receive, store, and display the fill level of the waste bin.

The waste management system 10 includes a server platform 12 which communicates with a plurality of waste management devices 14, 16, 18 via a network 20. The server platform 12 also communicates with user devices 22. The server platform 12 may be a purpose built machine designed specifically for waste management.

The server platform 12, waste management devices 14, 16, 18 and user devices 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs.

The applications, computer readable instructions or programs may be stored in memory or in secondary storage, or may be received from the Internet or other network 20. Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

In the description that follows, devices such as server platform 12, waste management devices 14, 16, 18 and user devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platform 12. For example, a user using the user device 22 may manipulate one or more input devices (e.g. a mouse and a keyboard) to interact with a user interface displayed on a display of the user device 22. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of waste management devices 14, 16, 18 and user devices 22. Generally, the information may comprise at least an identifier identifying the waste management device or user. For example, the information may comprise one or more of a username, e-mail address, password, or social media handle.

In response to receiving information, the server platform 12 may store the information in storage database. The storage may correspond with secondary storage of the device 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The plurality of waste management devices 14, 16, 18 may be associated with a respective plurality of waste management accounts. Similarly, the user device 22 may be associated with a user account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

Figure 2:
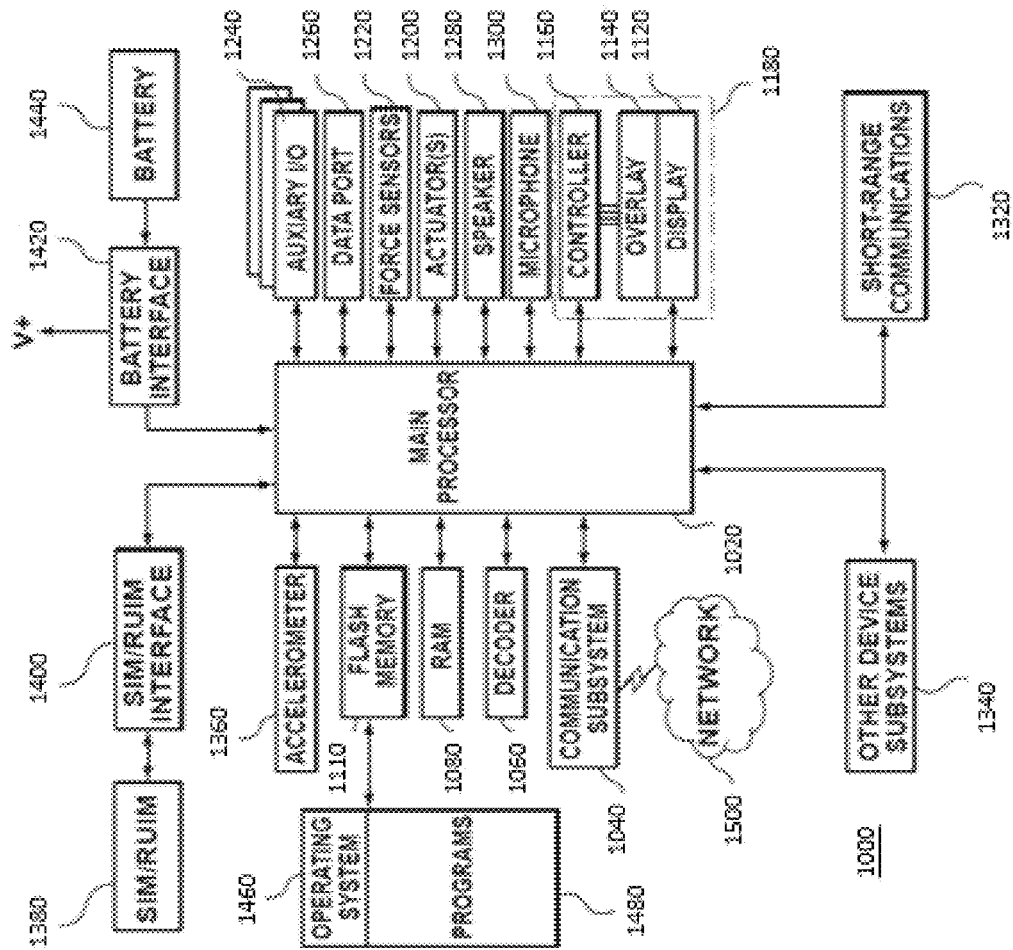
FIG. 2 is a simplified block diagram of components of a mobile device or portable electronic device.

FIG. 2 shows a simplified block diagram of components of a mobile device or portable electronic device 1000. The portable electronic device 1000 includes multiple components such as a processor 1020 that controls the operations of the portable electronic device 1000. Communication functions, including data communications, voice communications, or both may be performed through a communication subsystem 1040. Data received by the portable electronic device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The portable electronic device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the portable electronic device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The portable electronic device 1000 also includes an operating system 1460 and software components 1480 that are executed by the processor 1020 and which may be stored in a persistent data storage device such as the flash memory 1100. Additional applications may be loaded onto the portable electronic device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 3B:
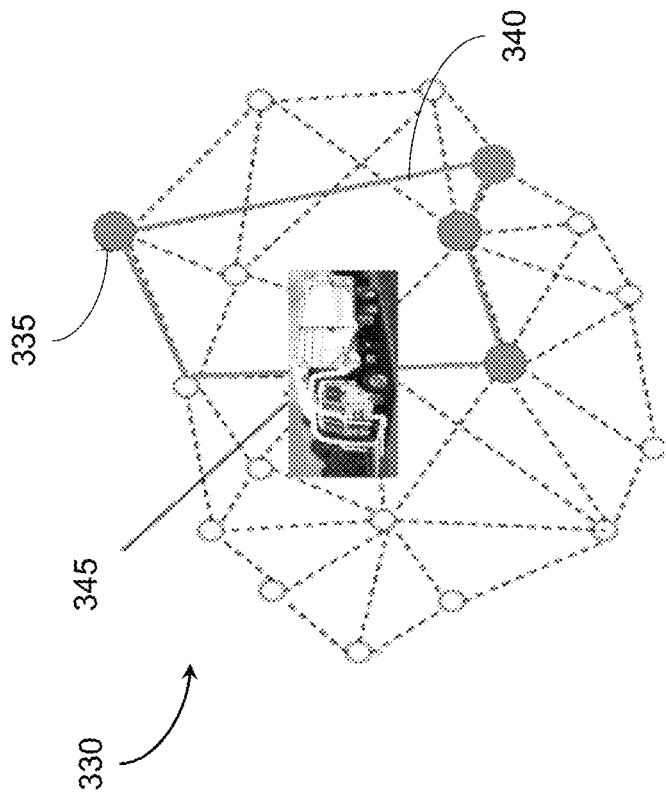
FIG. 3B is a diagram of a method of waste removal where a waste management device and system are used, in accordance with an embodiment.
Figure 3A:
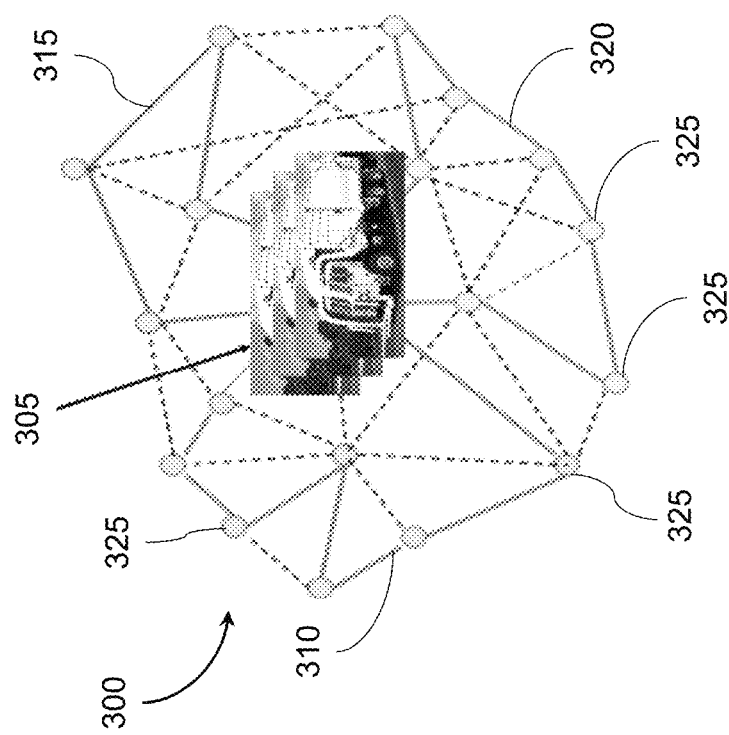
FIG. 3A is a diagram of a method of waste removal where a waste management device and system are not used, in accordance with an embodiment.

Referring to FIG. 3A, a diagram is shown depicting a method 300 of waste removal where a waste management device and system are not used. The method 300 uses a routine waste pick up schedule where three trucks 305 are required to collect waste from waste bins along three different routes 310, 315, 320. The method is extremely inefficient with bins inherently over-serviced and trucks always on the road to pick up bins. Often waste is collected from bins that are not substantially full 325. These additional waste collections lead to increased costs for the customer.

Waste management firms which do not use a sensor or system to detect bin fill levels typically work on a fixed pickup schedule with fixed daily routes. The lack of knowledge of bin fill levels leads to no route optimization, let alone bin "fill level" indicators to produce optimal routing and bin overflow protection. It is extremely inefficient with commercial waste/recycling collection bins inherently over-serviced while waste generation rates continue to increase.

Referring to FIG. 3B, a diagram is shown depicting a method 330 of waste removal where a waste management device and system are used, according to an embodiment. The method uses an optimized route 340 based on sensory information collected from a plurality of waste management devices. The optimized route 340 only collects bins 335 which are substantially filled above a specific threshold, such as at least 50% full, at least 60% full, at least 70% full, at least 80% full, at least 90% full, or 100% full. The optimized route only requires one truck 345 to carry out the collection route 340 and is thereby more efficient and cost-effective.

Figure 4:
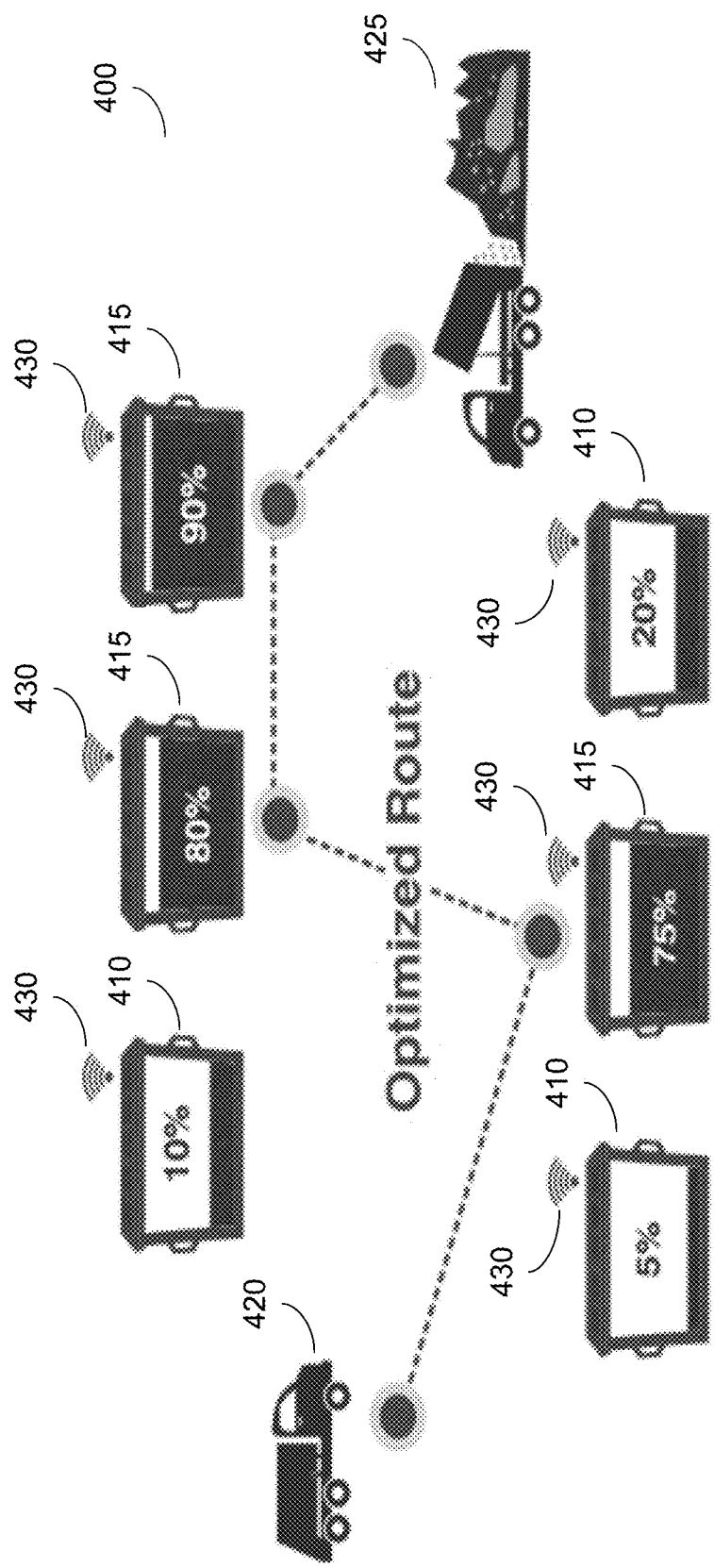
FIG. 4 is a diagram of an optimized route using sensory information collected from a waste management device, in accordance with an embodiment.

Referring to FIG. 4, a diagram is shown depicting an optimized route 400 using sensory information collected from a waste management device. The truck 420 when travelling on the optimized route 400 collects waste only from bins 415 which are above a specific threshold of at least 75%. The truck 420 does not travel to waste bins which are below the threshold. It would be readily understood that the threshold may be any amount set by a user, preferably the threshold is an amount where the waste bin is substantially full. For example, the threshold may be when the fill level is at least 50% full, at least 60% full, at least 70% full, at least 80% full, at least 90% full, or 100% full.

Figure 5:
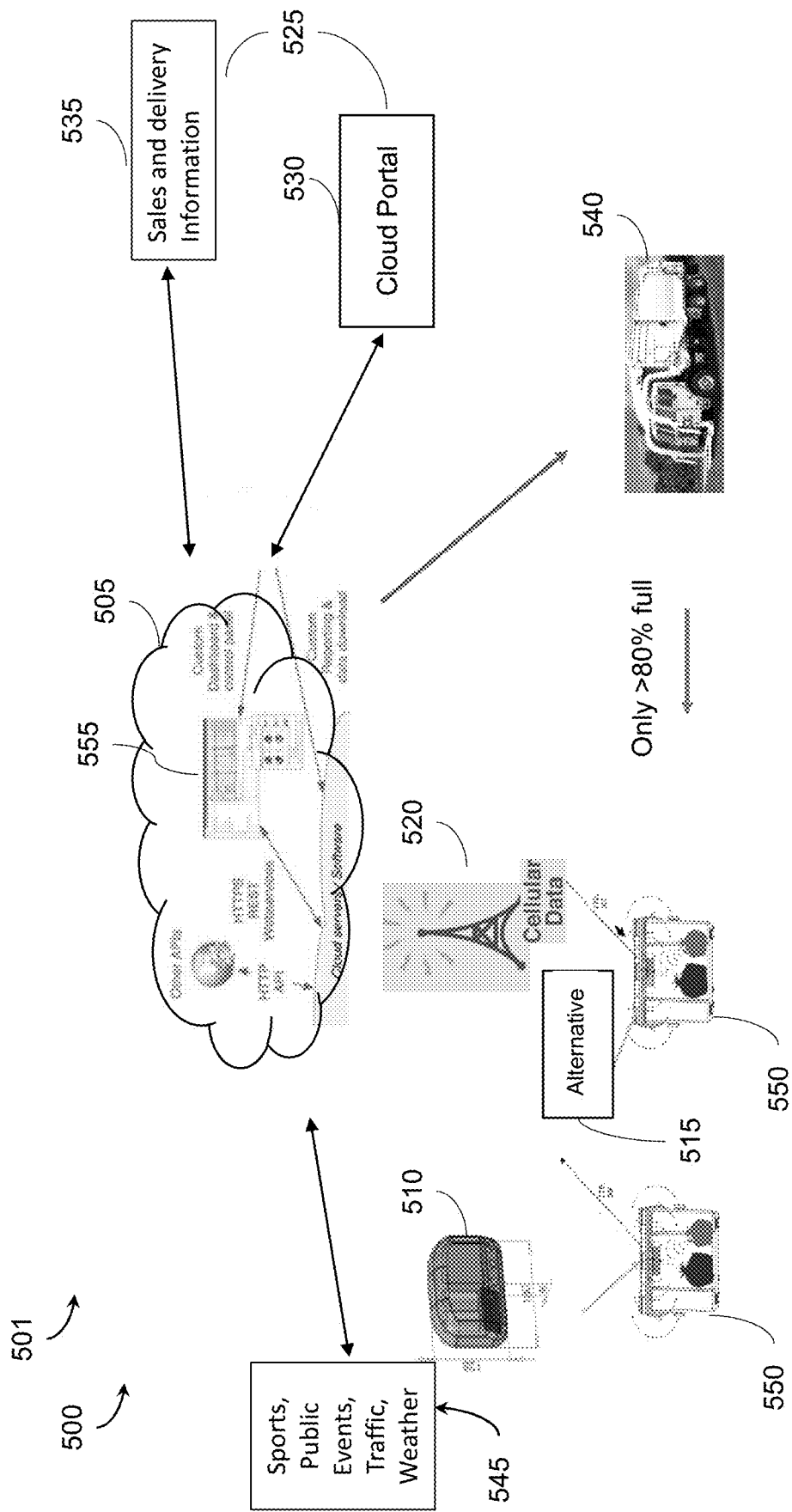
FIG. 5 is a system for managing waste, in accordance with an embodiment.

Referring to FIG. 5, a system 500 and method 501 for managing waste is shown according to an embodiment. A cloud server network 505 is connected to a waste management device 510 with a plurality of sensors via a cellular data connection. The cloud server 505 is also connected to an alternative waste management device 515 with a single sensor via a cellular data connection 520. Sensory information is transmitted from the waste management device 510 and the alternative waste management device 515 to the cloud server network 505. The sensory information of the waste bin 550 may include, without limitation, photos, video, the fill level, location, or temperature.

The cloud server network 505 may use the sensory information to determine analytics which include, without limitation, bin fill history, location, pick up time, temperature, photos of bins, or contamination detection. The cloud server network 505 communicates to custom dashboards, control panels, and allows for custom reporting and data download via a Representational state transfer (REST) architecture which uses Hypertext transfer protocol secure (HTTPS). The cloud server network 505 also communicates through an Application Programming Interface (API) and Hypertext transfer protocol (HTTP) and interfaces with other APIs.

The cloud server network 505 connects with a plurality of user devices 525 which may display a customer cloud portal 530 or sales and delivery information 535. The cloud server uses the sensory information to generate a custom route to navigate a waste collection vehicle 540 to collect waste only from waste bins which are over 80% full.

The cloud server also uses other external data sources 545 such as scheduled sports, scheduled public events, current traffic, and weather when determining an optimized route for collecting waste from a waste bin.

The waste management system 500 includes garbage collection and diversion to recycling. While the system 500 may leverage cloud features for provisioning, updating and interfacing to a new MultiSensor, the system has the capability for interfacing to multiple sensors types and improving sensor capabilities.

The waste management system 500 provides for optimizing garbage collection and diversion to recycling. The system 500 may leverage cloud features by providing a flexible system platform to build out a scaleable implementation for worldwide users and potentially millions of sensors. The waste management system 500 may also tightly integrate with a waste management device 510 via a cellular network 520. The waste management system 500 may also facilitate interfacing/integrating to multiple sensor types available from other sensor manufacturers and other data sources driving business improvements. The waste management system 500 may also facilitate machine learning and AI elements of a post process review of photo data from sensors to indicate contamination/misuse of bin contents.

Reliably knowing the current bin level and contents allows business improvement services to be marketed using waste and recycling services. The waste management system 500, device 510, and methods 501 provide reliability, data consistency, cost efficiencies due to these features.

The waste management system 500, device 510, and method 501 track waste bins providing analysis tools, operations dashboards, routing to waste bins 550 that are substantially full and history for the operation. A key feature is the ability to directly interact with those waste bins 550 using alternative waste management devices 515 such as custom or third party onsite sensors to indicate bin levels and take photos of contents throughout the filling cycle The waste management system, device, and method solves a sustainability problem in waste management by allowing for intelligent control of the pickup of waste bins. Bins are only picked up when they are significantly full as opposed to the "by route" pickup based on what day of the week it is, independent of how much (if any) waste is in the bin.

The waste management system 500 and method 501 includes cloud computing analytics on a cloud server network 505 which allow for managing and analyzing sensory information obtained by waste management devices 510 and alternative waste management devices 515.

The waste management system 500 and method includes specialized wireless sensors on the waste bins 550 for obtaining sensory information related to the contents of the waste bin 550.

The waste management system 500 and method 501 includes system wide dashboards 555 for viewing bin fill levels on user devices 525. The waste management system 500 and method 501 includes routing which allows sensory information to be tracked, displayed and automatically routed for pickup driving.

The waste management system 500 and method 501 provides for information on bin fill levels. The waste management system 500 and method 501 provides recycling bin information on fill contamination. The waste management system 500 and method 501 may provide efficiencies in operations, and improve returns on recyclables by identifying contamination in bins as well as those ready for pickup optimization.

The waste management system 500 and method 501 tracks all waste bins 550 and recycling bins, provides analysis tools, operations dashboards, routing to filled bins and history of bin operations for user devices. A key feature of the waste management system 500 and method 501 is the ability to directly interact with those bins using a waste management device 510 with a plurality of sensors or an alternative waste management device 515 with a single sensor to indicate bin levels and take photos of contents throughout the filling cycle. Sensory information from wastebins 550 come in from cellular connections 520 to the cloud server network 505. Inputs are processed and analytics run to provide alerts and dashboard inputs indicating bin fill history, location, pickup time, temperature, photos of fill, and contamination indications. Analytics data is run to determine waste bins 550 that need to be picked up and this information is passed to a third party routing application for delivery to the relevant commercial waste hauler.

Figure 6A:
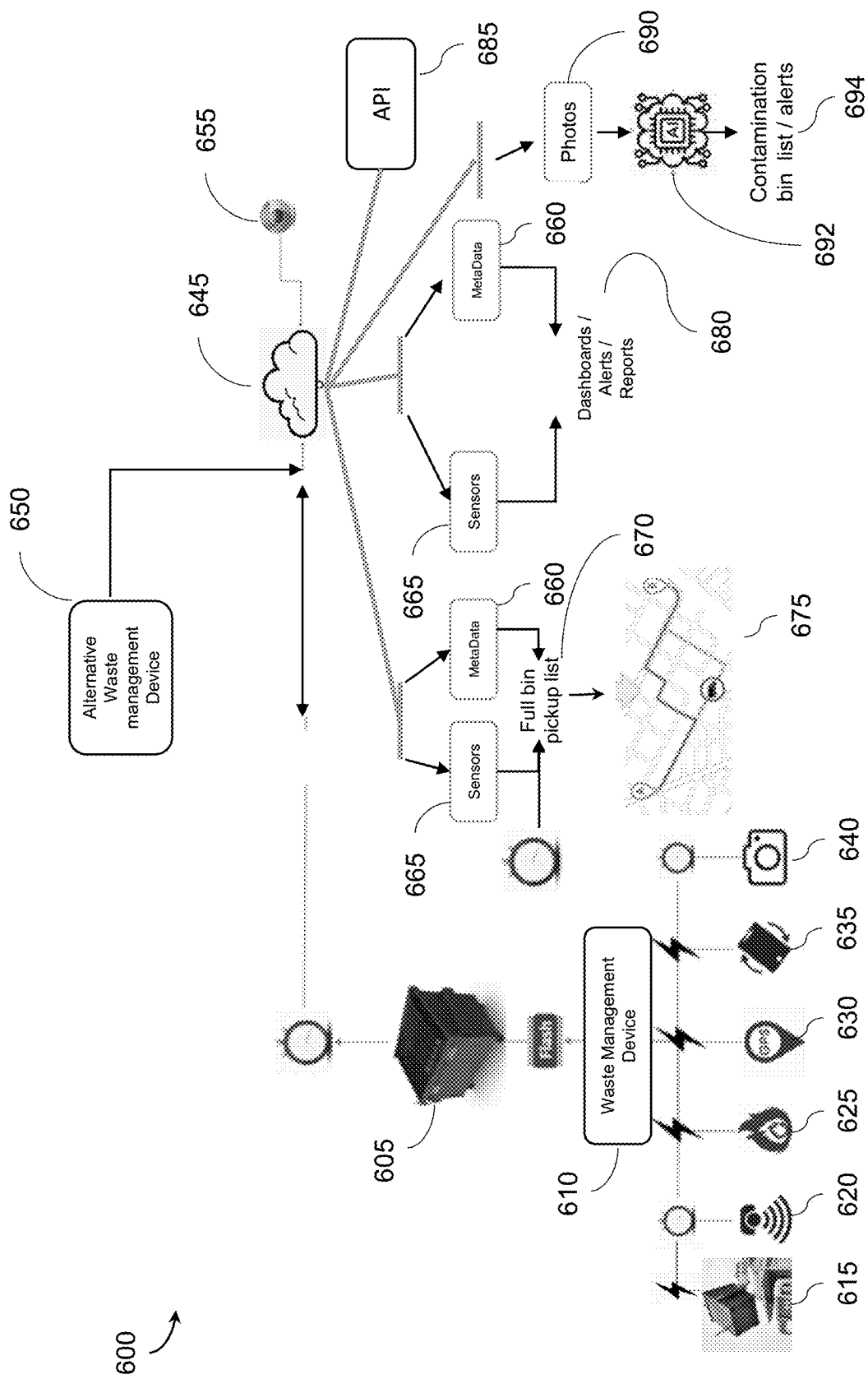
FIG. 6A is an overview a waste management system, in accordance with an embodiment.

Referring to FIG. 6A, an overview of an embodiment of a waste management system 600 is shown. A waste bin 605 has a waste management device 610 attached to the waste bin 605. The waste management device 610 includes a plurality of sensors configured to sense the contents of the waste bin 605.

The waste management device is configured to transmit sensory information related to the contents of the waste bin from the plurality of sensors. The sensory information collected includes waste pick up 615, empty distance (for current fill level calculation) 620, presence of fire 625, GPS location 630, waste bin tilt using an accelerometer 635, or photos and videos 640.

The waste management device 610 transmits sensory information to a server 645. The server 645 may be, without limitation, a cloud server. The server 645 is connected to the internet 655 to allow for obtaining additional information. The server is also connected to alternative waste management devices 650 which includes a single sensor. The server may use an API such as a Compology sensor API or other API in order to interface with the alternative waste management device 650.

The server 645 uses the sensory information collected from the sensors 665, along with metadata 660 from the waste management device 610 or alternative waste management device 650 to generate a full bin pick up list 670 based on the bin fill levels. An optimal route 675 for collecting waste from the plurality of waste bins is identified based on the fill level for each waste bin and the location of each waste bin 605.

The sensory information from the sensors 665, including the photos obtained by camera sensors, and metadata 660 from the sensors are used to display information on dashboards and set up alerts and reports 680 regarding events which occur to the waste bin 605. The server can also interface with other systems through an API 685.

A processor connected to the server 645 is configured to identify contamination 694 in the waste bin 605 based on the sensory information. The contamination is identified using photos 690 collected by a camera sensor 640. The processor implements artificial intelligence or machine learning techniques 692 to identify contamination in the photos. A contamination bin list and alerts 694 are generated based on the waste bins which are identified as containing contamination.

Figure 6B:
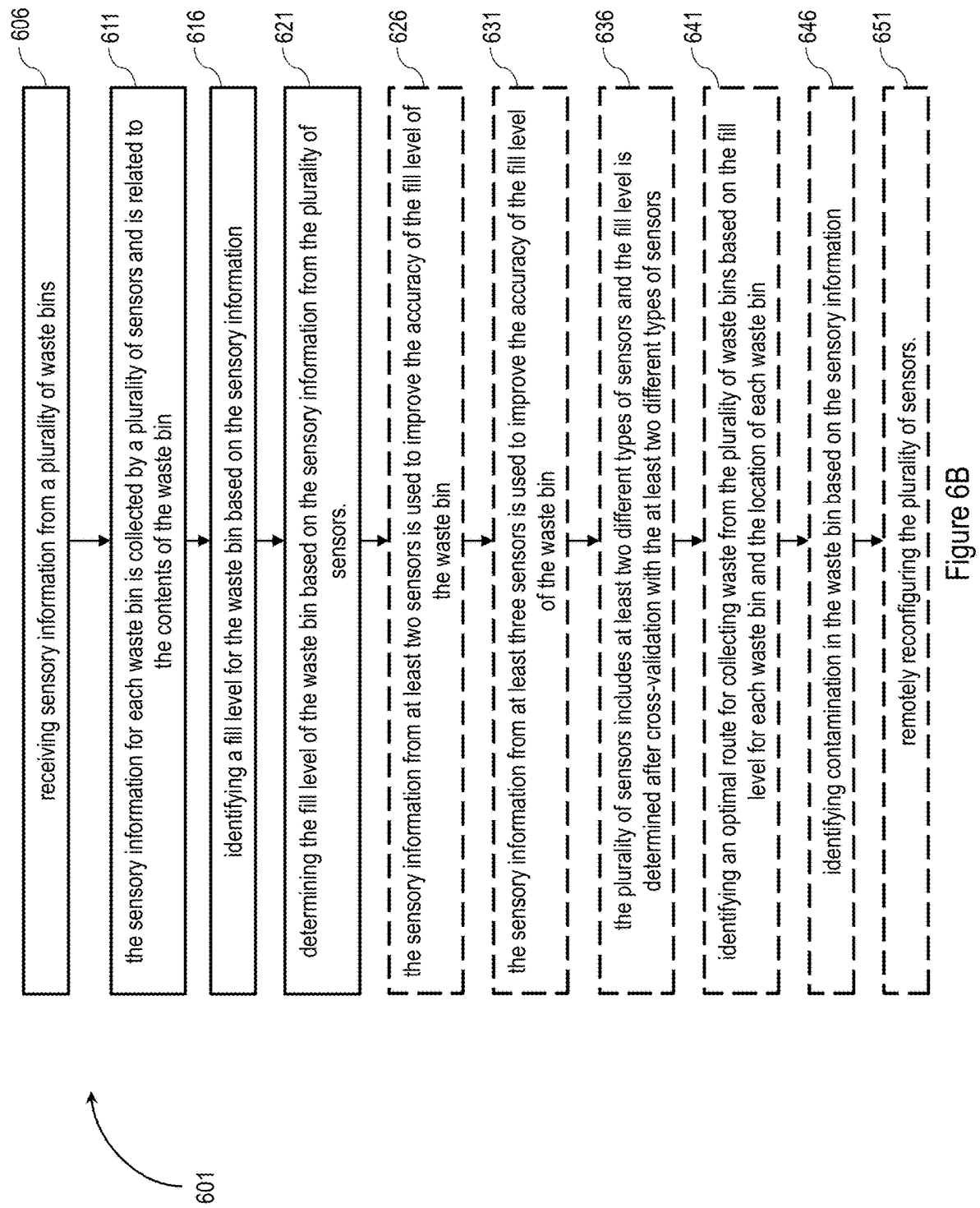
FIG. 6B is a flowchart of a waste management method, in accordance with an embodiment.

Referring to FIG. 6B, a flowchart is shown of an embodiment of a waste management method 601. The waste management method 601, at 606 includes receiving sensory information for a plurality of waste bins. At 611, the sensory information for each waste bin is collected by a plurality of sensors and is related to the contents of the waste bin.

The waste management method 601 also includes identifying a fill level for the waste bin based on the sensory information, at 616.

The waste management method 601 also includes determining the fill level of the waste bin based on the sensory information from the plurality of sensors, at 621.

Optionally, the sensory information from at least two sensors is used to improve the accuracy of the fill level of the waste bin 626. Optionally the sensory information from at least three sensors is used to improve the accuracy of the fill level of the waste bin, at 631.

Optionally, the plurality of sensors includes at least two different types of sensors and the fill level is determined after cross-validation with the at least two different types of sensors, at 636.

Optionally, the waste management method includes identifying an optimal route for collecting waste from the plurality of waste bins based on the fill level for each waste bin and the location of each waste bin, at 641.

Optionally, the waste management method includes identifying contamination in the waste bin based on the sensory information, at 646.

Optionally the waste management method includes remotely reconfiguring the plurality of sensors, at 651.

In an embodiment, an upload timer transmits sensory information periodically 3-4 times per day to the server. The waste management device 610 is configured to periodically wake up and collect sensory information from the plurality of sensors. Some sensors trigger event based sensory information transmission. These include, but are not limited to tilt 615, GPS 630, and fire detection 625. Some sensors are triggered by a time-based interval, including but not limited to, camera sensors 640, multispectral camera sensors, time of flight sensors, radar sensors, lidar sensors, and ultrasonic sensors 620.

In an embodiment, the waste management device 610 stores sensory information locally on the waste management device 610. When sensory information is transmitted to the server 645, optionally a cloud server, the sensory information may be separated into a binary store of image data and time-series store of sensor data. The sensory information is analyzed along with the waste bin metadata to determine the bin fill level, which includes but is not limited to waste bin size, bin fill rate and potential bin contamination.

By combining metadata with the sensory information, an optimal route is planned for each truck on the road. The metadata can include, but is not limited to waste bin locations, number of trucks, time of year, or calendar events.

In an embodiment, the waste management device 610 may incorporate two cellular modems, an accelerometer 635, a temperature sensor 625, a GPS 630 and three ultrasonic sensors combined with a custom multispectral camera. The waste management device 610 may be powered by non-rechargeable primary lithium batteries and will be mounted inside large front load waste bins. The waste management device may provide current fill level measurements, pickup events (emptying of the bin), bin location, and photos of the bin contents.

In an embodiment, the waste management device 610 may be used to determine: if the waste bin 605 has been moved; if the waste bin 605 has emptied; or if the wastebin is on fire 625. The waste management device 610 may be connected to the cellular network intermittently and send sensory information over the cellular network at various time periods depending on the information and on the current configuration. For instance sensory information relating to whether the waste bin 605 has been moved, emptied or is on fire will initiate a connection as soon as possible. Other measurements —such as the "clear of objects" distance measured by the ultrasonic sensors 620— may have a variable period for when to measure that is independent of reporting period (when the waste management device connects to the cellular network and uploads data). The camera photos and other sensor data may be uploaded on an adjustable schedule such as every 8 hours.

In an embodiment, the waste management device 610 may provide for measuring waste bin fill levels, monitoring waste bin pickups and monitoring waste material and analyzing the type of waste.

In an embodiment, a waste management system 610 and method 601 includes recording data of a local event. The local event may be a sporting event or other form of public event. Current waste bin fill levels in the area of the event are reviewed and waste bins with high fill levels are flagged. Waste bins may also be flagged for increased usage. An optimal route 675 is planned to collect the waste from the flagged waste bins in advance of the event.

In an embodiment, a waste management system 600 and method 601 includes recording data of a local planned delivery. The local planned delivery may be a customer deliverable for waste collection. Current waste bin fill levels in the area of at the site of delivery are reviewed and waste bins with high fill levels are flagged. Waste bins 605 may also be flagged for increased usage. An optimal route 675 is planned to collect the waste from the flagged waste bins in advance of the delivery.

In an embodiment, the waste management system 600 and method 601 includes receiving information from an alternative waste management device 650. The waste management system 600 and method 601 receives input from the sensor. The input can either be a direct input, through an API, or by polling an external sensor database. Required alerts are calculated and updated depending on the type of sensor in the alternative waste management device. The dashboards viewing the waste bin with the alternative waste management device are then updated.

In an embodiment, the waste management system 600 and method 601 includes receiving information from a waste bin 605 without a sensor. Historical data entries are manually created or through temporary placement of a sensor. Fill levels are estimated based on historical data entries and a time to full is estimated based on the historical data. The dashboards and waste bin routing lists are updated as necessary to provide operational data.

In an embodiment, the waste management system 600 and method 601 includes using historical data for fill rate estimation and time to full of all waste bins. The estimated fill levels and time to full is compared to against current sensor input where possible and any required alerts are updated depending on the type. Dashboards and container routing lists are updated as necessary to provide operational data especially where sensor check in has not occurred and calculations indicate critical levels.

Figure 7A:
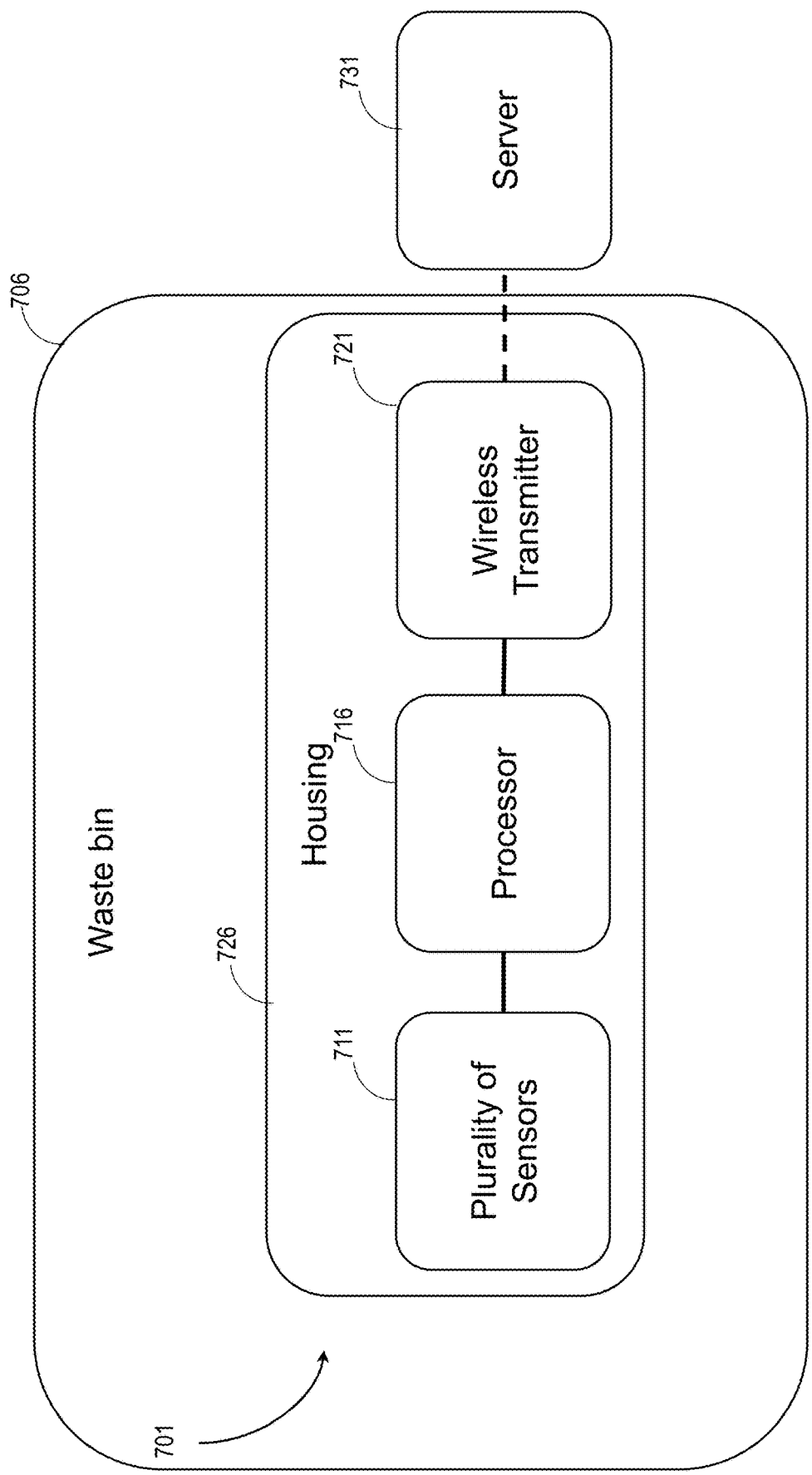
FIG. 7A is a block diagram a waste management device, in accordance with an embodiment.

Referring to FIG. 7A, a block diagram of an embodiment of a waste management device 701 is shown. The waste management device 701 includes a housing 726 attached to a waste bin 706.

The waste management device 701 also includes a plurality of sensors 711 configured to sense contents of the waste bin. The plurality of sensors 711 are encased by the housing 726. The plurality of sensors may also include at least three sensors of the same type.

The waste management device 701 includes a processor 716 electrically coupled to the plurality of sensors 711. The processor 716 is configured to collect sensory information related to the contents of the waste bin from the plurality of sensors. The processor 711 is encased by the housing 726.

The waste management device 701 includes a wireless transmitter 721 electrically coupled to the processor 716. The wireless transmitter 721 is configured to send the sensory information to a server 731. The wireless transmitter 721 is encased by the housing 726.

Figure 7B:
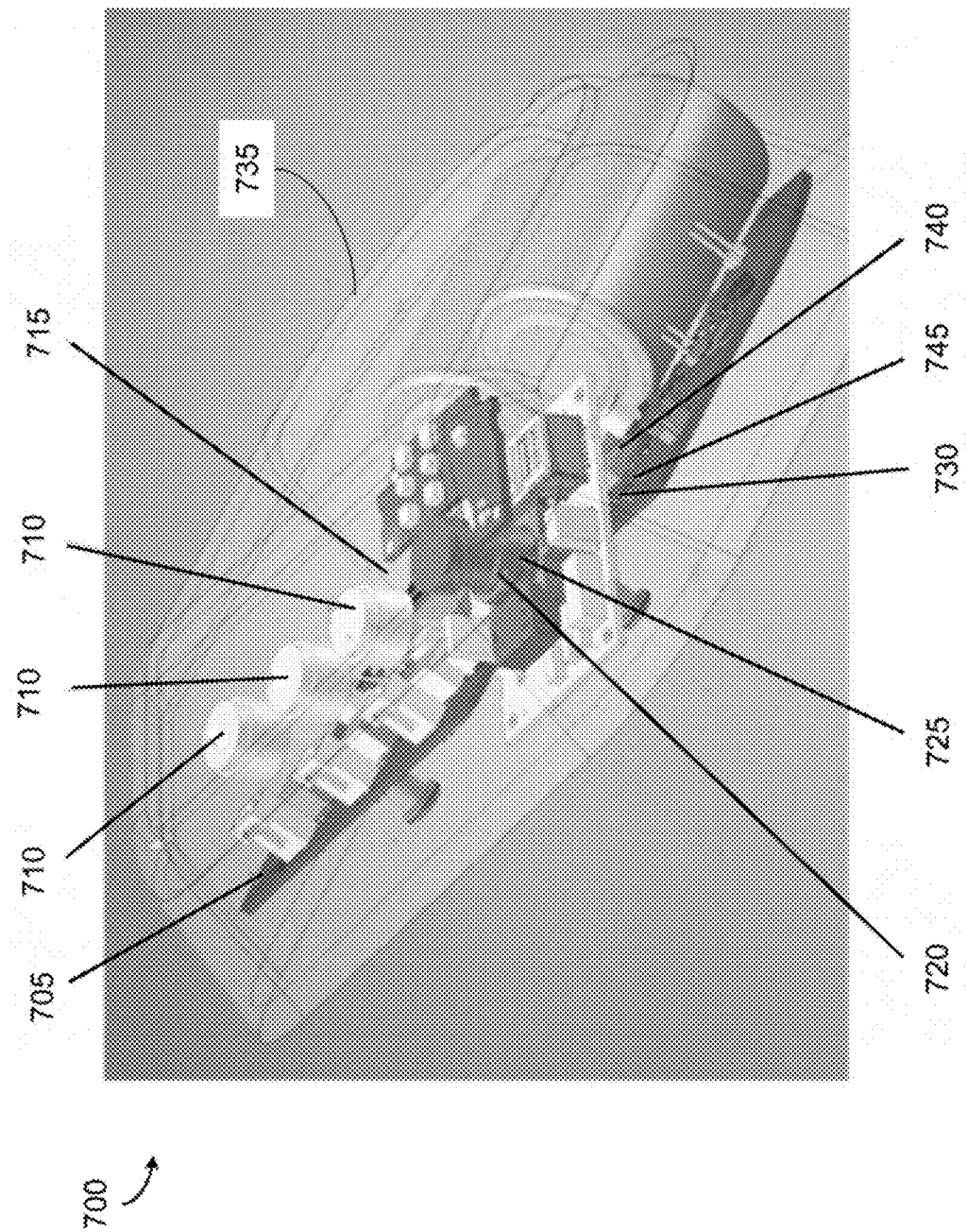
FIG. 7B is a waste management device, in accordance with an embodiment.

Referring to FIG. 7B, an embodiment of the waste management device 700 is shown. The waste management device includes a housing 735. The housing 735 is configured to be attached to a waste bin. The housing 735 may include one or more raised mounting points (not shown) on an external surface of the housing 375 for attaching the waste management device 700 to a waste bin such that the housing 375 contacts the waste bin at the one or more mounting points.

FIG. 7B shows the housing 735 as transparent to provide a view of the internals of the waste management device 700. The waste management device also includes a plurality of sensors configured to sense contents of the waste bin, the sensors are encased by the housing. The sensors include three ultrasonic sensors 710, a magnetic sensor 705, an accelerometer sensor 715, a multispectral camera sensor 720, a camera sensor 725, a temperature sensor 730, and a location sensor 745 such as a GPS. According to some embodiments, the temperature sensor 730 may be disposed on an external surface of the housing 735 to measuring ambient temperature changes indicative of a fire in the waste bin.

The waste management device includes a processor 716 configured to collect sensory information related to the contents of the waste bin from the plurality of sensors 711.

The waste management device also includes a wireless transmitter 740 configured to send the sensory information to a server 731. The wireless transmitter 740 includes a cellular modem.

In an embodiment, the waste management device 700 includes a processor 716 and a camera subsystem. The camera subsystem includes the camera board and it's LED flash board which are connected together and fit into the mechanical enclosure with the master board and system batteries.

The processor 716 can have a variety of inputs. The processor is electrically coupled to a plurality of sensors which include, but are not limited to, a first ultrasonic sensor, a second ultrasonic sensor, a third ultrasonic sensor, an accelerometer, optionally a 3-axis accelerometer sensor 715, a Global Positioning System (GPS) sensor 745, a Temperature sensor 730, a battery level sensor, a magnet sensor 705 for detecting whether a magnet is present or not present, a Bluetooth sensor, or a camera sensor 725, optionally a camera sensor 725 configured to detect ambient light, flash, ultraviolet (UV) light, white light, or infrared (IR) light.

The processor 716 is also electrically coupled to the wireless transmitter 740. The wireless transmitter 740 is configured to send sensory information to a server. The sensory information sent by the wireless transmitter to the server may include, without limitation, a unique sensor ID, distances measured by an ultrasonic sensor, camera photos, current bin tilt angles along an x, y, or z axis, GPS location, temperature, battery level of the waste management device, a battery level alert when the battery level is low, a tilt event, a pickup event, a temperature event, a GPS event, date and time sensor measurements or events, a connection type, RSSI level, a date and time of last successful connection, a count of retries since last successful connection, a date and time missed transmissions, a log of settings changes, over the air (OTA) update success/failure events, a magnet status, the sensor board revision level, the sensor board software version, the camera board revision level, or the camera board software version.

The wireless transmitter 721 may use a cellular network and may communicate without limitation via LTE with a 3G fallback. In some embodiments, the wireless transmitter may send sensory information over LTE, LTE catM, 3G, 2G, Bluetooth, or Wifi networks.

The wireless transmitter 721 may also include a wireless receiver to receive inputs from the server which include, without limitation, security certificates or sensor configuration updates. The wireless receiver may also be configured to receive information for a Received Cell Signal Strength Indicator (RSSI).

In some embodiments, the plurality of sensors 711 of the waste management device 701 includes a multispectrum camera. The multispectrum camera can capture still images, at a variable resolution of up to 1280×800, with different types of illumination and levels of JPEG compression. The types of illumination include, but are not limited to, UV, centre visible, and IR spectrums. The still images can be saved in any digital image file type.

Figure 8:
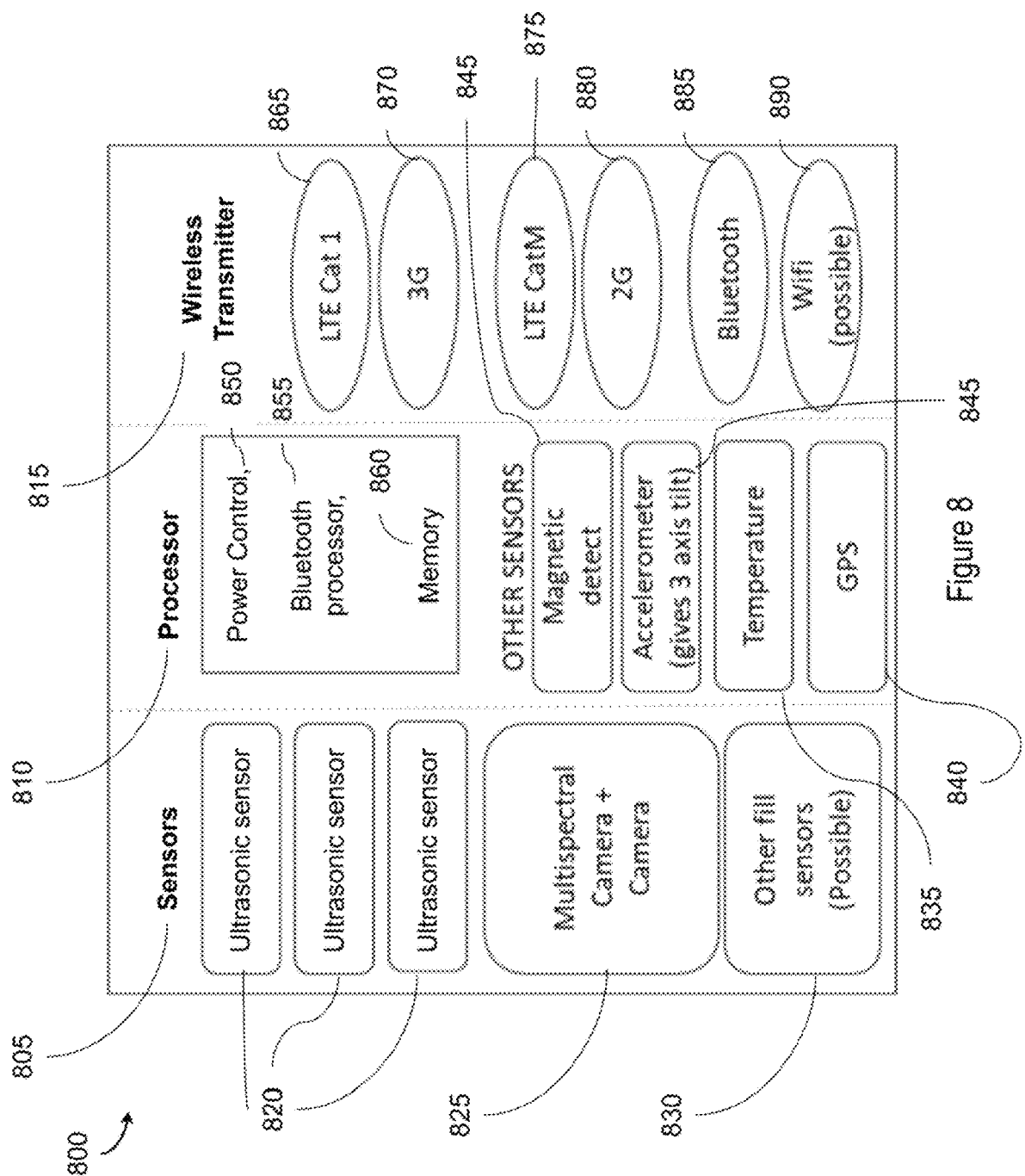
FIG. 8 is a block diagram of components of a waste management device, in accordance with an embodiment.

FIG. 8 shows a block diagram of components of a waste management device 800 according to an embodiment. The waste management device 800 includes a plurality of sensors 805, a processor 810, and a wireless transmitter 815. The plurality of sensors 805 are configured to sense contents of the waste bin. The sensors include three ultrasonic sensors 820, a multispectral camera sensor and a camera sensor combination 825 for detecting the fill level of a waste bin, however a variety of other sensors 830 may be possible for detecting the fill level such as, without limitation, a time of flight sensors, a radar sensor, and a lidar sensor. The plurality of sensors also includes a temperature sensor 835 or a GPS 840 for detecting location, a 3-axis accelerometer 845, and a magnetic detector 850.

The processor 810 is configured to collect sensory information from the plurality of sensors 805. The processor 810 includes power control 850 to control the power state of the waste management device 800. The waste management device 800 also includes a Bluetooth processor 885 to process Bluetooth transmissions. The waste management device 800 is also is configured to store sensory information in memory 860, the memory 860 may be either internal or external memory.

The wireless transmitter 815 is electrically coupled to the processor and configured to transmit the sensory information LTE Cat 1 865, 3G 870, LTE CatM 875, 2G 880, Bluetooth 885, or Wifi 890.

Figure 9:
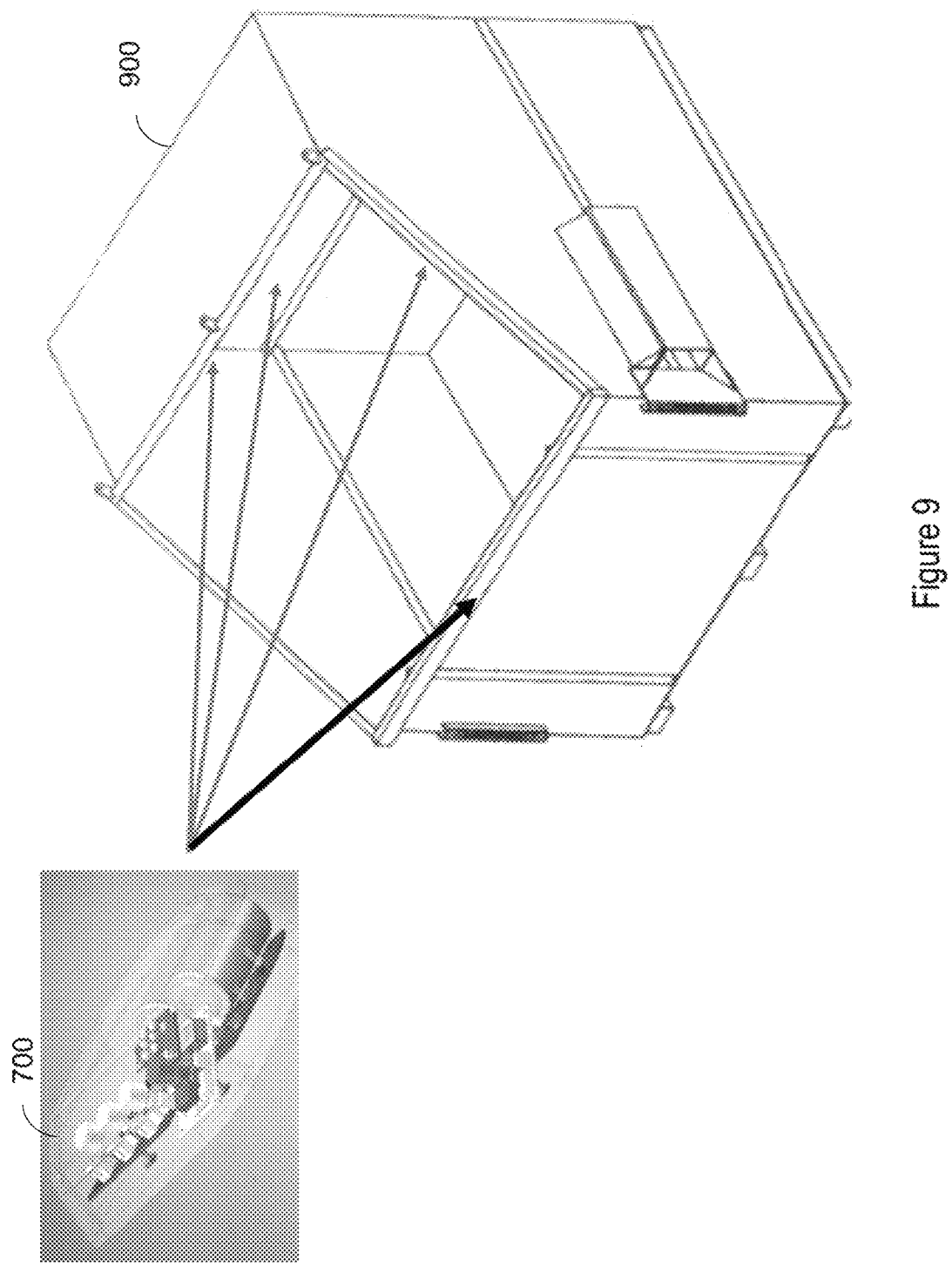
FIG. 9 is the waste management device of FIG. 7A attached to a waste bin.

Referring to FIG. 9, the waste management device 700 is shown being attached the waste bin 900. The waste management device is attached along the interior of the waste bin 900.

Accordingly, the waste management device 700 can be attached to any of the sides or the top of the waste bin. The waste management device 700 is attached to the waste bin 900 such that the sensors can sense the contents of the waste bin 900.

Figure 10:
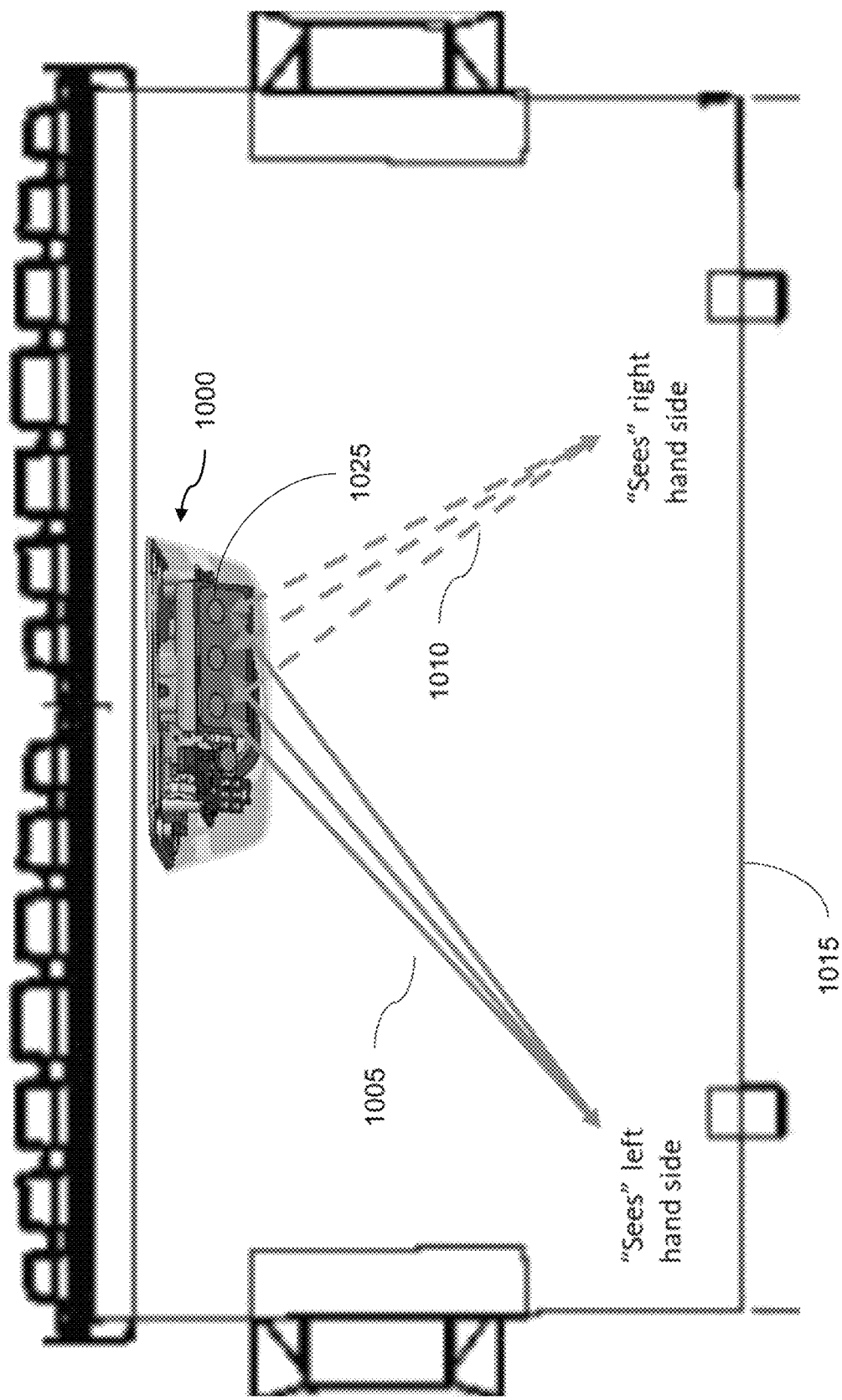
FIG. 10 is a waste management device attached to the top of a waste bin with the plurality of sensors configured in a beamforming arrangement, in accordance with an embodiment.

Referring to FIG. 10, an embodiment is shown of a waste management device 1000 attached to the top of a waste bin 1015 with the plurality of sensors 1025 configured in a beamforming arrangement. An array of three or more sensors of the plurality of sensors allows for beamforming. Individual results from each of the sensors are added together using time delays to increase the strength of the signal from the angle of interest. Changing delay timing changes the angle array and is most sensitive to where the signal comes from. A measurement of time to get a return echo from the direction the pulse was sent is indicative of distance. For an ultrasonic transducer, the distance is calculated from wavelength of the acoustic sound travelling at the speed of sound in air. The plurality of sensors 1025 can be reconfigured with differing time delays to allow for measurement of distance at different points in the waste bin. For example, a first time delay setting 1005 can allow for beam forming to obtain a distance measurement from the left side of the waste bin 1015, while a second time delay setting 1010 allows for beamforming to obtain a distance measurement on the right side of the waste bin 1015.

Figure 11:
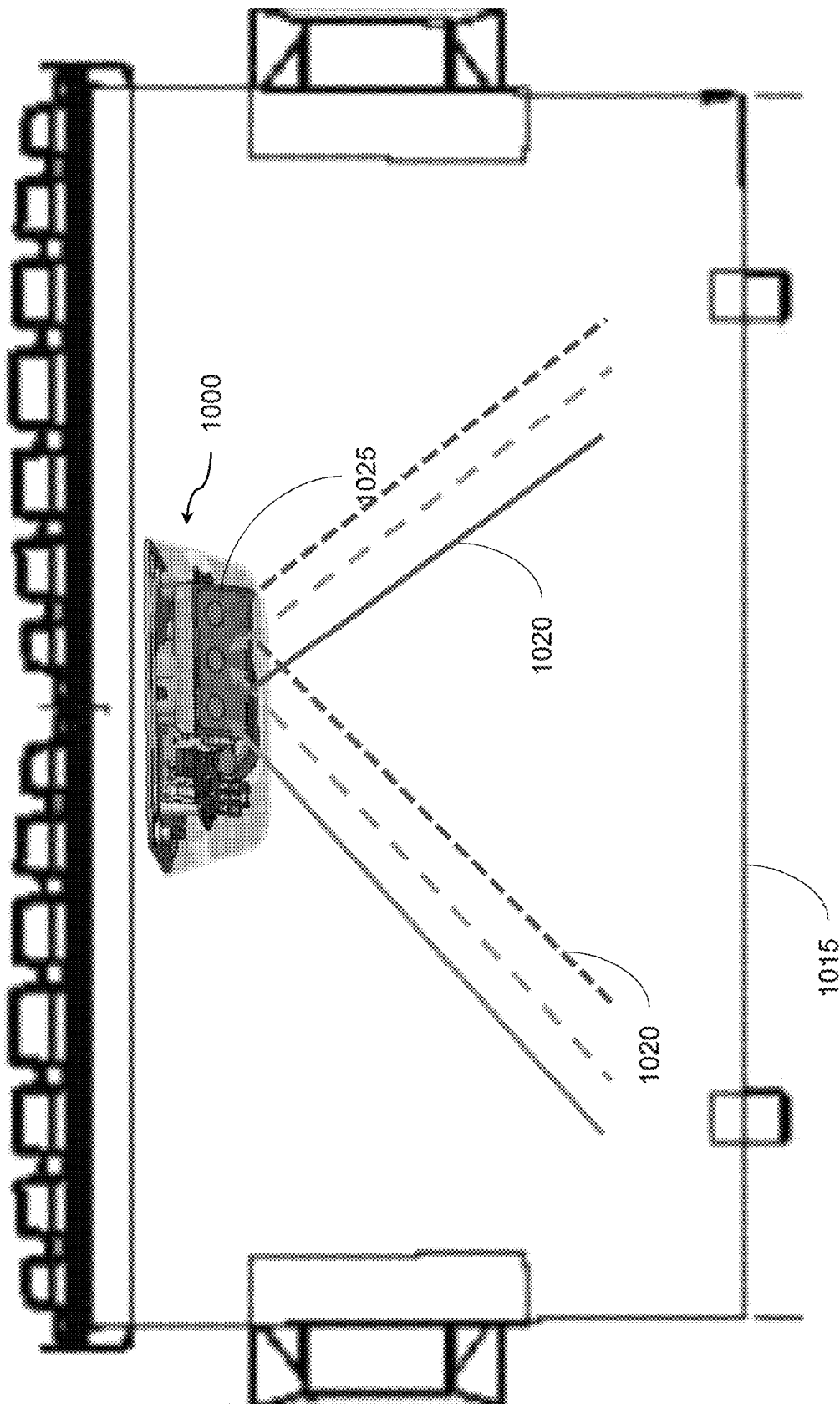
FIG. 11 is a waste management device attached to the top of a waste bin with the plurality of sensors configured to allow for weighted voting, in accordance with an embodiment.

Referring to FIG. 11, an embodiment is shown of a waste management device 1000 attached to the top of a waste bin 1015 with the plurality of sensors 1025 configured to allow for weighted voting. Three sensors of the same type of the plurality of sensors are configured in an array 1020 to allow for weighted voting on sensor distance measurements. Individual calculated distance results from each sensor are subjected to a median algorithm where multiple measurements taken and the smallest and largest measurements are eliminated and the median value of rest is kept as the valid measurement and then compared other sensors values with 2 out of 3 voting to select the most likely real value for the clear distance remaining in the waste bin. The use of multiple sensors of the same type allows for improved accuracy of the sensor reading. Without limitation, a person skilled in the art would readily understand a variety of other methods could also be used for obtaining a combined measurement. For example, the values could alternatively the mean or mode value of the measurements could be used.

Figure 12:
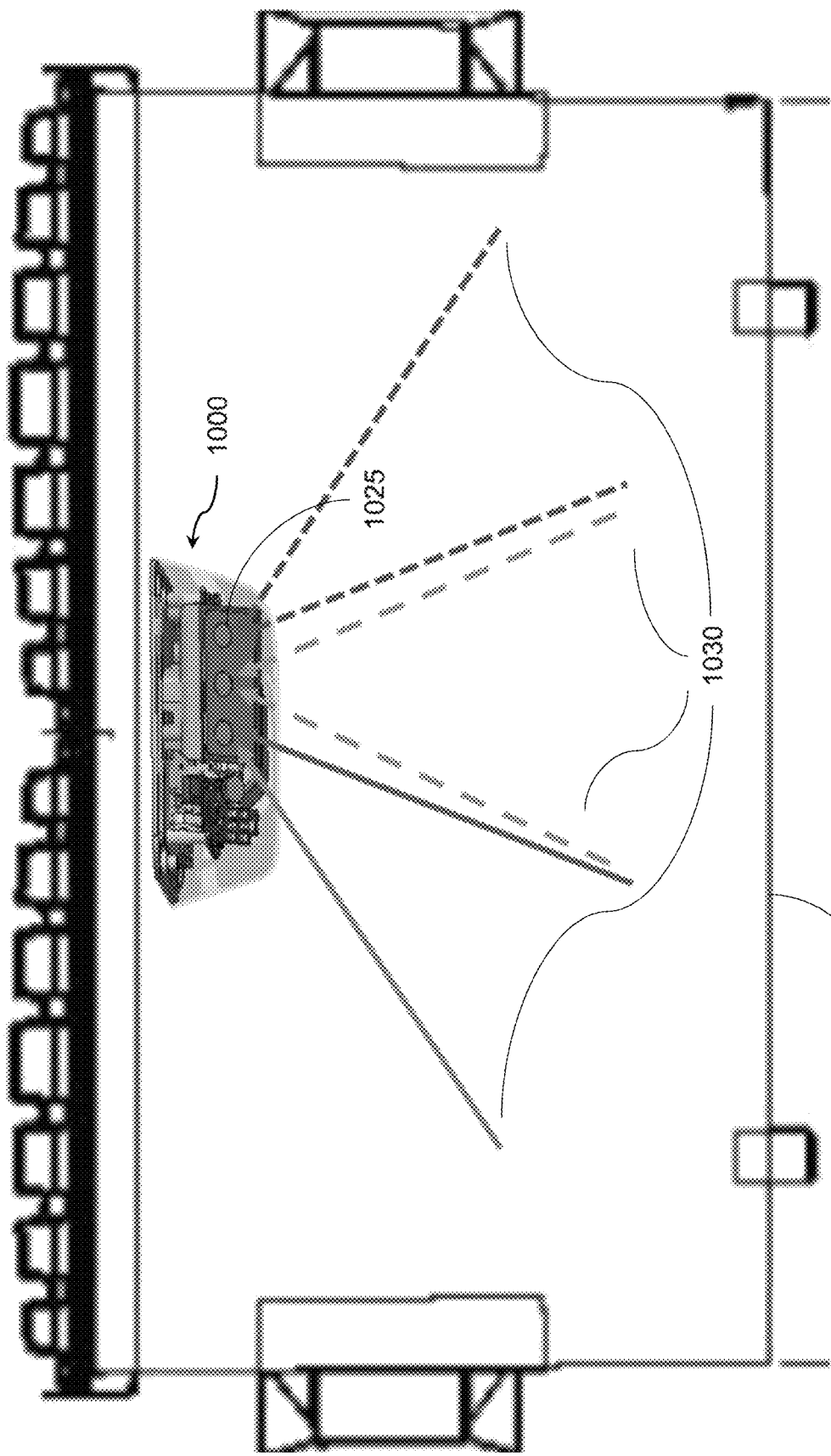
FIG. 12 is a waste management device attached to the top of a waste bin with the plurality of sensors configured in different directions, in accordance with an embodiment.

Referring to FIG. 12, an embodiment is shown of a waste management device 1000 attached to the top of a waste bin 1015 with the plurality of sensors 1025 configured in different directions 1030. An array of sensors of the same type allows location specific distance measurements within waste bin by orienting the sensors in different directions in the waste bin. Individual calculated distance results from sensors may still be subjected to a median algorithm but each sensor distance represents a portion of a fill level map of the waste bin, thereby providing a more accurate overall fill level than measurements of a single point of the waste bin 1015.

More sensors allow for better collection of sensory information from the waste bin 1015 and more measurements of the fill level at different points in a waste bin 1015 resulting in better estimates for the fill level than if only one sensor was used. Multiple sensors of 3 or more means that the sensors could be used in an array with computable directional sensitivity. For example, with at least 3 or more sensors, the waste bin 1015 can be scanned by adding portions of sensor responses to other sensor values to increase sensitivity selectively in a particular direction then redoing this with other portions of the sensor responses, thereby also increasing the sensitivity in a different direction. This enables multi-directional readings without moving the sensor.

The plurality of sensors 1025 improves over the use of a single sensor by providing multi directional responses, software changeable directional responses, and response verification through the comparison between sensors within that sensor type to improve the accuracy of a measure of the waste bin fill level being measured by the sensor.

Figure 13:
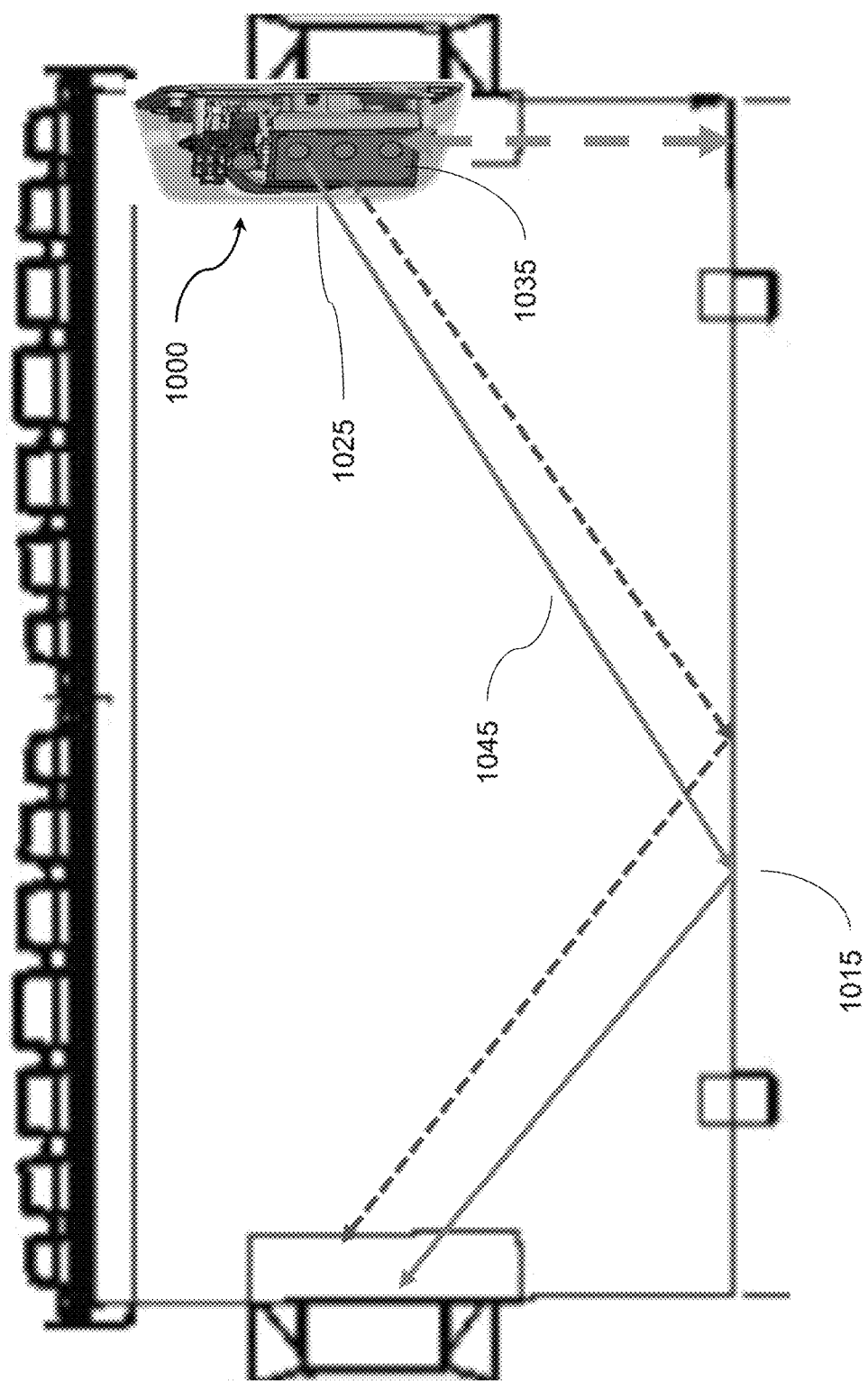
FIG. 13 is a waste management device attached to the side of a waste bin with the plurality of sensors configured such that a sensor is configured to be oriented in a direction to confirm the distance to the bottom of the waste bin, in accordance with an embodiment.

Referring to FIG. 13, an embodiment is shown of a waste management device 1000 attached to the side of a waste bin 1015 with the plurality of sensors 1025 configured such that a sensor 1035 is configured to be oriented in a direction to confirm the distance to the bottom of the waste bin 1015. Dedicating a single sensor from the set of same type allows specific distance measurements to the bottom of the waste bin when empty. Ultrasonic sensors suffer a serious flaw in that a lack of reflected signal from an object, such as when nothing is located in the time of flight window 1045, is identified by the sensor as the same as something is too close to the sensor, as the sensor is still ringing from drive pulses. If the sensor does not see an object, the measurement given by the sensor will be the maximum distance of the sensor and if the waste bin 1015 is full and an object is too close to the ultrasonic transducer, it also puts out the maximum distance reading (interpreted as empty). Configuring at least one sensor 1035 to be oriented in a direction to confirm the distance to the bottom of the waste bin 1015 solves the problem with the use of existing sensors as there is a guaranteed distance to reflect from when the waste bin 1015 is empty.

Referring to FIG. 14, an embodiment is shown of a waste management device 1000 attached to the top of a waste bin 1015 with the plurality of sensors including a sensor that is tuned 1115 and another sensor that is untuned 1105.

Graphs are shown representing the signal strength of the tuned sensor 1125 vs the untuned sensor 1135. The untuned sensor 1135 provides a weaker signal than the tuned 1125 sensor despite sensing the same contents.

The plurality of sensors 1025 can be reconfigured by the server by remotely tuning the plurality of sensors for optimal signal return based on the material being scanned. Adjustment for power output, length of pulse train, time varying gain and thresholds allows for customization insitu.

The ability to reconfigure the plurality of sensors 1025 remotely improves over fixed sensors which cannot be reconfigured without manually changing the circuit board. Reconfiguring sensors allows the sensor to provide better, more consistant and accurate results. In the case of ultrasonic transducers, having changeable driving voltage, number of excitation pulses, and response sensitivity on the fly allows for improved distance measurements for the ultrasonic sensor. Reconfiguring specifically for the material being measured means improved signal to noise ratios and more consistent and accurate measurements which leads to better efficiencies in the operation with less garbled or erroneous signaling. In the case of the multispectral camera, the tuning allows for photos that maximize the returned images contrast and tonal depth dependent on the materials in the waste bin 1015 or contaminant in the waste bin 1015.

The tunable nature of ultrasonic sensors and camera sensors allows for maximization of signal to noise ratios and therefore provides better consistent, better quality measurements.

Referring to FIG. 15, an embodiment is shown of a waste management device 1000 attached to the top of a waste bin 1015 with the plurality of sensors 1025 including a sensor that is tuned 1215 by artificial intelligence (AI) or machine learning techniques and another sensor that is untuned 1205. Whereas the untuned sensor is unable to detect the type of object 1235 in the waste bin 1015, the AI tuned sensor is able to detect 1245 the contamination 1225.

The server 731, optionally a cloud server, can provide for detection of contamination using camera and multispectral camera sensors by reconfiguring the plurality of sensors for optimal visual recognition of the contamination 1225 based on an AI or machine learning algorithm. The AI can be trained to detect the presence of contamination by training a machine learning model to recognize images of the related contamination. The AI is trained using high quality known datasets of labelled images. This known content allows the AI learning algorithm to correctly set itself up. Data sets can be generated by a number of methods, for example a method may be to use Amazon Mechanical Turk (AMT) and crowdsource for data validation against the provided data to generate a known dataset for training. AMT would go through provided photos from waste bins and annotate those with the discernable contamination and the type. This annotated subset would be used for training an AI.

Figure 16:
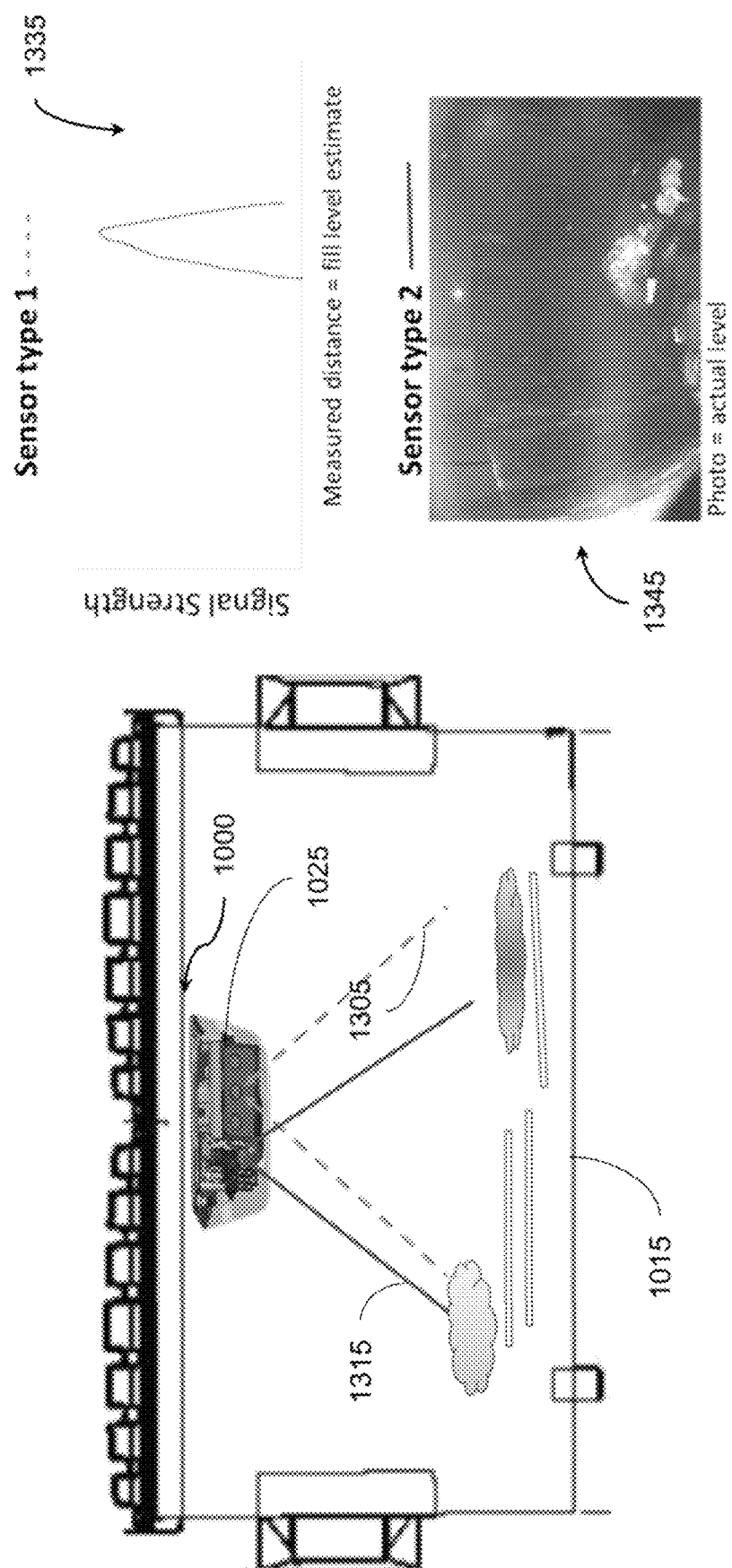
FIG. 16 is a waste management device attached to the top of a waste bin with the plurality of sensors including at least two different types of sensors for cross-verification, in accordance with an embodiment.

Referring to FIG. 16, an embodiment is shown of a waste management device 1000 attached to the top of a waste bin 1015 with the plurality of sensors 1025 including at least two different types of sensors for cross-verification.

Determining the fill level based on the sensory information of at least two different types of sensors allows for cross verification of a sensor signal. The first sensor signal 1305 is shown detecting a signal 1335, however, upon verification with the camera sensor 1315, the actual fill level is verified 1345 and the first sensor reading and its resulting fill algorithm 1305 is adapted to more closely correlate with the visual sensor. For example, if sensor type 1 was indicating a fill level of 25% but sensor type 2 showed 35% an offset could be added to sensor 1 type readings by 10% so sensor type 1 would read 35%. Correcting sensor measurements is particularly powerful once the known correlation is found so that the correlation can be used without reference to sensor type 2. If sensor type 2 became occluded and an image could not be viewed to determine the fill level, the corrected sensor type 1 can be used to continue with an accurate fill level even though sensor type 2 is no longer working. In a similar manner, sensor type 1 can be used alone in the same type of bin to allow for obtaining an accurate fill level.

Using at least two different sensor types means that the results of the remote measurements can be cross-correlated against any single sensor type providing a mechanism for confirmation of correct operation and remote calibration which improves the accuracy of the readings leading to better efficiencies in the system operation.

Cross verification of the sensors in the device provides a large improvement over the use of a single sensor by allowing for remotely confirming correct and accurate operation of the sensor type, providing a mechanism for the sensor type to be remotely calibrated and providing parallel but different measurement technologies which also can significantly extend the time between service calls to the device as both sensor types would have to be impacted before service would be required.

Figure 17:
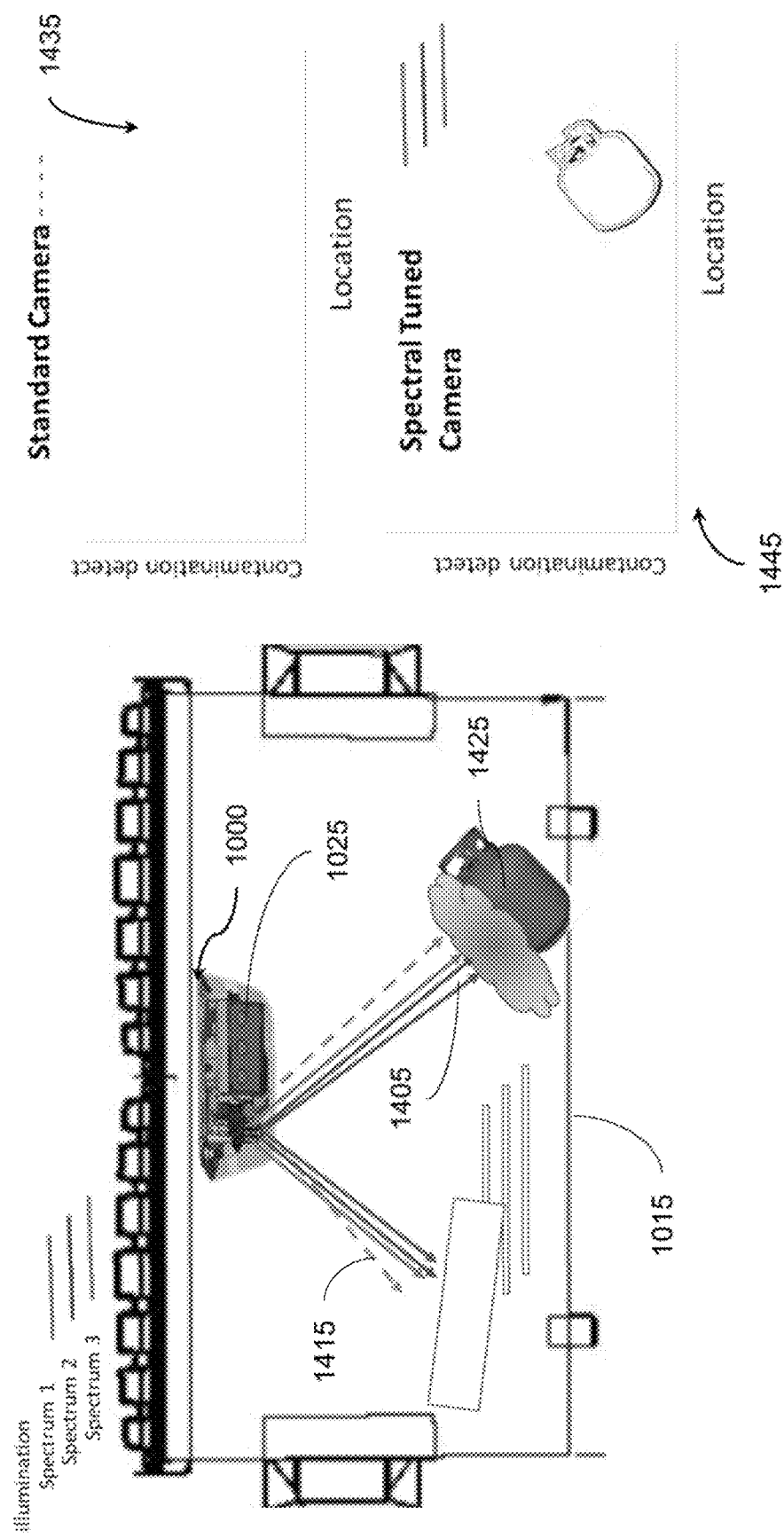
FIG. 17 is a waste management device attached to the top of a waste bin with the plurality of sensors including a multispectral camera sensor and a visible light camera sensor, in accordance with an embodiment.

Referring to FIG. 17, an embodiment is shown of a waste management device 1000 attached to the top of a waste bin 1015 with the plurality of sensors 1025 including a multispectral camera sensor 1405 and a visible light camera sensor 1415. While the visible light camera sensor 1415 is unable to provide an image under the lighting conditions 1435, the multispectral camera sensor is able to provide an image of the screened propane tank after configuring the sensor for the relevant lighting conditions 1445. Sensors can be tuned for optimal visual definition based on the light used during image capture. Adjustment for illumination wavelength affects the returned light spectrum and highlights different features from normal visible light spectrum. Sensory information from the multispectral camera sensor 1405 can be also be used to determine contamination in waste bin 1015. AI and machine learning techniques can be applied by the server in order to detect contamination using sensory information collected by the multispectral camera sensor 1405.

Using a multispectral camera sensor 1445 significantly extends the capability to highlight items shown in the photograph taken based on the spectrum of light used for illumination.

The multispectral camera sensor 1445 improves on the use of a visible light camera sensor alone because photographs depend on reflected light to determine what shows in the image. Different materials reflect light differently depending on the wavelength illuminating the material. The different percentage of reflectance of materials depending on lighting spectrum used means that the visible feature set in a photo is different under different frequencies of light.

Showing different materials more clearly allows better human interpretation. Further, sensory information from the multispectral camera sensor allow for improved machine learning and artificial intelligence training and thereby providing more consistent and accurate contamination determination which leads to better efficiencies in the operation. In the case of the multispectral camera 1445 the tuning allows for photos that maximize the returned images contrast and tonal depth dependent on the materials in the waste bin or contaminant in the waste bin 1015.

Figure 18:
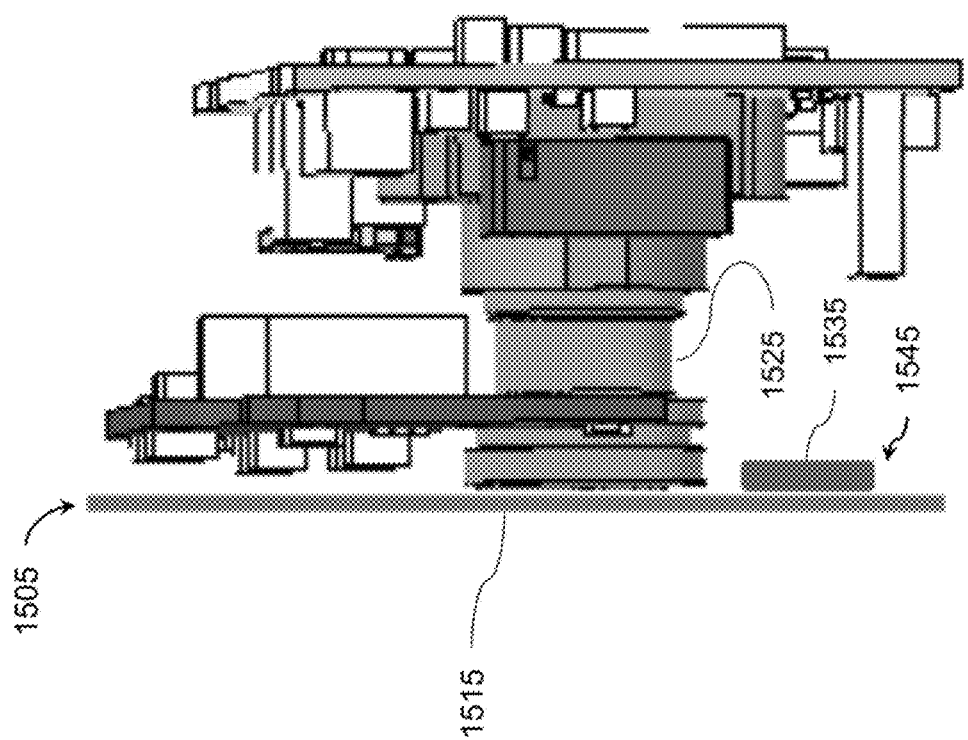
FIG. 18 is a sensor of the waste management device with a protective lens to prevent occlusion of the sensor and a mechanism for cleaning the lens, in accordance with an embodiment.

Referring to FIG. 18, an embodiment of a sensor of the waste management device is shown with a protective lens 1505 to prevent occlusion of the sensor 1525. The protective lens is configured to prevent occlusion of at least one sensor of the plurality of sensors.

The waste management device uses a protective lens 1505 which is a special high impact, scratch resistant lens cover glass that has an anti-stick coating 1515 to prevent detritus sticking to it. A displacement device 1535 is also used alongside the anti-stick coating for displacing detritus and preventing occlusion of the sensor 1525.

The displacement device is a vibrational device 1545 which can be vibrated at a fixed or variable frequency and driving voltage. The vibration device 1545 is used for driving vibrations into the protective lens 1505 and cleaning it by ejecting material on the surface.

In an embodiment, the protective lens 1505 allows for mechanisms to clean off the protective lens 1505 material and prevent materials from sticking to the cover material.

The protective lens 1505 improves the sensory information obtained by the plurality of sensors 1025 because photographs depend on reflected light reaching the lens of the camera. If the lens cover material becomes obscured, the sensor, and therefore the waste management device 1025, becomes impaired or useless for its measurement task until a physical visit is made to the location with cleaning materials. Even with proper and careful cleaning the protective lens 1505 can become scratched or otherwise permanently occluded. Extending the time until the sensor 1525 is occluded or preventing the protective lens 1505 from becoming occluded are significant improvements driving productivity, lowering costs and raising efficiency.

The waste management device 1025 uses a protective lens 1505 which is a high impact, scratch resistant cover glass that has coatings to prevent detritus sticking to it combined with a displacement device 1535 for driving vibrations into the cover glass material cleaning it by ejecting material on the surface.

Figure 19:
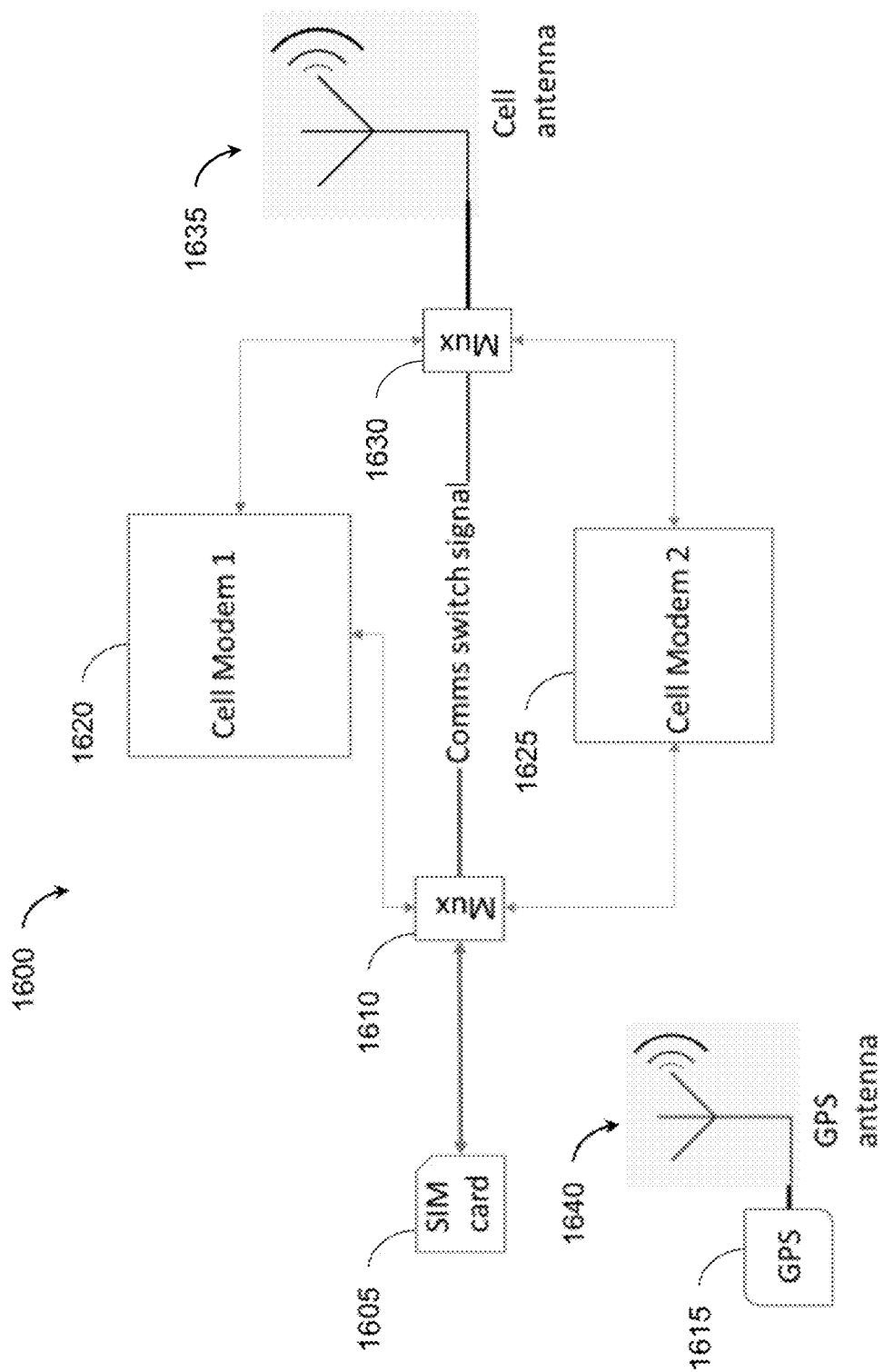
FIG. 19 is a block diagram of a wireless transmitter of the waste management device, in accordance with an embodiment.

Referring to FIG. 19, a block diagram of an embodiment of the wireless transmitter 1600 of the waste management device 1025 is shown. The wireless transmitter 1600 incorporates multiplexers (muxs) 1610, 1630 to allow the use of a single sim card and cell antenna for multiple modems.

The multiplexer allows for switching between cell modem 1 1620 and cell modem 2 1625. The wireless transmitter 721 also includes a cell antenna 1635 for transmitting the cellular signal.

A GPS antenna 1640 is also included to allow for transmitting and receiving a GPS signal from the GPS sensor 1615 without the cell modems being turned on.

In an embodiment, the wireless transmitter 721 includes at least two cellular modems and is configured to be compatible with several networks. The at least two cellular modems allow connection wherever there is a cellular network because all networks are supported.

The use of multiple modems allows for improved connection for devices which are stationary. The use of a single cellular modem was built for mobile devices. They are predicated on the concept of connection wherever the network is and assume that if the network is not present the device will move or soon be moving to a location with a network connection. The use of multiple cellular modems improves the use of a mobile cellular modem in a device which is attached to static, non-moving waste bin. If the sensor cannot move from where it is attached it needs to connect from wherever it is located. With multiple modems sharing common peripherals the waste management device can reliably connect wherever a network is present independent of the type of network whereas the closest embodiment often barely connect to a network as the single type of network it needs is barely available or not even present.

Figure 20:
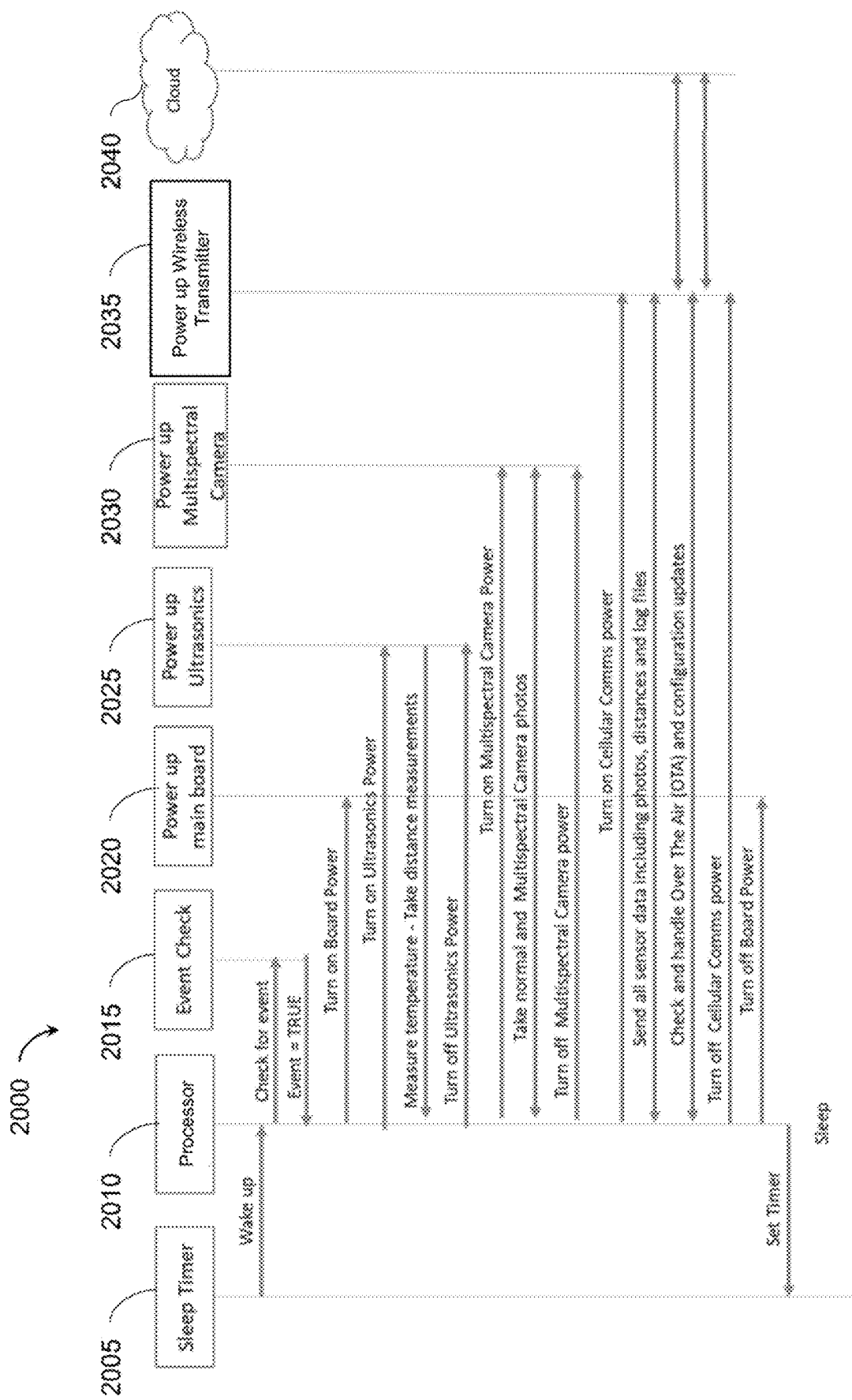
FIG. 20 is a flow diagram of a sensor firmware operation method, in accordance with an embodiment.

Referring to FIG. 20, a flow diagram shows an embodiment of a sensor firmware operation method 2000. A sleep timer 2005 allows for waking up the processor 2010, the processor 2010 is also configured to modify the sleep timer 2005. The processor is configured to check for an event 2015, if the event is returned as true, the processor is configured to turn on power to the board 2020 and can conduct different acts based on the event. The processor 2010 is also configured of turn off power to the board 2020.

The processor 2010 is configured to turn on the ultrasonic sensor 2025 and collect distance measurements, alternatively the processor 2010 is configured to collect temperature measurements from a temperature sensor. Following the measurements, the processor 2010 is configured to turn off the ultrasonic sensor 2025.

The processor 2010 is also configured to turn on the multispectral camera sensor 2030 and camera sensor. The processor 2010 is configured to collect multispectral images and camera images from the multispectral camera sensor 2030 and camera sensor respectively. Following collection of the images, the processor 2010 is configured to turn off the multispectral camera sensor 2030 and camera sensor.

The processor 2010 is also configured to turn on the wireless transmitter 2035. The processor 2010 is configured to send the sensory information collected from the plurality of sensors, including without limitation the photos, distances, and log files, to the wireless transmitter. The processor is also configured to check for OTA updates through the wireless transmitter and to install updates once they are received by the wireless transmitter 2035. The processor 2010 is also configured to turn off the wireless transmitter 2035. The wireless transmitter 2035 is configured to connect with a cloud server 2040.

Figure 21:
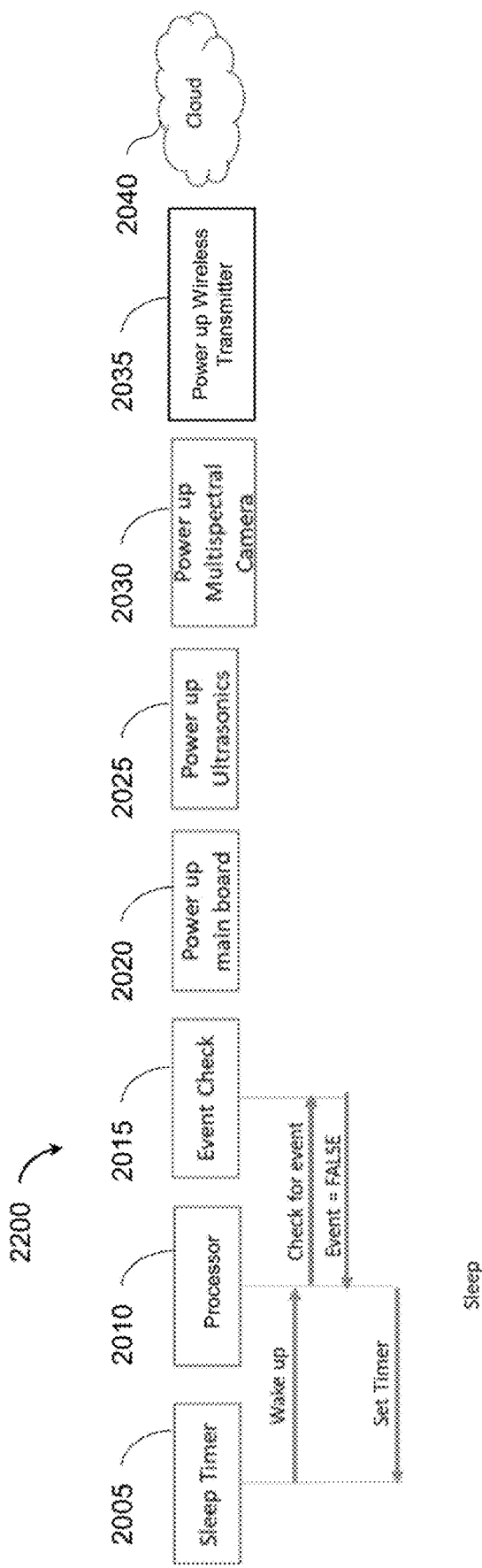
FIG. 21 is a flow diagram of a sensor firmware operation method if an event check returns as false, in accordance with an embodiment.

Referring to FIG. 21, a flow diagram shows an embodiment of a sensor firmware operation method 2200 if an event check 2015 returns as false. A sleep timer 2005 allows for waking up the processor 2010, the processor 2010 is also configured to modify the sleep timer 2005. The processor 2010 is configured to check for an event 2015, if the event is returned as false, the processor 2010 returns to sleep.

Figure 22:
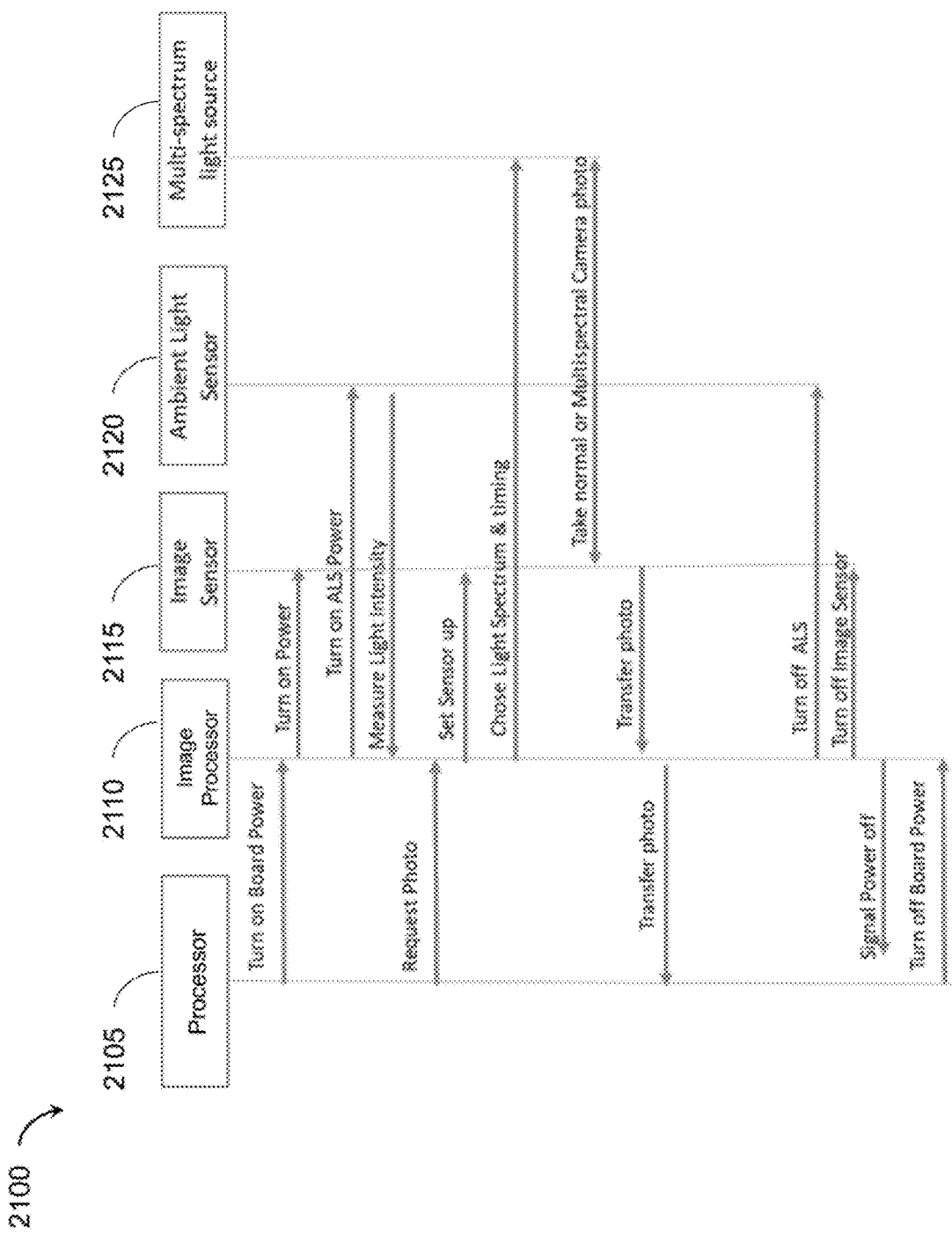
FIG. 22 is a flow diagram of a sensor firmware operation method for a multispectral camera sensor, in accordance with an embodiment.

Referring to FIG. 22, a flow diagram shows an embodiment of a sensor firmware operation method 2100 for a multispectral camera sensor. The processor 2105 includes an image processor 2110 for processing image sensory information.

The processor is configured to turn on power to the image process 2110, request images, collect image information from the image processor, and turn off power to the image processor 2110.

The image processor 2110 is configured to turn on power to an image sensor 2115, set up the image sensor 2115, collect image information from the image sensor 2115, and turn off power to the image sensor 2115.

The image processor 2110 is also configured to turn on power to an ambient light sensor 2120, collect light intensity information from the ambient light sensor 2120, and turn off power to the ambient light sensor 2120. The image sensor 2115 may be a camera sensor.

The image processor 2110 is also configured to turn on a multispectrum light source 2125, optionally including a multispectral camera sensor 2030. The image processor 2110 is configured to choose the light spectrum and timing. The image processor 2110 is also configured to take normal or multispectral camera photos with the multispectral camera sensor and multispectrum light source 2125.

Figure 23:
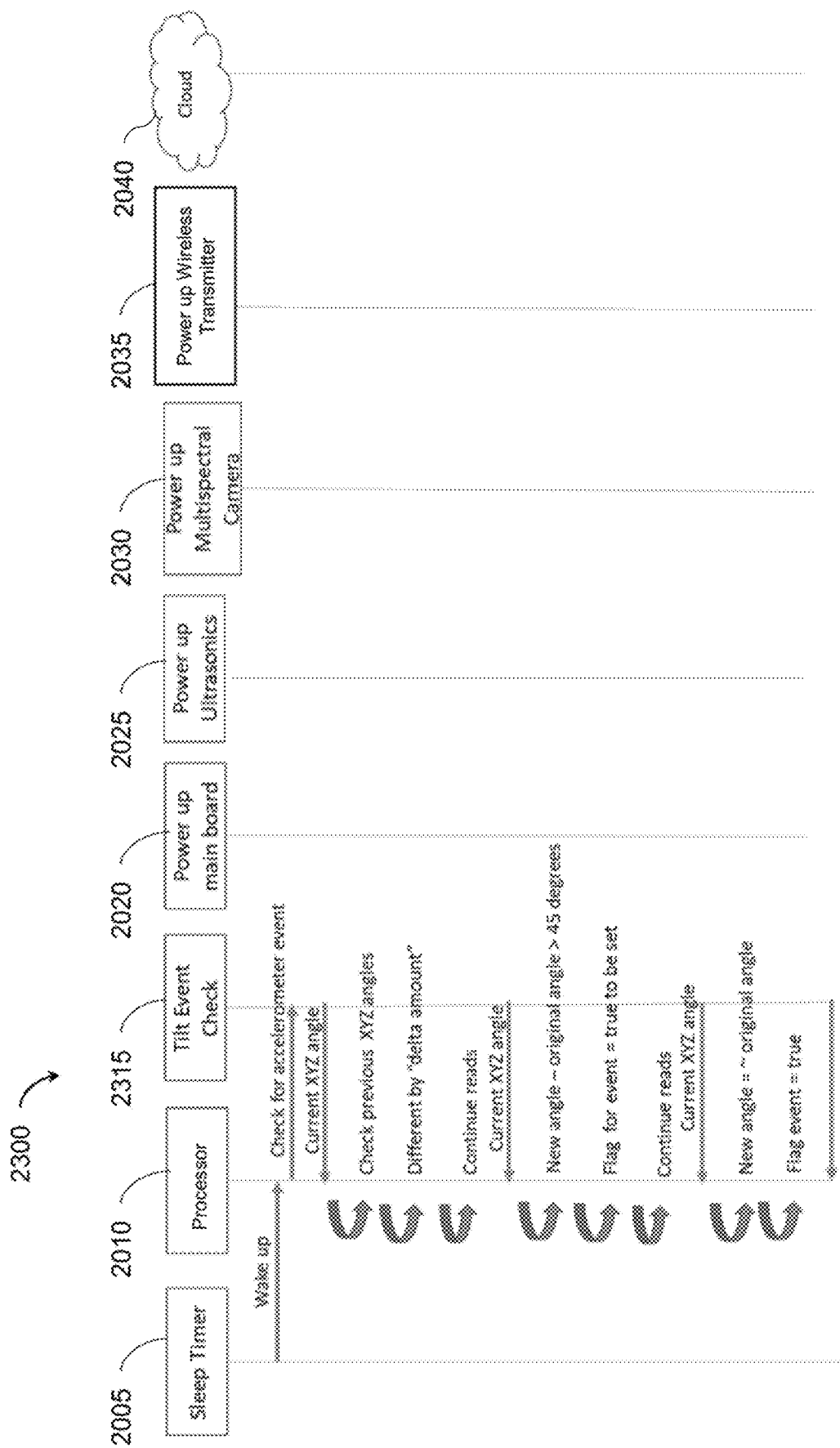
FIG. 23 is a flow diagram of a sensor firmware operation method for an accelerometer sensor, in accordance with an embodiment.

Referring to FIG. 23, a flow diagram shows an embodiment of a sensor firmware operation method 2300 for an accelerometer sensor. A sleep timer 2005 allows for waking up the processor 2010, the processor 2010 is also configured to modify the sleep timer 2005.

The processor 2010 is configured to check for a tilt event 2315 by collecting sensory information from the accelerometer. The processor receives the current angle along the x, y, and z-axis. The processor 2010 is configured to check the angle against the previous x, y, and z-axis and calculate a delta amount of the difference. If the new angle has a delta amount difference greater than 45 degrees, the tilt event check 2315 returns a true event to be set. The processor 2010 is configured to conduct additional checks for the current angle along the x, y, and z-axis and if the new angle returned is approximately the same as the first reading, the true even flag is confirmed.

Following the true event flag, the sensory information is transmitted to the wireless transmitter 2035 for transmitting to the cloud server 2040.

Figure 24:
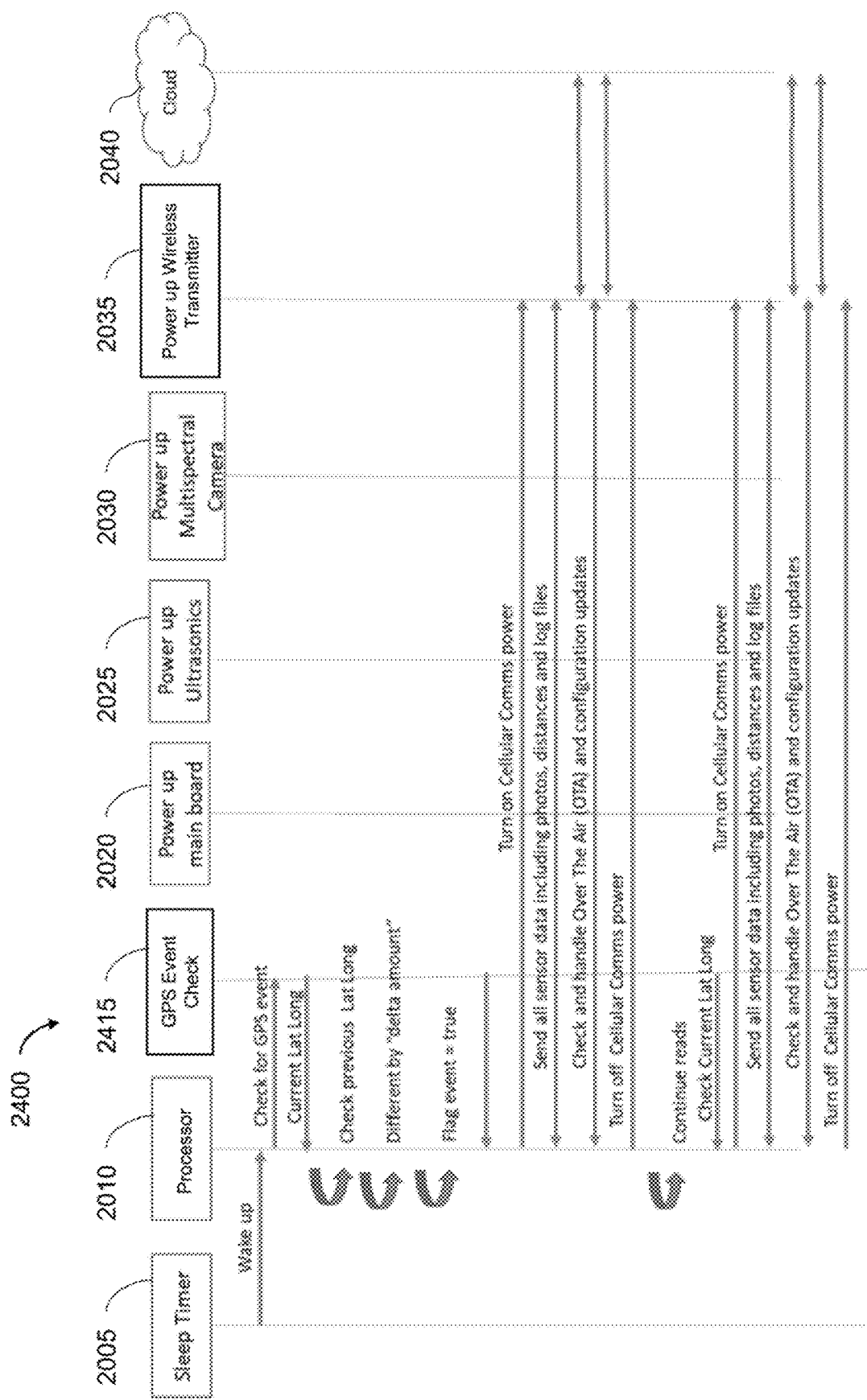
FIG. 24 is a flow diagram of a sensor firmware operation method for an GPS sensor, in accordance with an embodiment.

Referring to FIG. 24, a flow diagram shows an embodiment of a sensor firmware operation method 2400 for an GPS sensor. A sleep timer 2005 allows for waking up the processor 2010, the processor 2010 is also configured to modify the sleep timer 2005.

The processor 2010 is configured to check for a GPS event 2415. The processor 2010 is configured to collect the current latitudinal and longitudinal position of the waste management device. The current position is different from the previous position, a delta difference is calculated and the event is flagged as true. The processor 2010 is configured to then turn on the wireless transmitter 2035, send all sensory information to the wireless transmitter for transmitting to the cloud server 2040, check and handle OTA and configuration updates, and then turn off the wireless transmitter 2035. The processor 2010 then checks for a GPS event again and repeats the above steps until there are no changes to the longitudinal and latitudinal positions.

Figure 25:
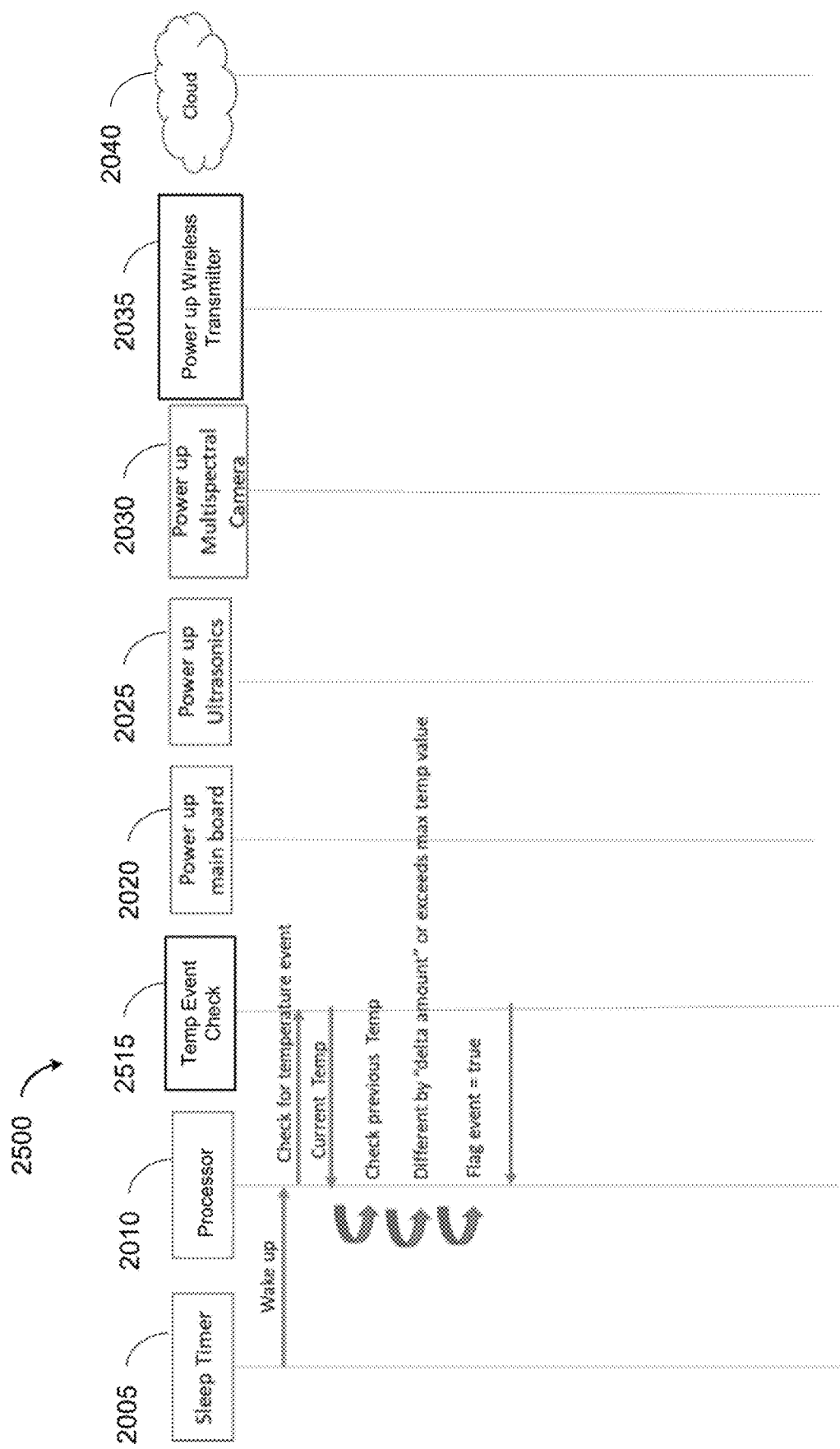
FIG. 25 is a flow diagram of a sensor firmware operation method for a temperature sensor, in accordance with an embodiment.

Referring to FIG. 25, a flow diagram shows an embodiment of a sensor firmware operation method 2500 for a temperature sensor. A sleep timer 2005 allows for waking up the processor 2010, the processor 2010 is also configured to modify the sleep timer 2005.

The processor 2010 is configured to check for a temperature event 2515. The processor 2010 is configured to collect the current temperature and compare the measurement with the previous temperature and calculate a delta amount difference. The processor 2010 is also configured to identify if the temperature exceeds a maximum temperature value. If there is a difference between the two values or if the value exceed the maximum value, the event is flagged as true.

Following the true event flag, the sensory information is transmitted to the wireless transmitter 2035 for transmitting to the cloud server 2040.

Figure 26:
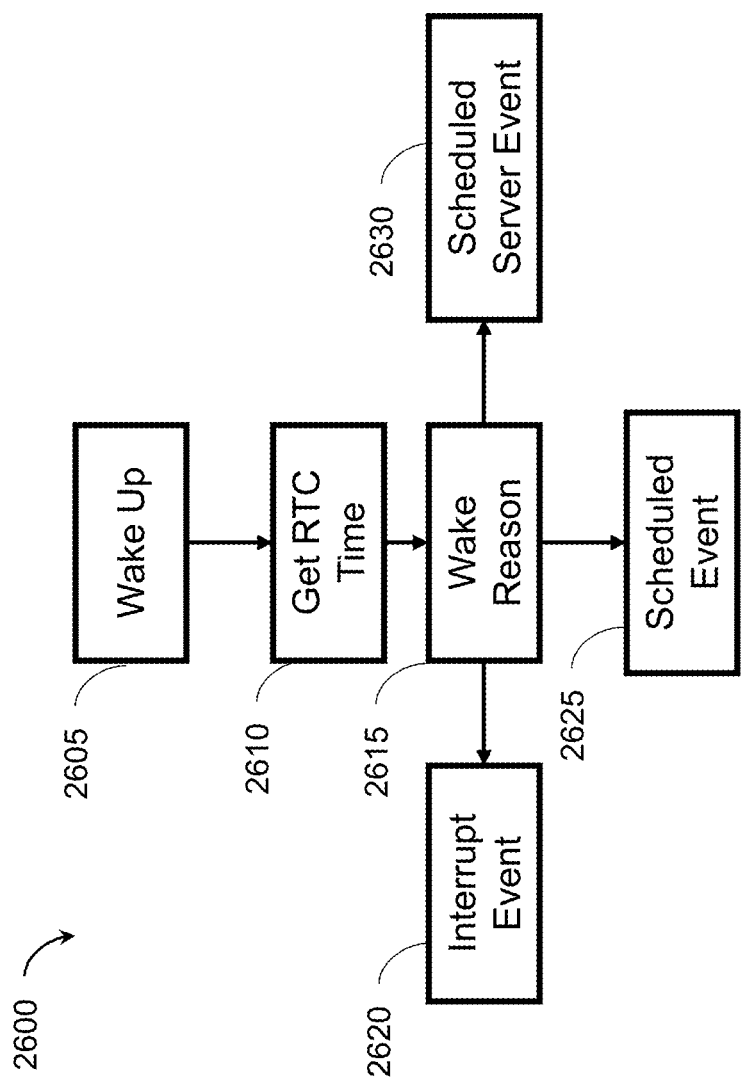
FIG. 26 is a flow diagram of a method of using real time based scheduled events for operating a waste management device, in accordance with an embodiment.

Referring to FIG. 26, a flowchart is shown demonstrating an embodiment of a method 2600 of operating a waste management device. The waste management device is has a wake up event at 2605. The waste management device gets the current time from the Real Time Clock (RTC) inside it's processor at 2610 and then checks whether the wake reason for if it's an interrupt event 2620, scheduled event at 2625, or scheduled server event at 2630.

Figure 27:
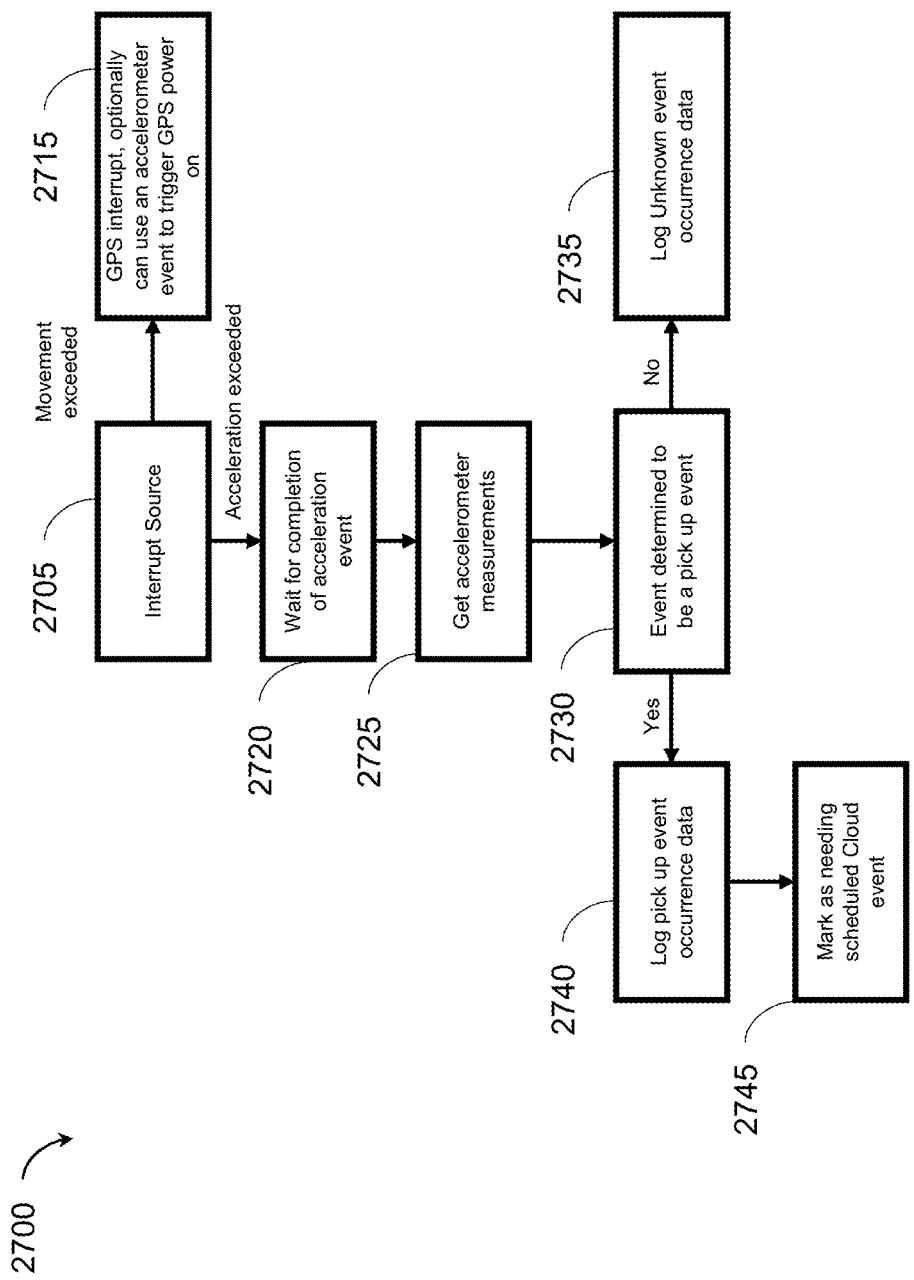
FIG. 27 is a flow diagram of a method of operating a waste management device if the wake up event is an interrupt event, in accordance with an embodiment.

Referring to FIG. 27, a flowchart is shown demonstrating an embodiment of a method 2700 of operating a waste management device if the wake up event is an interrupt event. If the event is an interrupt event, the interrupt source at 2705 is identified, if a movement limited was exceeded, or if an acceleration limit was exceed.

Temperature is checked as part of the fast scheduled wake up routine, the check can occur at a selectable time, optionally every 3 seconds. If a temperature limit is exceeded an event is detected which will trigger a connection to the cell network.

If a movement limit is exceeded a GPS interrupt event is initiated to turn on the GPS sensor, optionally an accelerometer may be used to trigger the GPS power on at 2715. If an acceleration limit is exceeded, the device waits until the acceleration even is completed 2720, and then accelerometer measurements are retrieved at 2725.

The waste management device checks if the event is a pick up event at 2730 and if it is not then an unknown event is logged in the occurrence data at 2735. If the event is a pick up event, the pick up event is logged in the occurrence data at 2740 and marked as needing a scheduled cloud event at 2745.

Figure 28:
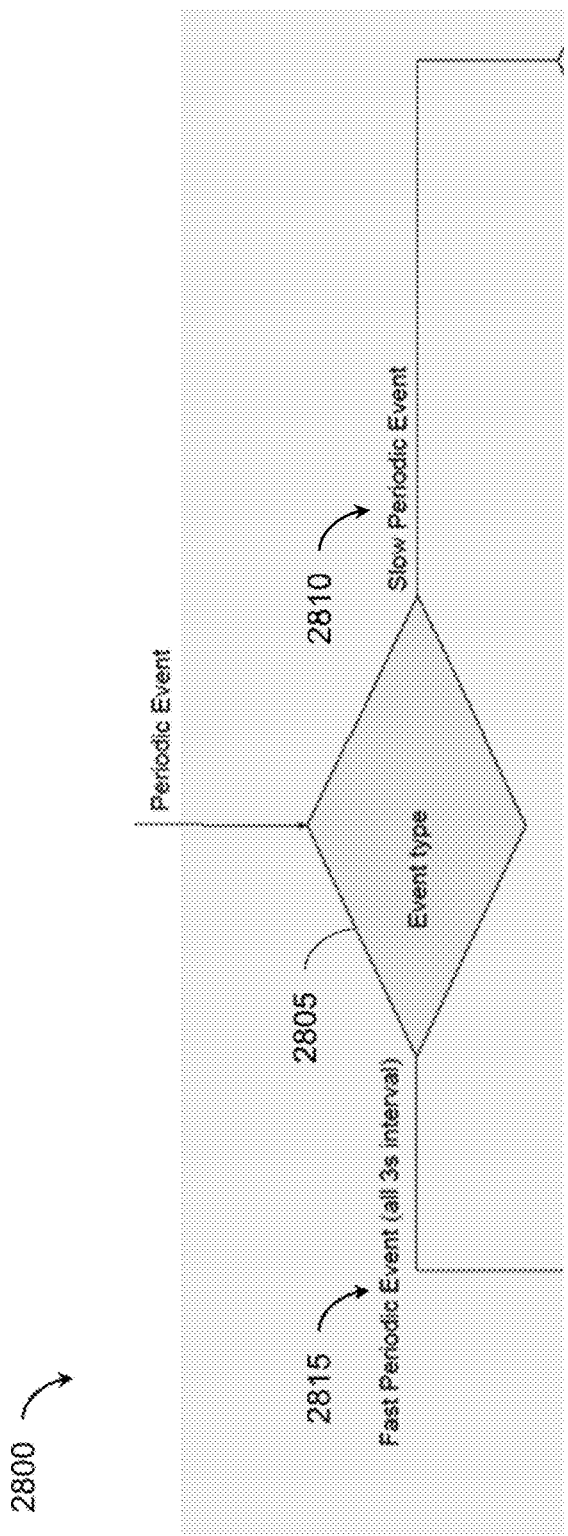
FIG. 28 is a flow diagram of a method of operating a waste management device if the wake up event is an periodic event, in accordance with an embodiment.

Referring to FIG. 28, a flowchart is shown demonstrating an embodiment of a method 2800 of operating a waste management device if the wake up event is an periodic event. The periodic event type is checked at 2805. The periodic event is either a fast periodic event at 2815 which occurs at 3 second intervals or a slow periodic event at 2810 which occurs at another interval.

Figure 29:
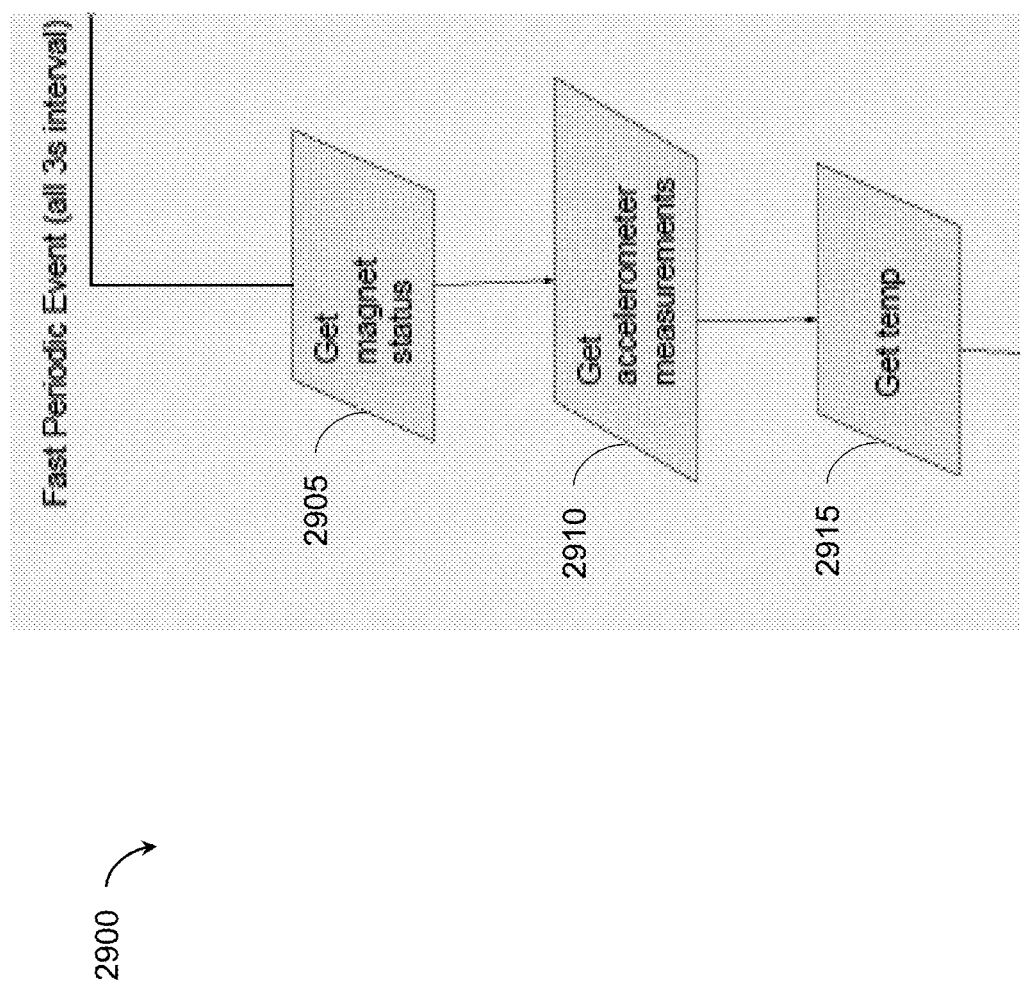
FIG. 29 is a flow of a method of operating a waste management device if the wake up event is a fast periodic event checking, in accordance with an embodiment.

Referring to FIG. 29, a flowchart is shown demonstrating an embodiment of a method 2900 of operating a waste management device if the wake up event is a fast periodic event. If the event is a fast periodic event, the device will retrieve the magnet status, at 2905, the accelerometer measurements, at 2910, and the temperature measurements, at 2915.

Figure 30:
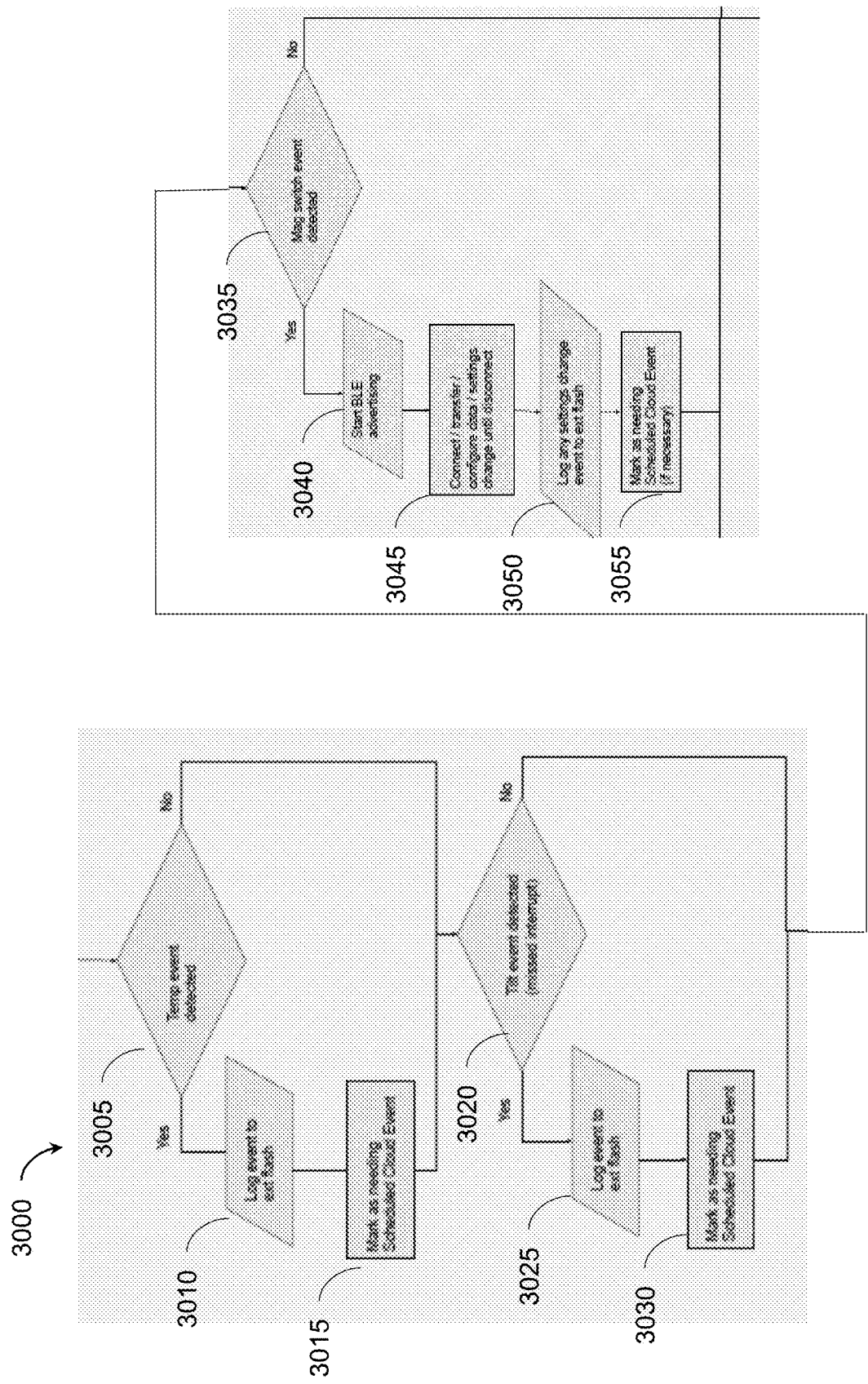
FIG. 30 is a flow diagram of a method of operating a waste management device if the wake up event is a fast periodic event following the method in FIG. 29.

Referring to FIG. 30, a flowchart is shown demonstrating an embodiment of a method 3000 of operating a waste management device if the wake up event is a fast periodic event following method 2900. The device checks if a temperature event is detected, at 3005. If a temperature event is detected, the event is logged to the device memory, at 3010 and the device marks a need for a scheduled cloud event, at 3015 and conducts the next step. If no event is detected, the device conducts the next step.

The device checks if a tilt event is detected, at 3020. If a tilt event is detected, the event is logged to the device memory, at 3025 and the device marks a need for a scheduled cloud event, at 3030 and conducts the next step. If no event is detected, the device conducts the next step.

The device checks if a mag switch event is detected, at 3035. If a mag switch event is detected, the Bluetooth Low Energy (BLE) advertising is initiated, at 3040. The device connects/transfers/configures data or settings until disconnected, at 3045. The event is logged to the device memory, at 3050 and the device marks a need for a scheduled cloud event, at 3055 and conducts the next step. If no event is detected, the device conducts the next step. BLE may also be referred to as Bluetooth Smart. During BLE advertisements, packets are broadcasted to receiving devices around the broadcasting device. The receiving device can then acts on the received information or connects to receive more information.

Figure 31:
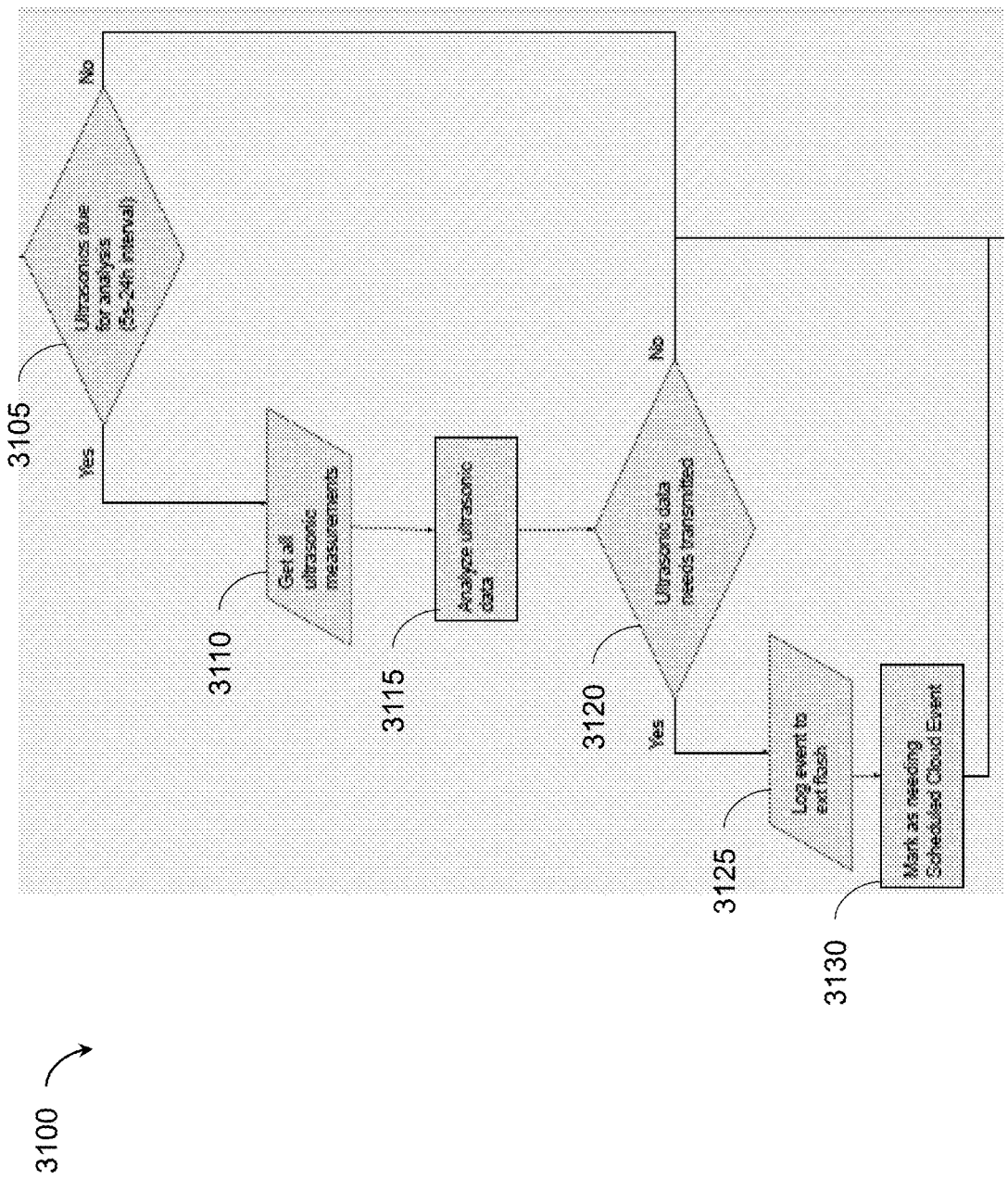
FIG. 31 is a flow diagram demonstrating an embodiment of a method of operating a waste management device if the wake up event is a slow period event following the method in FIG. 30.

Referring to FIG. 31, a flowchart is shown demonstrating an embodiment of a method 3100 of operating a waste management device if the wake up event is a slow period event following method 2800. The device checks if ultrasonic sensors are due for analysis, at 3105. The interval for checking can range between 5 seconds and 24 hours. If the sensors are due for analysis, all ultrasonic measurements are obtained, at 3110. All ultrasonic sensors are then analyzed, at 3115. The device determines if the sensory information of the ultrasonic sensors needs to be transmitted 3120. If it does, the event is logged to the device memory, at 3125 and the device marks a need for a scheduled cloud event, at 3130 and conducts the next step. If no event is detected, the device conducts the next step.

Figure 32:
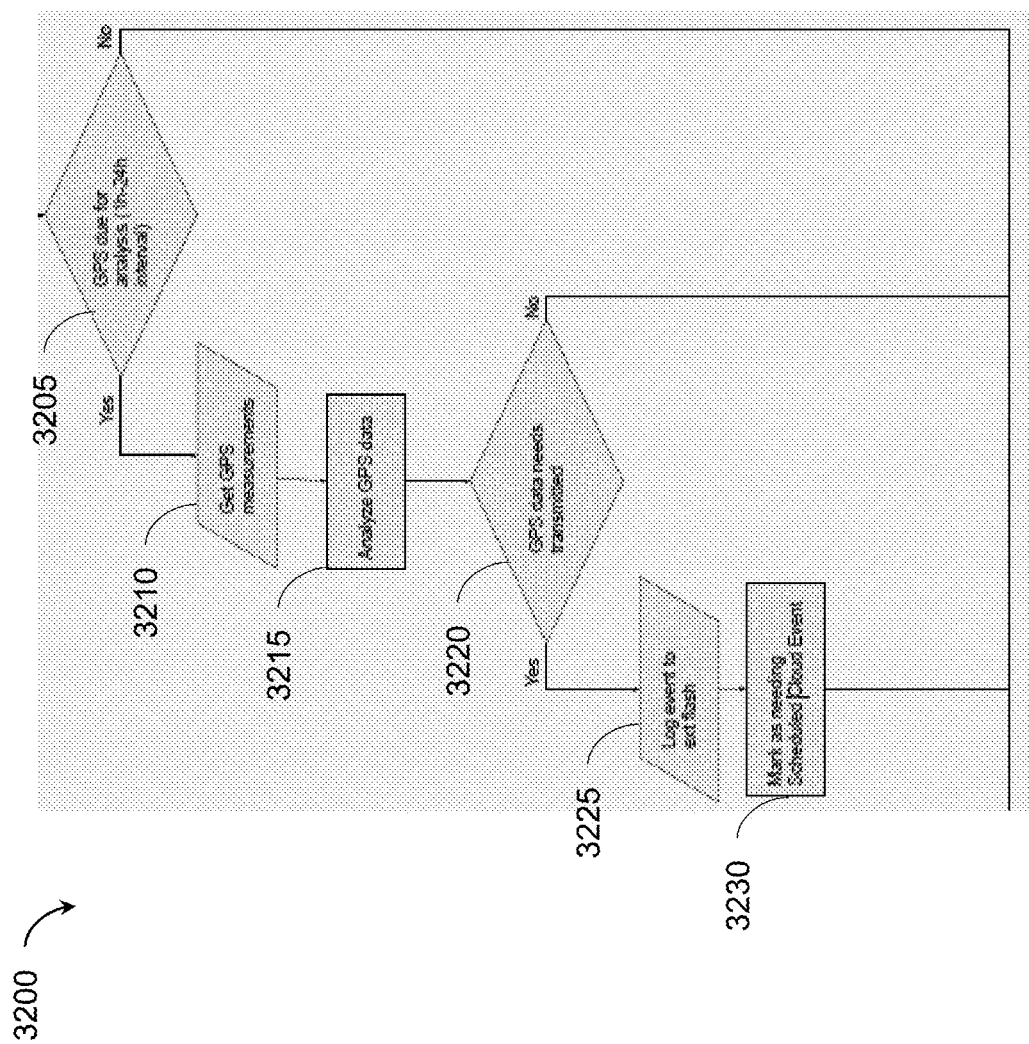
FIG. 32 is a flow diagram demonstrating of a method of operating a waste management device if the wake up event is a slow period event following the method in FIG. 31.

Referring to FIG. 32, a flowchart is shown demonstrating an embodiment of a method 3200 of operating a waste management device if the wake up event is a slow period event following method 3100.

The device checks if the GPS sensor is due for analysis, at 3205. The interval for checking can range between 1 hour and 24 hours. If the GPS sensor is due for analysis, GPS measurements are obtained, at 3210.

The sensory information from the GPS sensors is then analyzed, at 3215. The device determines if the sensory information of the GPS sensor needs to be transmitted, at 3220. If it does, the event is logged to the device memory, at 3225 and the device marks a need for a scheduled cloud event, at 3230 and conducts the next step. If no event is detected, the device conducts the next step.

Figure 33:
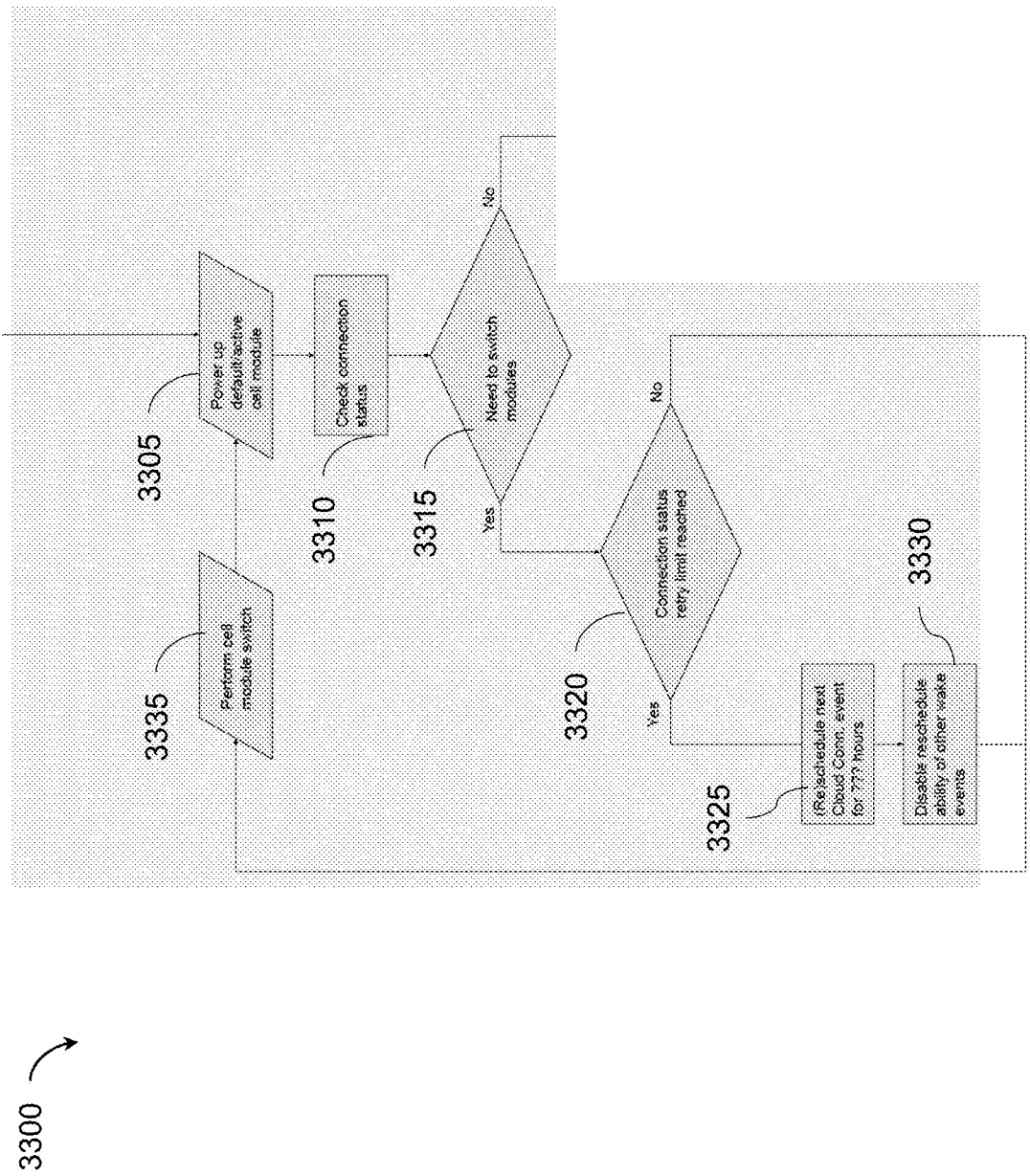
FIG. 33 is a flow diagram of a method of operating a waste management device if the wake up reason is a scheduled server event, in accordance with an embodiment.

Referring to FIG. 33, a flowchart is shown demonstrating an embodiment of a method 3300 of operating a waste management device if the wake up reason is a scheduled server event. The waste management device powers up the default or active cellular modem, at 3305.

The waste management device then checks the connection status of the cellular modem to the server, at 3310. The device determines whether there is a need to switch its cell modem, at 3315, such as if the device is not connected to the cellular network.

The device checks if the connection status retry limit has been reached, at 3320. If it has then the device reschedules the cloud connection event for a later time, at 3325 and disables reschedule ability for other wake events, at 3330. The device may then go to sleep.

If the connection status retry limit has not been reached the device performs a cell modem switch, at 3335 and restarts at 3305.

Figure 34:
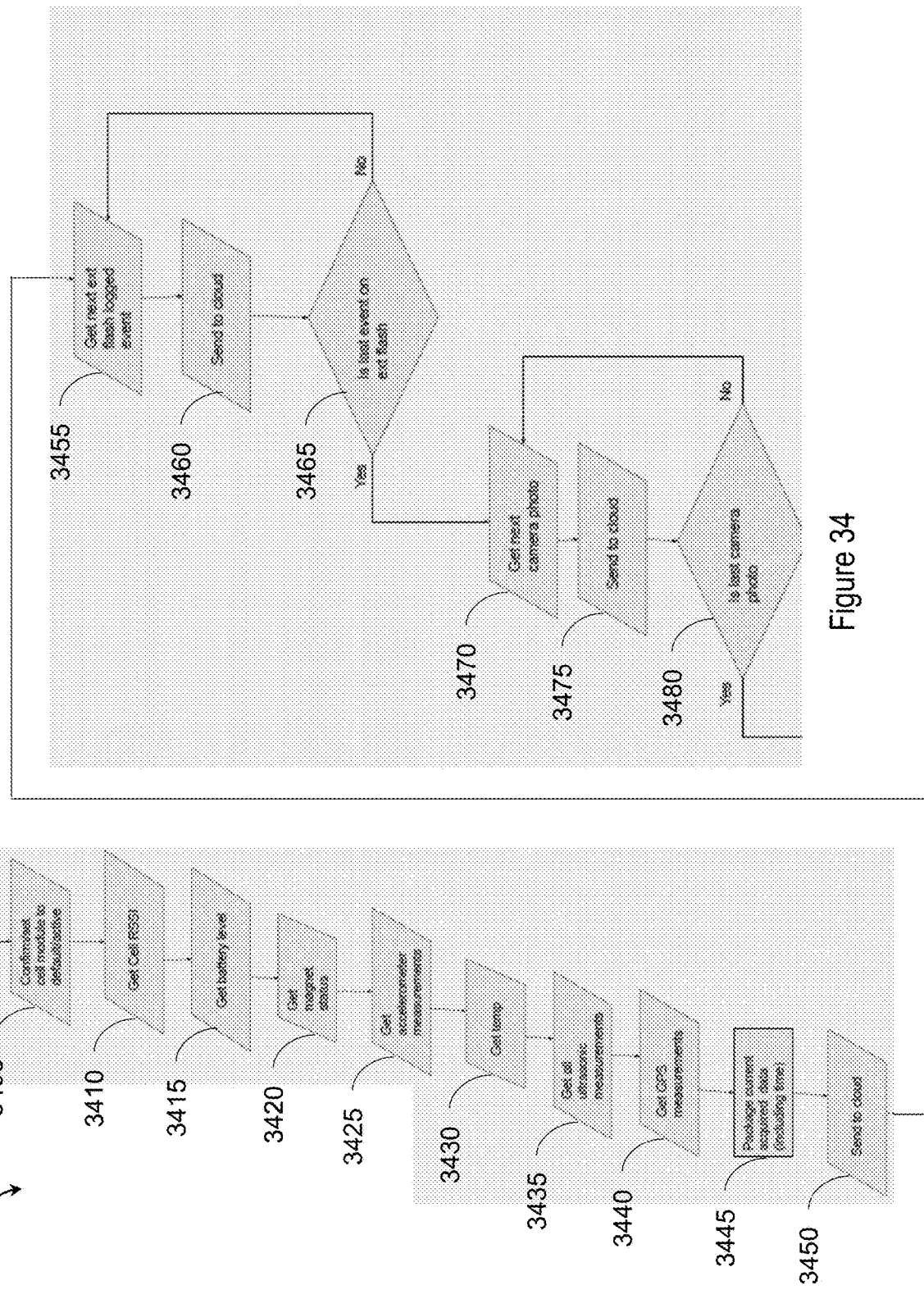
FIG. 34 is a flow diagram of a method of operating a waste management device if the wake up reason is a scheduled server event following the method in FIG. 33.

Referring to FIG. 34, a flowchart is shown demonstrating an embodiment of a method 3400 of operating a waste management device if the wake up reason is a scheduled server event following method 3300. If the waste management device does not need to switch the cellular modem, at 3315, the waste management device confirms or sets the cell modem to default or active, at 3405. The waste management device collects the cell RSSI, at 3410, the battery level, at 3415, the magnet status, at 3420, the accelerometer measurements, at 3425, the temperature measurements, at 3430, the ultrasonic sensor measurements, at 3435, and the GPS sensor measurements, at 3440.

The sensory information is packaged with current acquired data, at 3445, which includes the time and is sent to the cloud server, at 3450.

The waste management device collects the next logged event in device memory 3455 and sends the sensory information to the cloud server, at 3460. Steps 3455 and 3460 are repeated until all events are sent to the cloud server, at 3465.

The waste management device collects the next camera photo, at 3470 and sends the sensory information to the cloud server, at 3475. Steps 3470 and 3475 are repeated until all photos are sent to the cloud server 3480.

Figure 35:
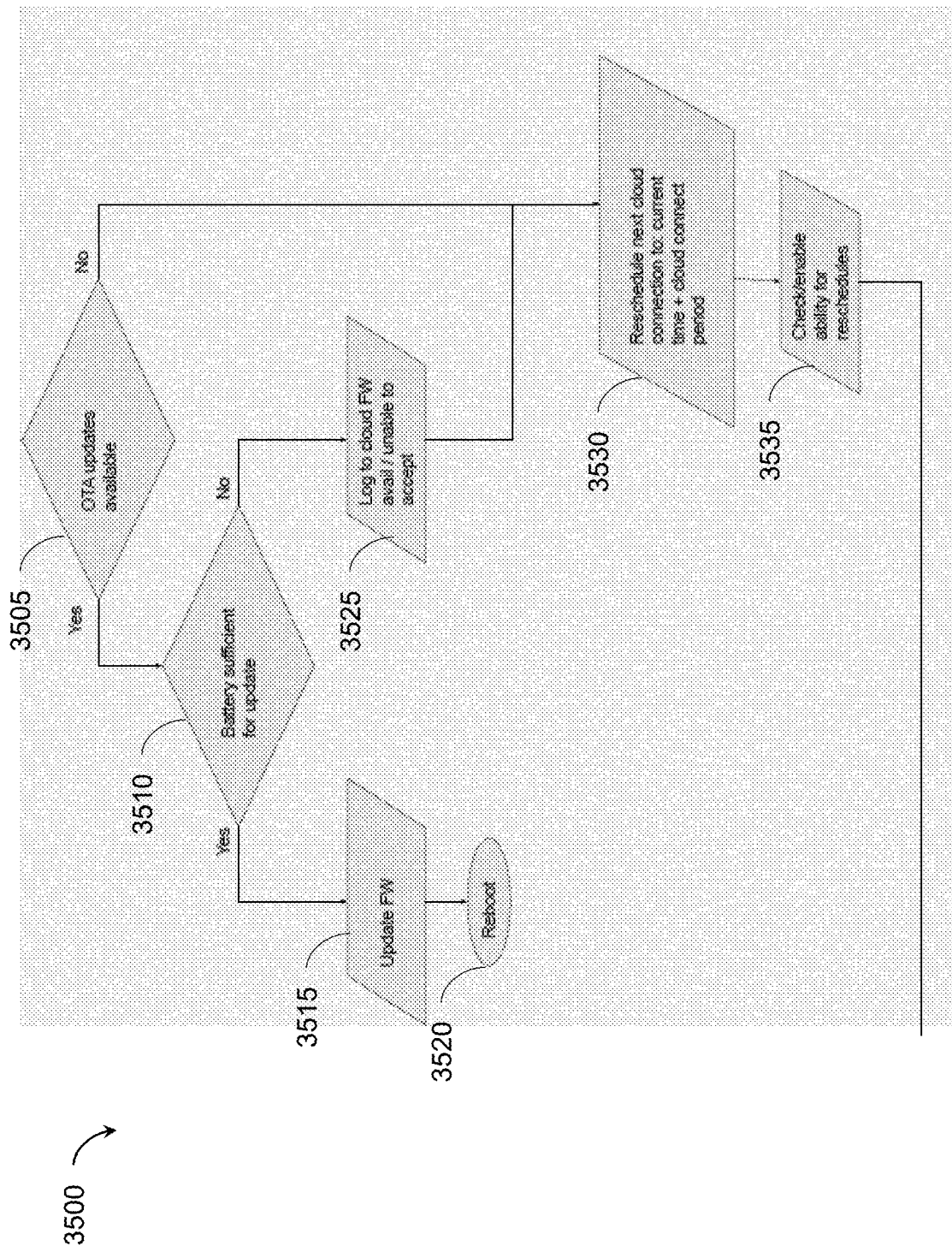
FIG. 35 is a flow diagram of a method of operating a waste management device if the wake up reason is a scheduled server event following the method in FIG. 34.

Referring to FIG. 35, a flowchart is shown demonstrating an embodiment of a method 3500 of operating a waste management device if the wake up reason is a scheduled server event following method 3400. If the all camera photos have been sent to the cloud server, at 3480, the waste management device checks if an OTA update is available, at 3505.

If no OTA update is available, the waste management device reschedules the next cloud server connection to a preset period after the current check, at 3530. The waste management device then checks and enables the ability for rescheduling, at 3535.

If an OTA is available the device checks if the batter level is sufficient to update the firmware, at 3510. If the battery level is sufficient, the waste management device 701 updates the firmware, at 3515, The waste management device 701 then conducts a reboot, at 3520.

If the battery level is not sufficient to update the firmware, the device submits a log to the cloud server that a OTA was available but was unable to accept, at 3525. The waste management device then reschedules the next cloud server connection to a preset period after the current check, at 3530. The waste management device then checks and enables the ability for rescheduling, at 3535.

Figure 36:
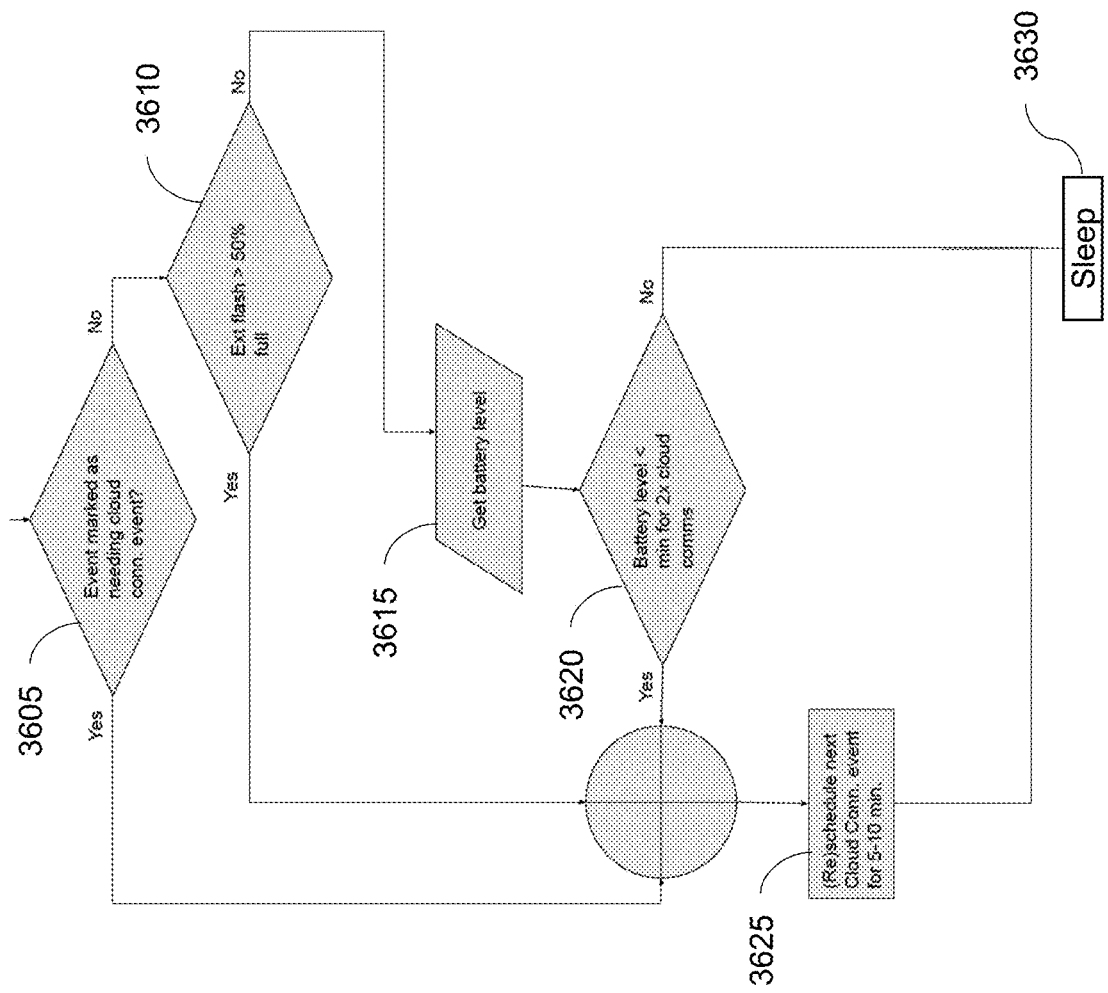
FIG. 36 is a flow diagram of a method of operating a waste management device following if the wake up event is a scheduled event or an interrupt event, in accordance with an embodiment.

Referring to FIG. 36, a flowchart is shown demonstrating an embodiment of a method 3600 of operating a waste management device following if the wake up event is a scheduled event, at 2625 or an interrupt event, at 2620.

The waste management device determines if the scheduled event 2620 or interrupt event 2620 is marked as needing a cloud connection event, at 3605. If the event is marked as needing a cloud event, the next cloud connection is rescheduled to be in 5-10 minutes, at 3625.

If the event is not marked as need a cloud connection event, the device memory is checked to determine if it is more than half full, at 3610. If it is more than half full, the next cloud connection is rescheduled to be in 5-10 minutes, at 3625.

If the device memory is half full or less, then the battery level of the waste management device is obtained, at 3615. If the battery level is less than minimum necessary for 2 cloud connections, at 3620, the next cloud connection is rescheduled to be in 5-10 minutes, at 3625.

If the battery level is not less than the minimum necessary for 2 cloud connections, at 3620, the waste management device will be put into sleep mode, at 3630.

Figure 37B:
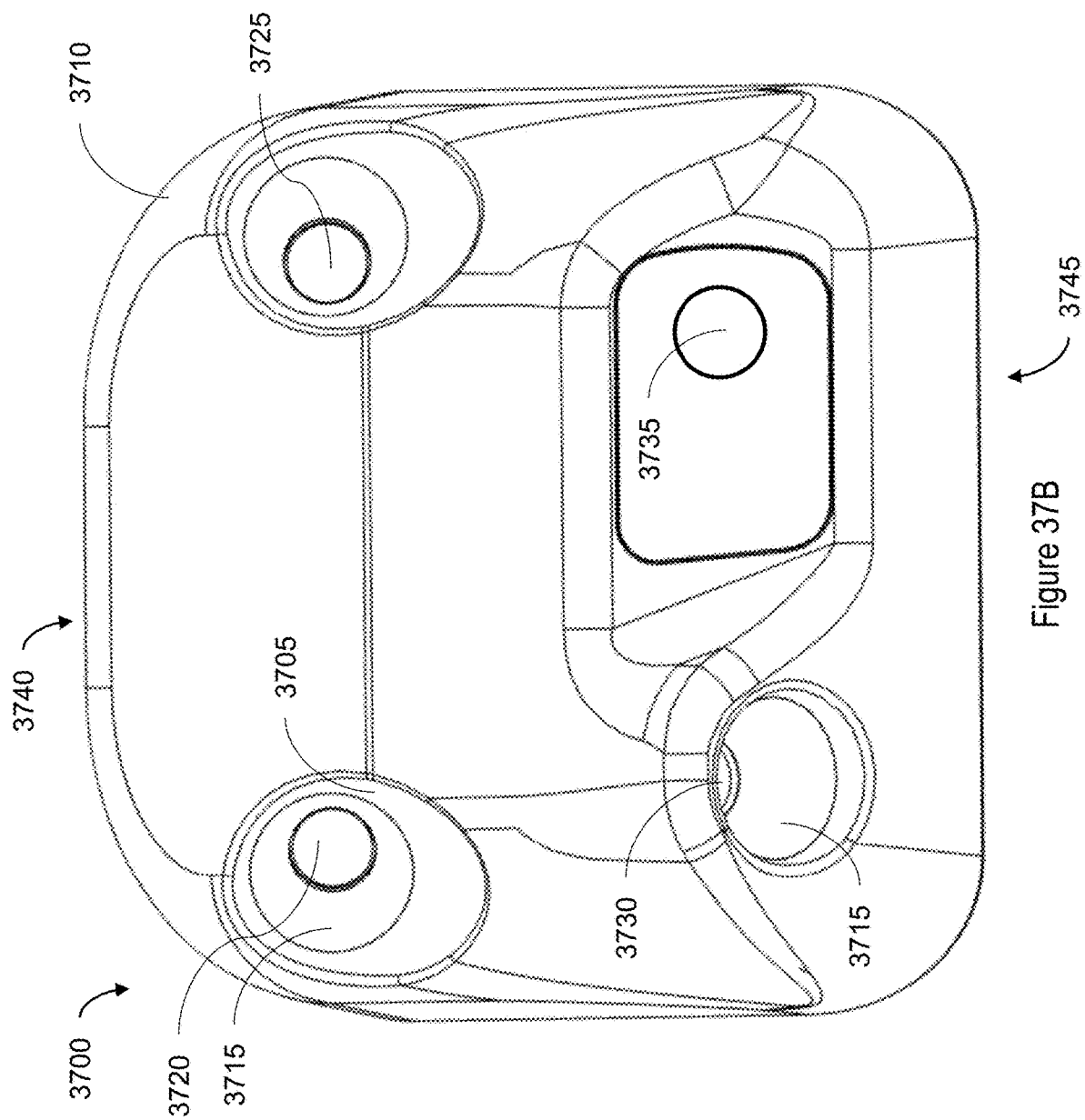
FIG. 37A is a perspective front view of a waste management device is shown, in accordance with an embodiment.
FIG. 37C is a cross-sectional view along the vertical plane of an ultrasonic sensor proximal to the top of a waste management device, in accordance with an embodiment.
FIG. 37D is a cross-sectional view along the horizontal plane of the waste management device showing the two ultrasonic sensors proximal to the top of the waste management device, in accordance with an embodiment.

Referring to FIG. 37A, a perspective front view of a waste management device 3700 is shown, according to an embodiment. The waste management device 3700 includes a plurality of sensors, the plurality of sensors include three ultrasonic sensors 3720, 3725, 3730. The plurality of sensors also includes a camera sensor 3735. The waste management device 3700 also includes ultrasonic actuators which, together with the ultrasonic sensors 3720, 3725, 3730 in a pulse-echo ranging measurement method using ultrasonic waves, are configured to measure the distance inside a waste bin and determine a fill level of the waste bin based on the distance measurement.

When attached to a waste bin, the housing 3710 allows for the waste management device to be attached to one of the sides of the waste bin. When attached, the waste management device 3700 is positioned such that the ultrasonic sensor 3730 is facing the bottom 3745 of the waste bin. The positioning of the ultrasonic sensor 3730 to face the bottom of the waste bin allows specific distance measurements to the bottom of the waste bin provide confirmation of whether the waste bin is empty. The positioning allows for confirmation of the distance to the bottom of the waste bin in the situation when the other two ultrasonic sensors 3720, 3725 do not detect a reading in their time of flight window and thereby are unable to distinguish between whether the waste bin is full or whether it is empty.

When the waste management device 3700 is attached to the waste bin, the positioning and configuration of the two ultrasonic sensors 3720, 3725 proximal to the top 3740 of the waste management device 3700 allow for measurements of the whole length and width of the interior of the waste bin. The ultrasonic sensors 3720, 3725 are able to collect distance measurements along the full breadth of the waste bin. A shorter distance measurement by the ultrasonic sensors 3720, 3725 indicate a greater waste bin fill level. The ultrasonic sensors 3720, 3725 are able to collect distance measurements and the processor of the waste management device or a server wirelessly connected to the waste management device is able to determine a waste bin fill level based on the distance measurements.

Referring to FIG. 35B, a perspective bottom view is shown of the waste management device 3700, according to an embodiment. The waste management device 3700 includes a housing 3710 that encases the plurality of sensors. The housing 3710 includes cones 3715 which amplify the ultrasonic wave signal received by the ultrasonic sensor. The cones 3715 also focus the ultrasonic waves released by the ultrasonic actuator in the direction of interest. The cones 3715 are positioned in the housing directly in front of the each of the three ultrasonic sensors 3720, 3725, 3730. The cones 3715 are shaped such that the exiting ultrasonic wave from the ultrasonic actuator is directed in the direction the cone is facing. The cones 3715 thereby allow for obtaining distance measurements from desired angles of interest by directing the ultrasonic wave to be emitted in the direction of the angle of interest. The cones 3715 are present at each of the three ultrasonic sensors 3720, 3725, 3730.

It would be readily apparent that not all sensor types would require cones to be present in the housing to amplify the signal. For example, the camera sensor 3735, does not have a cone present in the housing in front of it. Further, the cones may be configured in any shape capable of directing ultrasonic waves in a desired direction.

The housing includes shroud extensions 3705 which improves the signal to noise ratio of the ultrasonic sensor by reducing the amount of reflected ultrasonic wave signals received by the ultrasonic sensor from angles that are not the angle of interest. The shroud extensions 3705 are positioned in the housing directly infront of the cones 3715. The shroud extensions 3705 are present infront of the cones 3715 of the two ultrasonic sensors 3720, 3725 on the front of the waste management device 3700. The shroud extensions 3705 on the two ultrasonic sensors 3720, 3725 reduces the amount of reflected ultrasonic waves detected by the ultrasonic sensors 3720, 3725 that are not from the angles of interest when collecting distance measurements along the breadth of the interior of the waste bin.

Figure 37C:
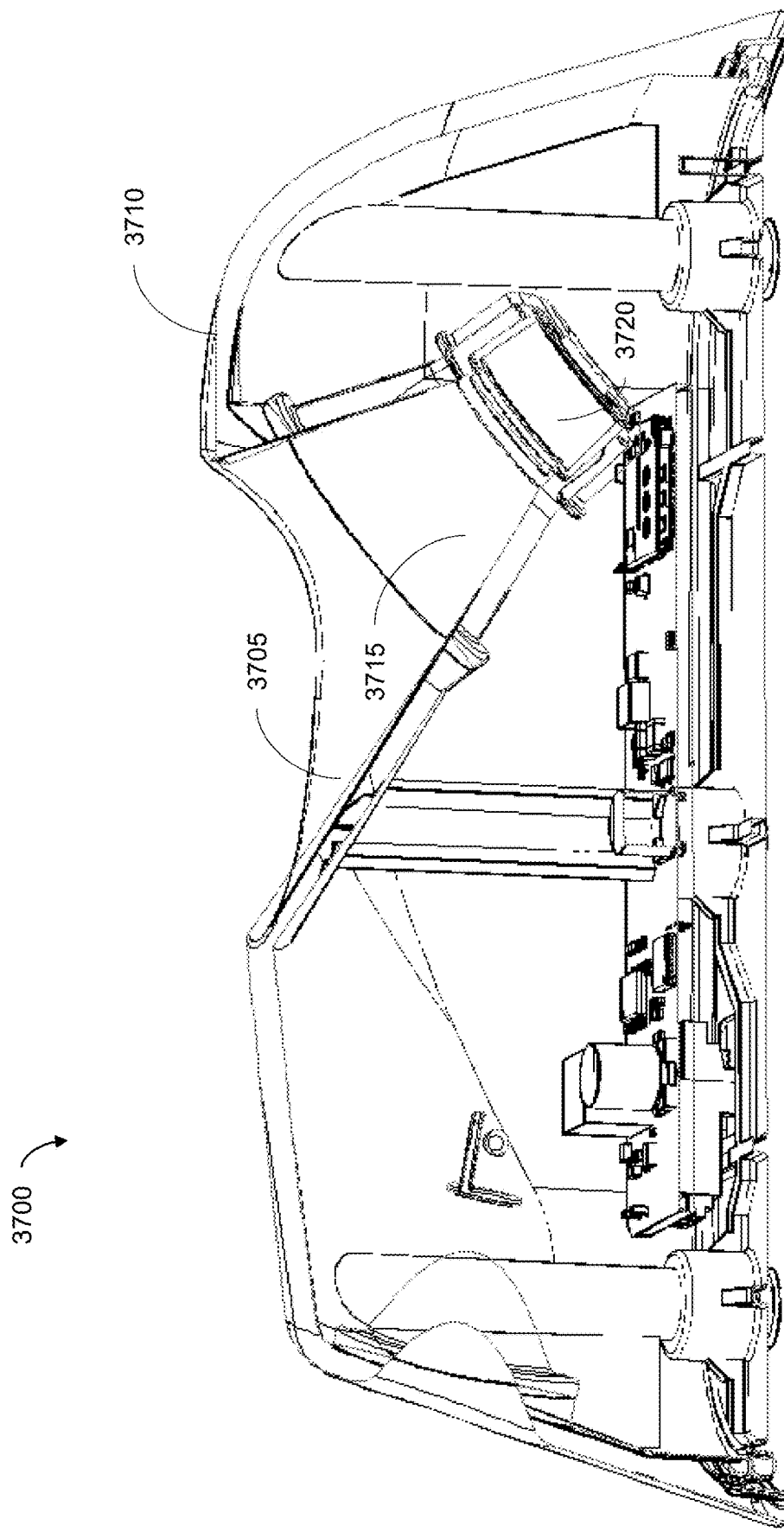

Referring to FIG. 37C, a cross-sectional view is shown along the vertical plane of an ultrasonic sensor 3720 proximal to the top 3740 of a waste management device 3700, according to an embodiment. The ultrasonic sensor 3720 is directed downwards on a 45 degree angle such that measurements are taken from distances on a downward angle. The downward angle allows for measurements to be taken along the breadth of the waste bin while simultaneously providing an inverse correlation between distance measurement and the waste bin fill level. Ultrasonic sensor 3725 is also similarly directed downwards on a 45 degree downward angle.

While the ultrasonic sensor is shown on a 45 degree downward angle, any angle may be used if the angle allows for distance measurements along the length of the interior of the waste bin while providing for a determination of the waste bin fill level based on the measurements.

Figure 37D:
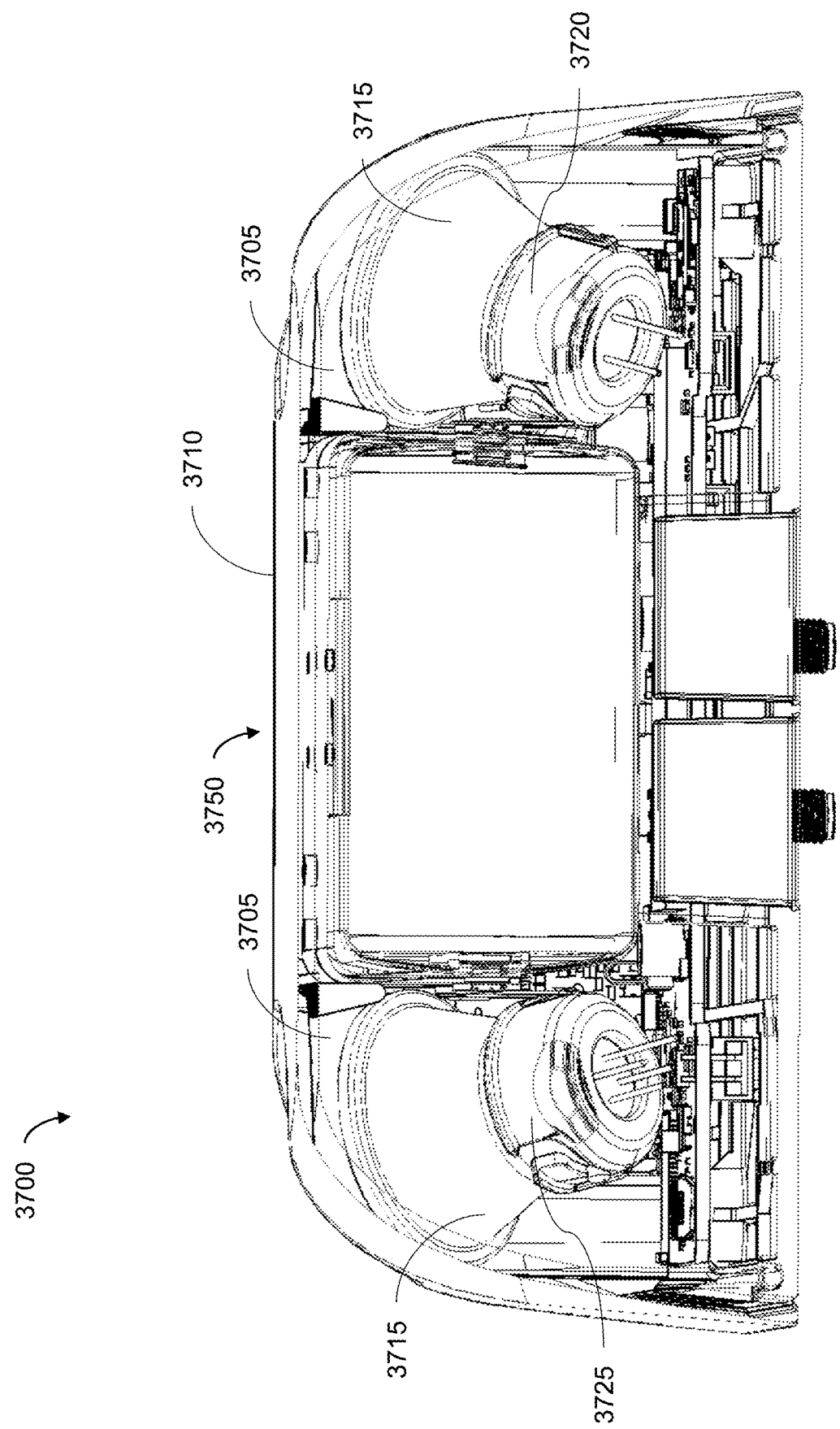

Referring to FIG. 37D, a cross-sectional view is shown along the horizontal plane of the waste management device showing the two ultrasonic sensors 3720, 3725 proximal to the top 3740 of the waste management device 3700. The ultrasonic sensors 3720, 3725 are directed outwards on a 20 degree outward angle from the center 3750 of the waste management device 3700. The outward angle allows each of the two ultrasonic sensors 3720, 3725 to obtain distance measurements from different sides of the waste bin.

While the ultrasonic sensors are shown on a 20 degree outward angle, any angle may be used if the angle allows for distance measurements at different points of the waste bin for determining a more comprehensive waste bin fill level.

The waste management device 701 is used with the waste management system 10 and methods 601 to provide for improved bin fill level detection and management. The waste management system 10 and methods 601 also provide for optimal route planning for waste collection.

The plurality of sensors 711 provides multi directional responses, software changeable directional responses, and response verification within that sensor type to improve indicative measure of the waste bin fill level being measured by the sensor. Therein the plurality of sensors provide the system with accurate, confirmed data on the fill level in the waste bin. This is critical information for optimization of waste management operations such as route planning.

The ability to reconfigure the plurality of sensors means improved signal to noise ratios and more consistent and accurate measurements which leads to better efficiencies in the operation of the waste management system and waste management methods because the presence of erroneous data is decreased.

The waste management system 10 and method 601 are provided with improved measurement accuracy and better tonal base material by the waste management device 701. For example, the waste management device allows for photos with objects to clearly be delineated for the machine learning and AI contamination detection algorithm of the waste management system and method. The sensory information allows for a higher rate of accurate detection.

Cross verification with the plurality of sensors 711 in the waste management device 701 by having at least two different types of sensors provides a large improvement on the operation of a measurement device by remotely confirming correct and accurate operation of the sensor type. The cross-verification provides a mechanism for the device sensor type to be remotely calibrated and provides parallel but different measurement technologies which also can significantly extend the time between service calls to the device as both sensor types would have to be impacted before service would be required.

The waste management device 701 provides the waste management system 10 and method 601 with accurate, cross confirmed data on the fill level in the waste bin as well as a mechanism to calibrate measurements and a way to maintain accurate measurements for a longer period of time. The accurate fill information and extended useful lifetime provide optimization of waste management operations.

The use of a multispectral camera 720 in the waste management device 700 provides the waste management system 10 with another method to cross confirm data on the fill level in the waste bin as well as a mechanism to provide operations improved, more consistent and accurate contamination determination which leads to better efficiencies throughout the operation.

The use of a protective lens 1505 configured to prevent occlusion of at least one sensor 1525 provides the waste management system 720 and method 601 with a way to maintain accurate measurements for a longer period of time. The protective lens 1505 decreases the cost of sending someone to the field to clean the sensor, and provides an extended useful lifetime of providing accurate useful data both of which provide optimization of waste management operations.

The wireless transmitter 721 of the waste management device 701 provides the waste management system 10 with reliable access to up to date data on an ongoing basis. The waste management system 10 uses current data from the plurality of sensors 711 on a consistent timely manner to maximize the efficiency of the operation. Missing data or late data are equally as damaging to the waste management operation as because it decreases the reliability of the sensory information as being current or accurate.

While the above description provides examples of one or more apparatus, methods, or systems, it will be appreciated that other apparatus, methods, or systems may be within the scope of the claims as interpreted by one of skill in the art.

The invention claimed is:

1. A waste management system comprising:
   a plurality of waste management devices, each waste management device attached to a waste bin and having:
   a plurality of sensors configured to sense contents of the waste bin, and
   a multispectral light source,
   wherein each device is configured to transmit sensory information related to the contents of the waste bin from the plurality of sensors;
   the sensory information including an image captured by a multispectral camera sensor configured to capture images of the contents of the waste bin in infrared and ultraviolet spectrums when the interior of the waste bin is illuminated by the multispectral light source in the absence of visible light;
   a server configured to receive and store the sensory information transmitted by the plurality of devices over one or more wireless communication networks, wherein the server stores a fill level of the waste bin based on the sensory information;
   the server including a processor configured to:
   determine the fill level of the waste bin based on the sensory information from a first sensor;
   verify the fill level of the waste bin based on the image from the multispectral camera sensor;
   add an offset to the first sensor, the offset based on the fill level as verified by the image from the multispectral camera sensor,
   wherein where the multispectral camera sensor becomes occluded, the fill level of the waste bin is determined based on the sensory information from the first sensor with the offset added; and
   a user device configured to receive, store, and display the fill level of the waste bin.

2. The waste management system of claim 1, wherein a distance measurement is derived from the sensory information from three sensors of the same type to determine the fill level of the waste bin.

3. The waste management system of claim 1, wherein one or more sensors comprise a protective lens and a displacement device configured to drive vibrations into the protective lens.

4. The waste management system of claim 1, wherein the plurality of sensors comprises at least one of an ultrasonic sensor, a temperature sensor, a time of flight sensor, a radar sensor and a lidar sensor.

5. The waste management system of claim 1, wherein the plurality of sensors comprises at least three ultrasonic sensors arranged in a beamforming array.

6. The waste management system of claim 1 further comprising a location module configured to store the location of each waste bin in computer-readable memory, wherein the processor is operably connected to the location module, wherein the processor is configured to identify an optimal route for collecting waste from the plurality of waste bins based on the fill level for each waste bin, the location of each waste bin and input from one or more external data sources.

7. The waste management system of claim 1, wherein the processor is configured to identify contamination in the waste bin based on the sensory information from the multispectral camera sensor.

8. The waste management system of claim 1, wherein the server is configured to remotely reconfigure the plurality of sensors.

9. The waste management system of claim 1, wherein the processor is configured to identify whether at least one sensor is occluded based on the sensory information.

10. A waste management method comprising:
receiving sensory information for a plurality of waste bins over one or more wireless communication networks, wherein the sensory information for each waste bin is related to the contents of the waste bin and is collected by a plurality of sensors attached to the waste bin,
the sensory information for each waste bin including an image captured by a multispectral camera sensor configured to capture images of the contents of the waste bin in infrared and ultraviolet spectrums when the interior of the waste bin is illuminated by a multispectral light source in the absence of visible light;
determining a fill level for the waste bin based on the sensory information from a first sensor;
verifying the fill level of the waste bin based on the image from the multispectral camera sensor;
adding an offset to the first sensor, the offset based on the fill level as verified by the image from the multispectral camera sensor, wherein where the multispectral camera sensor becomes occluded, the fill level of the waste bin is determined based on the sensory information from the first sensor with the offset added; and
storing the fill level.

11. The waste management method of claim 10, further comprising deriving a distance measurement from the sensory information from three sensors of the same type to determine the fill level of the waste bin.

12. The waste management method of claim 10, further comprising driving vibrations into a protective lens of one or more sensors.

13. The waste management method of claim 10, wherein the plurality of sensors comprises at least one of an ultrasonic sensor, a temperature sensor and a time of flight sensor.

14. The waste management method of claim 10, wherein the plurality of sensors comprises at least three ultrasonic sensors arranged in a beamforming array.

15. The waste management method of claim 10 further comprising identifying an optimal route for collecting waste from the plurality of waste bins based on the fill level for each waste bin, the location of each waste bin and input from one or more external data sources.

16. The waste management method of claim 10 further comprising identifying contamination in the waste bin based on the sensory information from the multispectral camera sensor.

17. The waste management method of claim 10 further comprising remotely reconfiguring the plurality of sensors.

18. The waste management method of claim 10 further comprising identifying whether at least one sensor is occluded based on the sensory information.

* * * * *